(12) United States Patent
Khorasaninejad et al.

(10) Patent No.: US 11,320,668 B2
(45) Date of Patent: May 3, 2022

(54) METHODS, SYSTEMS, APPARATUSES, AND DEVICES FOR FACILITATING LIGHT FIELD OPTICAL FUSION

(71) Applicant: Brelyon, Inc., Redwood City, CA (US)

(72) Inventors: Mohammadreza Khorasaninejad, Redwood City, CA (US); Barmak Heshmat Dehkordi, Redwood City, CA (US); I-Hung Ting, Redwood City, CA (US)

(73) Assignee: Brelyon, Inc., Redwood City, CA (US)

( * ) Notice: Subject to any disclaimer, the term of this patent is extended or adjusted under 35 U.S.C. 154(b) by 0 days.

(21) Appl. No.: 17/381,914

(22) Filed: Jul. 21, 2021

(65) Prior Publication Data

US 2022/0057647 A1   Feb. 24, 2022

Related U.S. Application Data

(60) Provisional application No. 63/068,886, filed on Aug. 21, 2020.

(51) Int. Cl.
*G02B 30/29* (2020.01)
*G02B 5/10* (2006.01)
*G02B 30/33* (2020.01)

(52) U.S. Cl.
CPC .............. *G02B 30/29* (2020.01); *G02B 5/10* (2013.01); *G02B 30/33* (2020.01)

(58) Field of Classification Search
CPC .......... G02B 30/29; G02B 5/10; G02B 30/28; G02B 30/20; G02B 30/26; G02B 30/33
See application file for complete search history.

(56) References Cited

U.S. PATENT DOCUMENTS

| 5,982,343 A | * 11/1999 | Iba .................. G02B 27/0172 345/8 |
| 10,768,442 B1 | 9/2020 | Dehkordi |

(Continued)

FOREIGN PATENT DOCUMENTS

| CN | 110095870 A | * 8/2019 |
| WO | 2020190487 A1 | 9/2020 |

OTHER PUBLICATIONS

Heshmat, Barmak et al., "Photography optics in the time dimension" Nature Photonics, 12, pp. 560-566 (2018).

*Primary Examiner* — Jade R Chwasz
(74) *Attorney, Agent, or Firm* — Sheppard Mullin Richter & Hampton LLP

(57) ABSTRACT

Some implementations of the disclosure describe a display system for optically fusing light, comprising: multiple image sources configured to emit light corresponding to multiple respective image portions; a bent reflector comprising multiple segments, each segment configured to receive the light emitted by a corresponding image source, and reflect the light to a back reflector that has a bend region including a first of the segments attached to a second of the segments at an angle; and the back reflector, the back reflector configured to: modify a polarization or an angular profile of the light reflected by each segment; and after modifying the polarization or the angular profile, reflect the light back to the segments such that the light passes through the segments, wherein the angle is configured such that after the light reflected by the back reflector passes through the segments, the image portions are tiled or fused.

24 Claims, 48 Drawing Sheets

(56) References Cited

U.S. PATENT DOCUMENTS

| | | | |
|---|---|---|---|
| 10,866,413 B2 * | 12/2020 | Lamkin | ................... G06F 3/013 |
| 2015/0108782 A1 * | 4/2015 | Chou | ................. G02B 27/0101 |
| | | | 296/90 |
| 2018/0106936 A1 | 4/2018 | Heshmat Dehkordi et al. | |
| 2020/0301166 A1 | 9/2020 | Dehkordi | |

* cited by examiner

Output fused lightfield

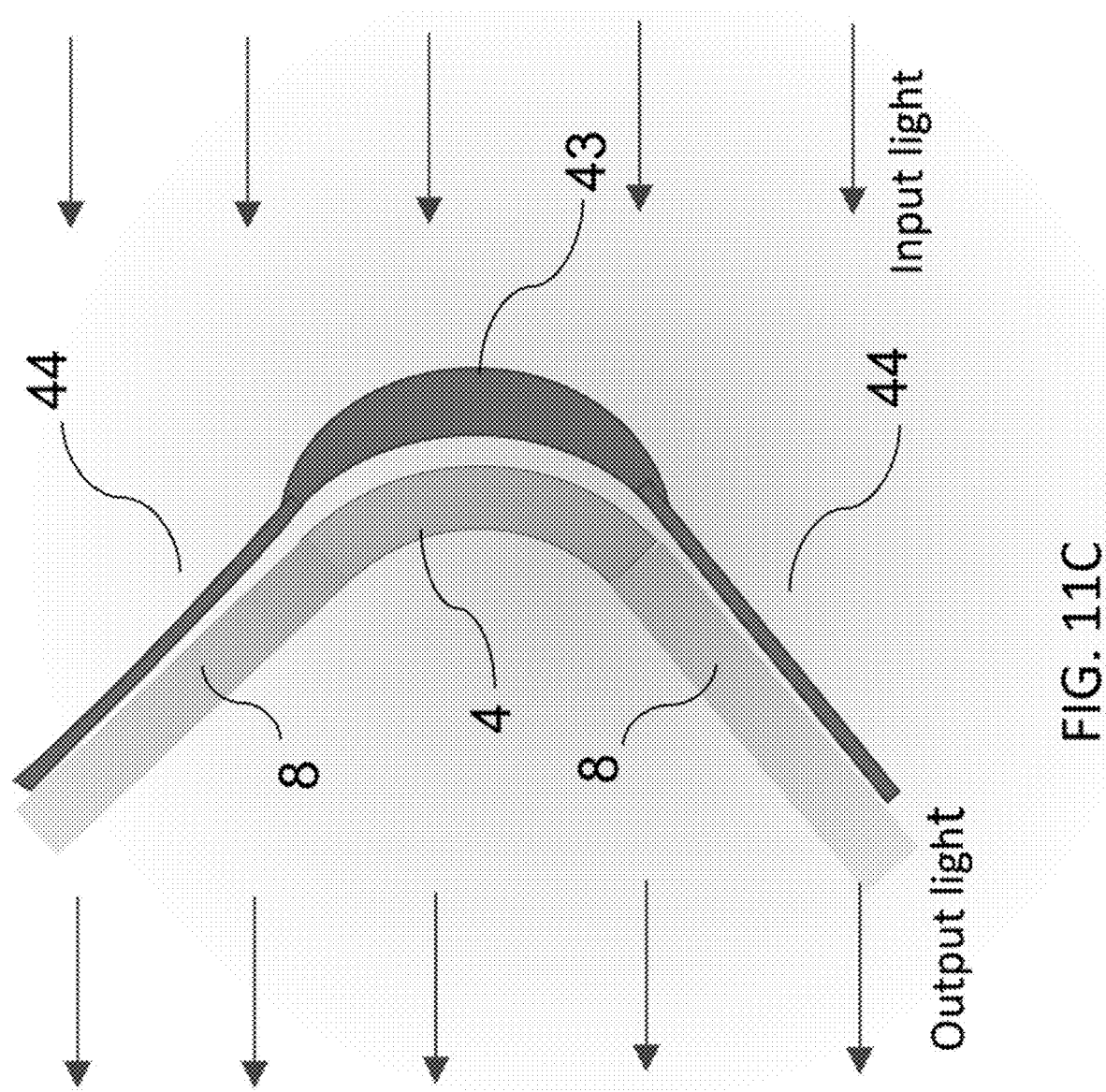

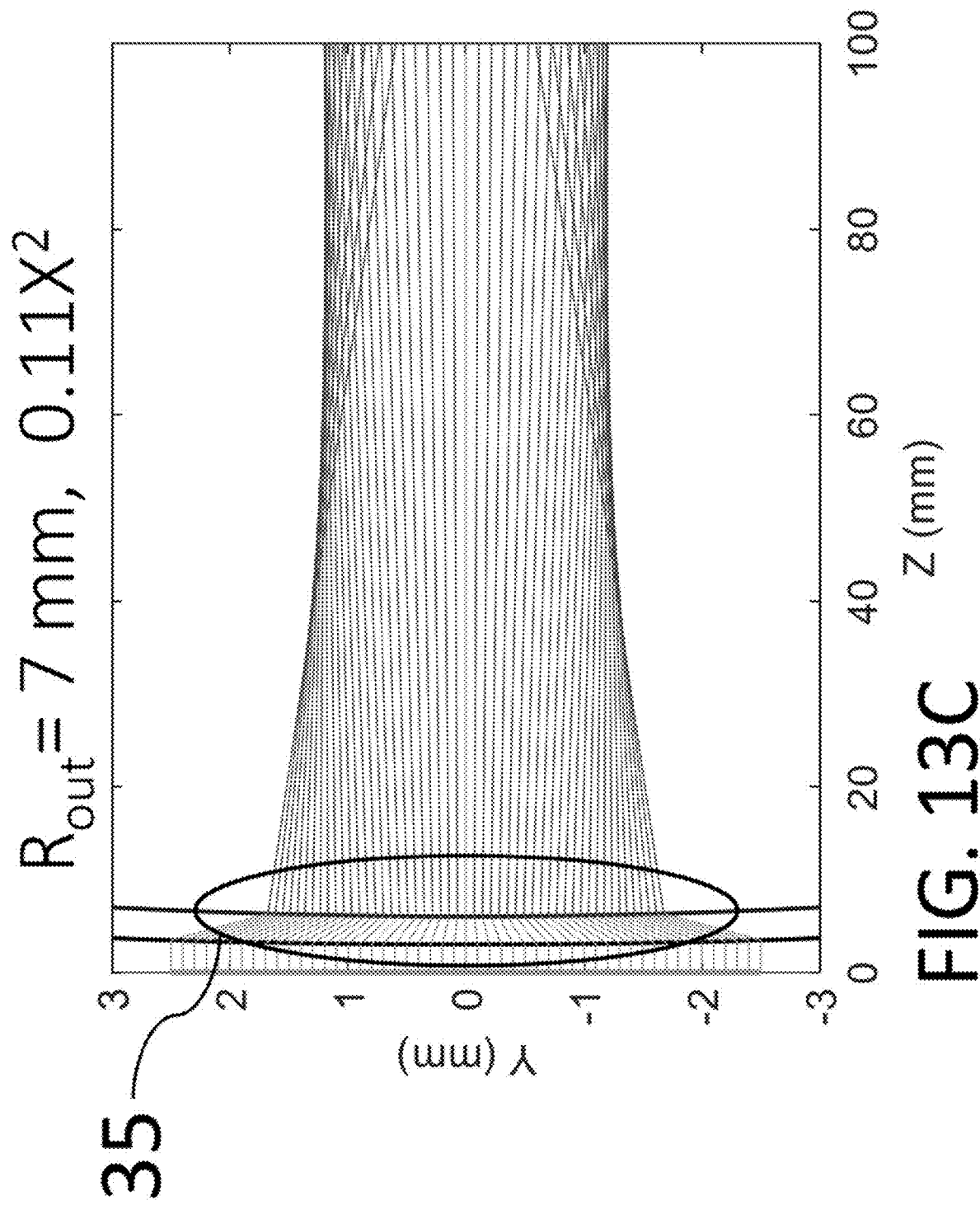

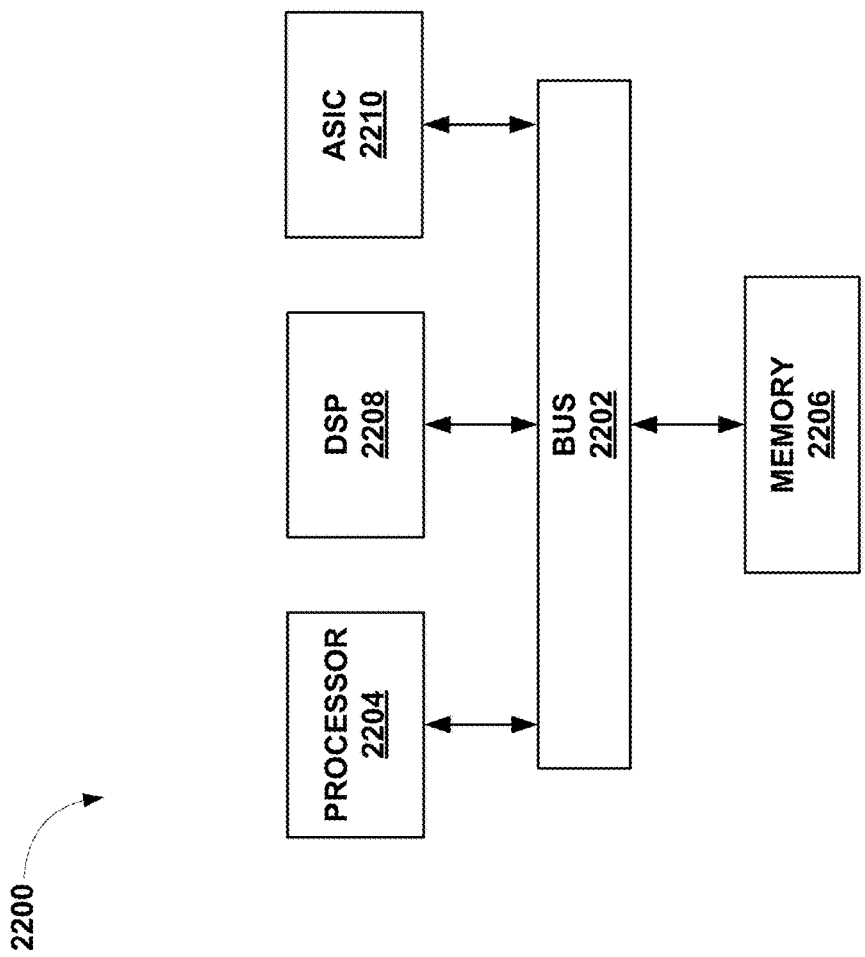

METHODS, SYSTEMS, APPARATUSES, AND DEVICES FOR FACILITATING LIGHT FIELD OPTICAL FUSION

CROSS-REFERENCE TO RELATED APPLICATIONS

This application claims priority to U.S. Provisional Application No. 63/068,886 filed Aug. 21, 2020 and titled "METHODS, SYSTEMS, APPARATUSES, AND DEVICES FOR FACILITATING LIGHT FIELD OPTICAL FUSION," which is incorporated herein by reference in its entirety.

TECHNICAL FIELD

The present disclosure generally to display and imaging systems. Particular embodiments of the present disclosure relate to systems and methods for facilitating light field optical fusion.

BACKGROUND OF THE INVENTION

There has been increasing traction toward more immersive light field and/or autostereoscopic three-dimensional ("3D") displays due to advancements in electronics and micro fabrications. Unlike stereoscopic 3D, light field displays manipulate optical wavefronts to create depth perception at the monocular level, which can eliminate the accommodation-vergence mismatch and reduce stress on the user's eyes.

There are four methods available for realizing more realistic light field experiences, Each method has unique weaknesses and advantages: super multi-view, computational, multi-focal, and holographic. The super multi-view method provides a light field at a compact form-factor but is limited to a reduced viewing zone and low resolution. The computational method increases resolution but produces haze and temporal flickering artifacts. The holographic method may struggle with color nonuniformity and fringing or specular artifacts. The multi-focal method can produce clean images; however, devices employing a multi-focal method are typically bulky.

The following issues are typical in all current light field display methods: large bandwidth requirements; a reliance on expensive and/or advanced components that are not easily mass-produced (e.g., tunable lenses); poor color uniformity; a small field of view or viewing zone; low brightness; low-resolution, haze, and diffraction artifacts; limited depth range; lack of compatibility with existing display drivers; and the occasional necessity to wear specialized glasses.

One of the proposed ways to increase resolution while reducing the form factor in imaging and display applications is tiling. Tiling refers to when light is tiled to multiple sensors in imaging systems or its emitted from multiple displays. Unfortunately, since it is challenging to make bezel-less displays, sensor tiling has always had the issue of having gaps between tiles.

SUMMARY OF THE INVENTION

The present disclosure describes systems and methods for facilitating light field optical fusion. In one embodiment, a display system for optically fusing light, comprises: multiple image sources configured to emit light corresponding to multiple respective image portions; a bent reflector comprising multiple segments, wherein: each of the segments is configured to receive the light emitted by a corresponding one of the multiple image sources, and reflect the light to a back reflector; and the bent reflector comprises a bend region including a first segment of the multiple segments attached to a second segment of the multiple segments at an angle; and the back reflector, wherein the back reflector is configured to: modify a polarization or an angular profile of the light reflected by each of the segments; and after modifying the polarization or the angular profile, reflect the light back to the segments such that the light passes through the segments, wherein the angle of the bend region is configured such that after the light reflected by the back reflector passes through the segments, the multiple respective image portions are tiled or fused. The multiple respective image portions may be tiled or fused with minimal or no lines between the portions of the image.

In some implementations, each of the segments comprises: a first layer configured to: receive the light emitted by the corresponding one of the image sources, and change the polarization of the received light or a reflective efficiency of a second layer that is adjacent to the first layer; and the second layer, wherein the second layer is configured to reflect the light to the back reflector.

In some implementations, the display system further comprises an intermediate optical component, the intermediate optical component comprising two anti-reflective layers and a quarter-wave plate film between the two anti-reflective layers, wherein the light reflected to the back reflector passes through the intermediate optical component before being received at the back reflector.

In some implementations, the display system further comprises: a first absorptive polarization layer adjacent to the bent reflector, the first absorptive polarization layer configured to receive the light that passes through the first segment from the back reflector and reduce ambient reflection or self-reflection between both sides of the bent reflector.

In some implementations, each of the multiple image sources is horizontally tilted at an angle or vertically tiled at an angle, the angle configured such that after the light reflected by the back reflector passes through the multiple segments, the multiple respective image portions are tiled.

In some implementations, the back reflector comprises a curved first surface mirror configured to create a concentric light field from incident light.

In some implementations, each of the multiple image sources is adjacent to another one of the multiple image sources and is angled relative to the other, adjacent image source.

In some implementations, the bend region between the first segment and the second segment comprises a first metasurface on an inner facet of the bend region or an outer facet of the bend region, the first metasurface configured to correct for optical aberration caused by the bend region. In some implementations, bend region comprises the first metasurface on the inner facet of the bend region and a second metasurface on the outer facet of the bend region.

In some implementations, the bend region comprises an integrated Gradient-Index Lens (GRIN), the GRIN configured to compensate for an optical power mismatch between inner and outer surfaces of the bend region to remove any light disturbance visible to a user.

In some implementations, the display system further comprises a pre-compensator adjacent to the bend region, the pre-compensator comprising a pre-compensation bend configured to pre-compensate for optical aberrations introduced by the bend region for light received at the bend region.

In some implementations, the display system further comprises a post-compensator adjacent to the bend region, the post-compensator configured to post-compensate for optical aberrations introduced to light transmitted through the bend region between the first segment and the second segment.

In some implementations, the bend region is segmented into multiple bent segments to reduce local curvature and distribute it to larger area.

In some implementations, the bend region comprises a reflective layer mechanically stretched over a chassis of a mechanical frame to create thin sharp optically see through bends.

In some implementations, the bend region comprises a free form optical structure having at least one of an interior surface curvature or exterior surface curvature expressed as a polynomial.

In some implementations, the bend region comprises the free form optical structure having each of the interior surface curvature and the exterior surface curvature expressed as a polynomial.

In some implementations, the display system further comprises: a processor configured to apply a predistortion to the multiple respective image portions before the multiple image sources emit the light corresponding to the multiple respective image portions, wherein the predistortion is configured blend together the tiled image portions.

In some implementations, applying the predistortion comprises applying a geometric distortion and an intensity map to the multiple respective image portions.

In some implementations, the display system further comprises a head tracking sensor, the head tracking sensor configured to generate sensor data based on a position or orientation of a user's eye, head, or face in relation to the bent reflector, wherein the predistortion is applied based at least on the sensor data.

In some implementations, the multiple image sources are a first set of multiple image sources, the bent reflector is a first bent reflector, and the curved reflector is a first curved reflector, and the display system comprises: a left eye display system, comprising: the first set of multiple image sources, the first bent reflector, and the first back reflector; and a right eye display system, comprising: a second set of multiple image sources, the second set of multiple image sources configured to emit light corresponding to second multiple respective image portions; a second bent reflector comprising a second set of multiple segments, wherein: each of the segments of the second set of multiple segments is configured to receive the light emitted by a corresponding one of the image sources of the second set of multiple image sources, and reflect the light to a second back reflector; and the second bent reflector comprises a second bend region including a third segment of the second set of multiple panels attached to a fourth segment of the second set of multiple panels at a second angle; and the second back reflector.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 11C depicts geometric compensation of a bend by using an index-matched transparent layer with the bend, in accordance with some implementations of the disclosure.

FIG. 13C shows simulation results including ray tracing analysis for a bend for rays at zero angles, where the interior surface and the exterior surface has a parabola profile, in accordance with some implementations of the disclosure.

FIG. 18 illustrates a chip set in which embodiments of the disclosure may be implemented.

Figure 1A:
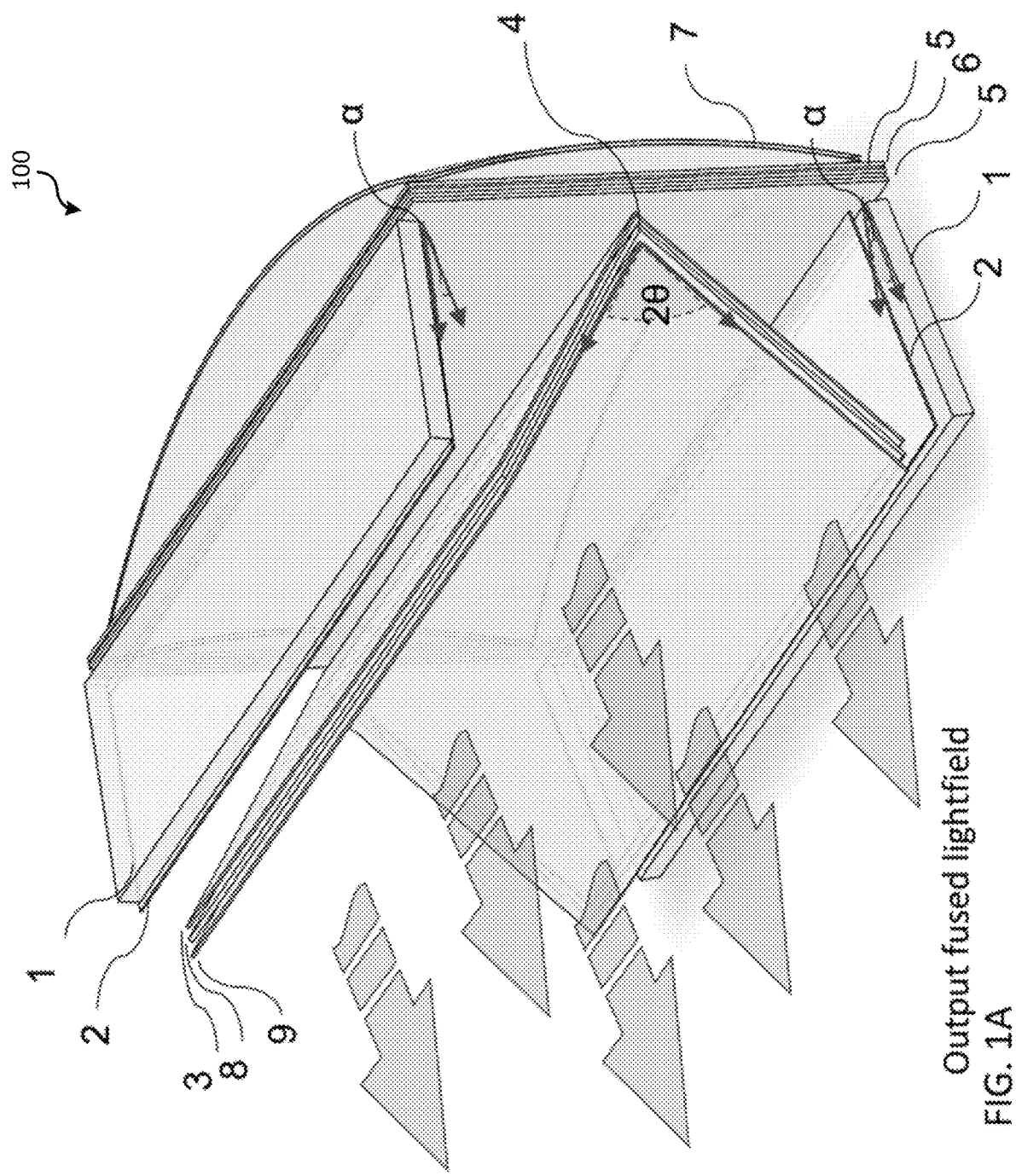
FIG. 1A shows a perspective view of a system for facilitating light field optical fusion, in accordance with some implementations of the disclosure

The figures are not intended to be exhaustive or to limit the invention to the precise form disclosed. It should be understood that the invention can be practiced with modification and alteration, and that the disclosed technology be limited only by the claims and the equivalents thereof.

DETAIL DESCRIPTIONS OF THE INVENTION

As used herein, the term "optically coupled" is intended to refer to one element being adapted to impart, transfer, feed or direct light to another element directly or indirectly.

As used herein, the terms "Field Evolving Cavity" and "FEC" may refer to a cavity including reflectors that allows light to reflect back and forth or circulate within the cavity's facets to evolve the shape of the wavefront associated with the light in a physical space. One example of a FEC may be comprised of two or more half-mirrors or semi-transparent mirrors facing each other. An FEC may provide depth or tune the optical parameters of an imaging system.

As used herein, the "order" of round trips in an FEC may refer to a number of round trips in a FEC that light goes through. A "round trip" is referred to when light circulates or bounces back and forth between the entrance and exit facets or layers of a cavity (e.g., FEC). An FEC may delay light or increase the length of the path that light has to travel before it may exit the cavity by forcing the light to circulate between the entrance and exit facets (e.g., half-mirrors).

Throughout this disclosure, the term "arbitrarily engineered" is used to refer to "of being any shape, size, material, features, type or kind, orientation, location, quantity, components, and arrangements of components with single or an array of components that would allow the methods, the systems, the apparatuses, and the devices described in the present disclosure or a specific component of the methods, the systems, the apparatuses, and the devices to fulfill the objectives and intents of the present disclosure or that specific component within the methods, the systems, the apparatuses, and the devices." In this disclosure, light field at a plane refers to a vector field that describes the amount of light flowing in every or several selected directions through every point in that plane. The light field is the description of the angle and intensity of light rays traveling through that plane.

In this disclosure, the term "concentric light field" (also called "curving light field") as used herein means a light field in which, for any two pixels of the display at a fixed radius from the viewer (called "first pixel" and "second pixel"), the chief ray of the light cone emitted from the first pixel in a direction perpendicular to the surface of the display at the first pixel intersects with the chief ray of the light cone emitted from the second pixel in a direction perpendicular to the surface of the display at the second pixel. A concentric light field produces an image that is focusable to the eye at all points, including pixels that are far from the optical axis of the system (the center of curvature), where the image is curved rather than being flat, and the image is viewable within a reasonable viewing space (headbox) in front of the light field.

The term "monocular-to-binocular hybridization" (MBH) as used herein refers to the characteristic that a stereoscopic image is produced in a contiguous viewable spatial region that, in at least one dimension (e.g., horizontally), is significantly larger than (e.g., at least twice) the distance between the two eyes of the viewer of the display, where each eye of the viewer may detect the monocular depth that the light field is providing and may detect correct stereoscopic cues on that depth. MBH produces an image that does not require binocular isolation (the isolation of the two images for two eyes, such as is necessary for stereoscopic HMDs or any 3D that requires wearing a pair of glasses) to view, meaning there is no gap between the images seen by the left eye and right eye.

In this disclosure depth modulation refers to change, programming, or variation of the monocular optical depth of the display or image. Monocular optical depth is a depth that directly refers to the curvature of the wavefront of the light and does not require both eyes or stereopsis to be perceived. Monocular depth is directly related to the distance of the object, an image, or a display. When an emissive image (e.g., an illuminated object or a display) is moved further away from an observer, the emitted light has to travel a longer distance. Since each point emits a spherical wavefront, as the distance that light has propagated increases, the radius of the sphere increases and the surface of the sphere also known as the wavefront becomes flatter. This reduction in the curvature translates to deeper depth in the human eye or a camera. The evolution of a wavefront refers to change in curvature of the wavefront as a result of the propagation of light or interaction with optical components.

In this disclosure "invisible" refers to a bent structure, a transparent structure, or other object that impacts light in such a way that the human eye or image sensor cannot pick up or is not impacted by the presence of the geometrical structure of the object in a defined limited angle.

In this disclosure, display refers to an emissive display which may be based on any technology such as but not limited to Liquid Crystal Displays ("LCD"), Thin-film Transistor ("TFT"), Light Emitting Diode ("LED"), Organic Light Emitting Diode arrays ("OLED"), Active Matrix Organic Light Emitting Diode ("AMOLED"), projection or angular projection arrays on flat-screen or angle-dependent diffusive screen or any other display technology) and/or mirrors and/or half-mirrors and/or switchable mirrors or liquid crystal sheets arranged and assembled in such a way as to exit bundles of light with divergence apex at different depths or one depth from the core plane or waveguide-based displays. The display may be a near-eye display for a headset, a near-head display, or far standing display. The application of the display does not impact the principle of this invention and this is what is referred to by an emissive display in this invention.

Throughout this disclosure, the angular profiling may be achieved by holographic optical elements ("HOE"), diffractive optical elements ("DOE"), lens, concave or convex mirrors, lens arrays, microlens arrays, aperture arrays, optical phase or intensity masks, digital mirror devices ("DMDs"), Spatial light modulators ("SLMs"), metasurfaces, diffraction gratings, interferometric films, privacy films, thin-film stack or other methods. Intensity profiling may be achieved by absorptive or reflective polarizers, absorptive or reflective coatings, gradient coatings, or other methods. The color or wavelength profiling may be achieved by color filters, absorptive or reflective notch filters, interference thin films, or other methods. The polarization profiling might be done by metasurfaces with metallic or dielectric, micro or nanostructures, wire grids, absorptive or reflective polarizers, wave plates such as quarter-waveplates, half-waveplates, 1/x waveplates or other nonlinear crystals or polymer with anisotropy.

These components may be arbitrarily engineered to deliver the desired profile. As used herein, "arbitrary optical parameter variation" refers to variations, change, modulation, programing and/or control of parameters which may be one or collection of following variations namely: optical zoom change, aperture size, and aperture brightness variation, focus variation, aberration variation, focal length variation, time-of-flight or phase variation in case of an imaging system with time-sensitive or phase-sensitive imaging sensor, color variation or spectral variation in case of spectrum sensitive sensor, the angular variation of a captured image, variation in depth of field, the variation of depth of focus, the variation of coma, variation of stereopsis baseline in case of stereoscopic acquisition, the variation of a field of view of the lens.

Throughout this disclosure, an imaging sensor might use "arbitrary image sensing technologies" to capture light or a certain parameter of light that is exposed to it. Examples of such "arbitrary image sensing technologies" include complementary-symmetry metal-oxide-semiconductor ("CMOS"), scientific CMOS (sCMOS), Single Photon Avalanche Diode ("SPAD") array, Charge-Coupled Device ("CCD"), Intensified Charge-Coupled Device ("ICCD"), Ultra-fast Steak sensor, Time-of-Flight sensor ("ToF"). Schottky diodes or any other light or electromagnetic sensing mechanism for shorter or longer wavelengths.

As discussed above, there are a number of challenges that have significantly limited the use of or production of light field displays in commercial and/or industrial settings. For example, the success of cellphone cameras has increased the need for higher lens brightness to improve performance in dark environments and provide more flexible optical parameters at the hardware level without the need for computational restoration of the image. Therefore, there is a need for improved methods and systems for facilitating light field optical fusion that may overcome one or more of the above-mentioned problems and/or limitations.

To this end, the present disclosure describes systems and methods for facilitating light field optical fusion. First, in accordance with some implementations, the present disclosure describes optical system architectures for optically fusing light from multiple displays that may have a notable bezel into one cohesive uniform curving or concentric light field. Second, in accordance with some implementations, the disclosure describes techniques for forming bend structures or hinges (e.g., at a microscopic level) to render a bend invisible to a user's eye or minimize the light perturbation in the transmission of light, reflection of light, or both. These bends structures are referred to in some embodiments as bends that are "invisible." Third, in accordance with some implementations, the disclosure describes algorithmic methods for computationally distorting or pre-compensating an image such that when the image passes through an optical system described herein, tiling lines become invisible.

By virtue of implementing the systems and methods described herein, light field optical fusion with invisible bends may be realized. Additionally, a light field may be tiled, thereby increasing the resolution and/or field of view (FOV) of displays and/or imaging apparatuses via bent transparent and/or reflective surfaces engineered computationally and/or optically in such a way that the hinge may not be visible to the user's eye or sensor in the larger tiled light field. Further, by virtue of implementing the systems and methods described herein, tiling gaps may be eliminated in light fields without the need to have bezel-less displays. Moreover, some implementations described in the present disclosure may enable tiling of a light field in any setting such that tiling lines are completely invisible to a user's eye or an image sensor.

In one embodiment, an apparatus for facilitating optical fusion of a light field includes: at least two image sources, at least one bent reflector, and at least one back reflector. Each of the image sources may be a source of a light field and include a display surface. The display surface may form an image corresponding to light. The light may have a polarization that may be circular, elliptical, linear, or a combination thereof.

The bent reflector may include at least two segments, each of the segments optically coupled to one of the at least two image sources such that the light emitted by each display surface is incident on one of the segments. For example, a first segment may be disposed proximal to a first display surface, and a second segment may be disposed proximal to the second display surface. The first segment may be attached with the second segment, forming a bend region. A first horizontal plane of the first segment may form an angle with a second horizontal plane of the second segment. Alternatively, a first vertical plane of the first segment may form an angle with a second vertical plane of the second segment.

The back reflector may be optically coupled to the bent reflector. Each of the at least two segments may be configured to partially or fully reflect, based on the light's polarization, the light incident on the bent reflector to the at least one back reflector. The back reflector may create a concentric light field. The back reflector may modify the polarization of the incident light. The back reflector may be configured to reflect the light back to the at least one bent reflector. The light may pass through the at least one bent reflector based on the polarization. The bend region may be configured to fuse and/or tile the light associated with each of the at least two image sources.

Figure 1B:
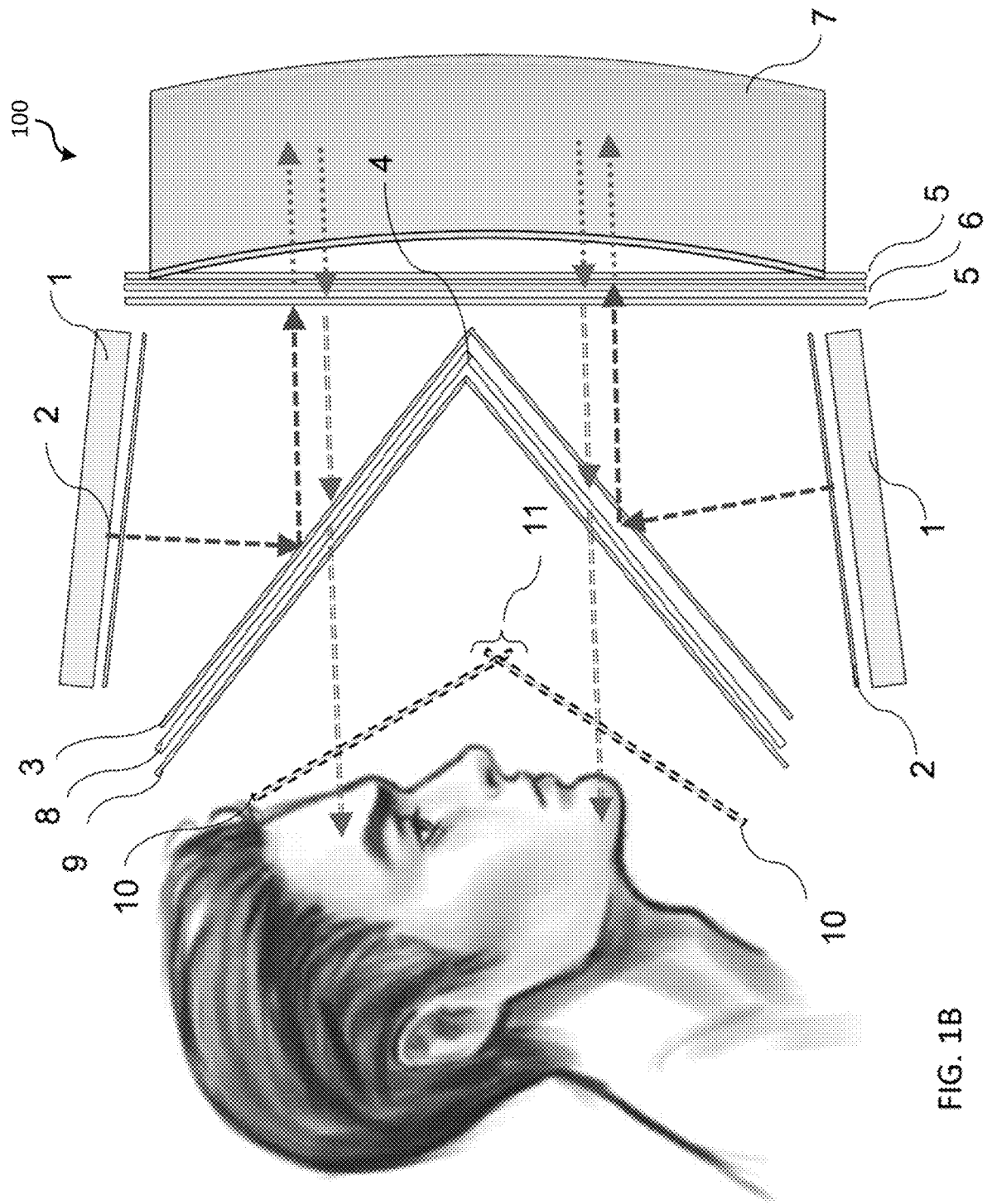
FIG. 1B shows a side view of the system of FIG. 1A.

FIGS. 1A and 1B respectively show perspective and side views of a display system 100 for facilitating light field optical fusion, in accordance with some implementations of the disclosure. As further discussed below, the display system 100 may facilitate light field optical fusion with invisible bends. FIG. 1A illustrates the concentric light field (CLF) display architecture of display system 100, where light from two sources of light or emissive displays 1 is fused with a horizontally bent reflector in the center. FIG. 1B shows the way light rays travel inside the display system 100 and arrive at the eyes of a user.

As shown, imaging system 100 includes sources of light fields or emissive displays 1. The light emitted by each display 1 passes through a respective layer 2 that profiles the angle of the light. The layer 2 may be implemented as a privacy film, a waveplate, or a combination of the two (e.g., laminated together). In some implementations, layer 2 may change the polarization of the light. Light passing through layer 2 then passes through a layer 3 on a bent reflector that includes layers 3-8, further described below. Layer 3 may change the polarization of the light or the reflective efficiency of an adjacent, reflective layer 8. In some implementations, the layer 3 may be a polymer-based polarization dependent reflector or just a quarter-wave plate (QWP).

The reflective layer 8 may be a semi-reflective layer that partially reflects light toward a layer 5 on the right-hand side of imaging system 100. Alternatively, the reflective layer 8 may completely reflect the light toward anti-reflective layer 5. In some implementations, layer 8 is polarization-dependent. The reflective layer 8 may have a flat surface. Anti-reflective layer 5 may comprises an anti-reflection (AR)

coating or film. Light passing through anti-reflective layer 5 passes through layer 6, which may be a mechanically curved quarter-wave plate (QWP) film 6, and then the light passes through another anti-reflective layer 5 that arrives at curved reflector 7.

Due to passing through the QWP of layer 5, the light may have a circular polarization when arriving at curved reflector 7. Curved reflector 7 may be a curved first surface mirror with an arbitrarily engineered shape to create a concentric light field. In other implementations, reflector 7 is not curved. The light then is reflected back from curved reflector 7 with an opposite handedness of circular polarization and passes through the 5-6-5 layer set upon which the polarization of light may be perpendicular to the initial light that was coming out of layer 2.

The light then passes through layers 3, 8, and 9 before arriving at the user's face. Layer 9 is an absorptive polarization layer that may eliminate or reduce the ambient reflection and self-reflection between the two sides of the bent reflector (layers 3, 8). It may also do so between the back mirror 7 and outside world. The bending region or "bend" 4 of the bent reflector may be designed in such a way that the user cannot see any black line or distorted image at that area, and the image seems cohesive without any noticeable artifact. The fused light is indicated in FIG. 1A by the large arrows coming out of display system in 100. The light field of the fused light is a tile of two displays, thereby increasing the vertical FOV and resolution two times while inducing no tiling line visible to the user. Further, as discussed below, the bend may be made at a microscopic and/or macroscopic level.

As depicted in FIG. 1A, there is an angle between a horizontal line and the displays 1 so that the displays 1 at the top and bottom have a horizontal tilt indicated by angle $\alpha$. The angle between the flat pieces/panels of bend 4 is indicated by angle $2\theta$. These angles ($\alpha$, $2\theta$) and the distance between displays 1 and the flat segments of reflective layer 8 may be configured in such a way that the reflections of the images from both screens mates at a virtual plane 10 shown in FIG. 1B. The edges of the reflection overlapping in 3D space are referred to as the fusional area 11 shown in FIG. 1B. The bend structure may have many different implementations. In the implementations shown in FIG. 1B, the $2\theta$ angle is closer to 90 degrees but both angles ($\alpha$, $2\theta$) may be changed or arbitrarily engineered. When the bend is sharper (i.e., $2\theta$ is smaller), it may be more difficult to do fusion with no artifacts.

Display system 100 may also include a spatial localization and mapping sensor (SLAM) (not illustrated in FIGS. 1A-1B) or other head or eye tracking sensor, which in some embodiments controls how the image is distorted at the fusional area 11 and at the rest of the areas. In some implementations, display system 100 does not provide an adaptive change in the content and so there is no SLAM sensor.

In some implementations, there is no polarization impact provided by any of the components of display system 100. That is layers (5)-(6)-(5), (3) and (9) do not provide polarization impact. These polarization impacting layers may include polarization impact to enhance the light efficiency (the effectiveness to bring the highest amount of light intensity to the user) while reducing the ambient or other unwanted reflections.

Figure 1C:
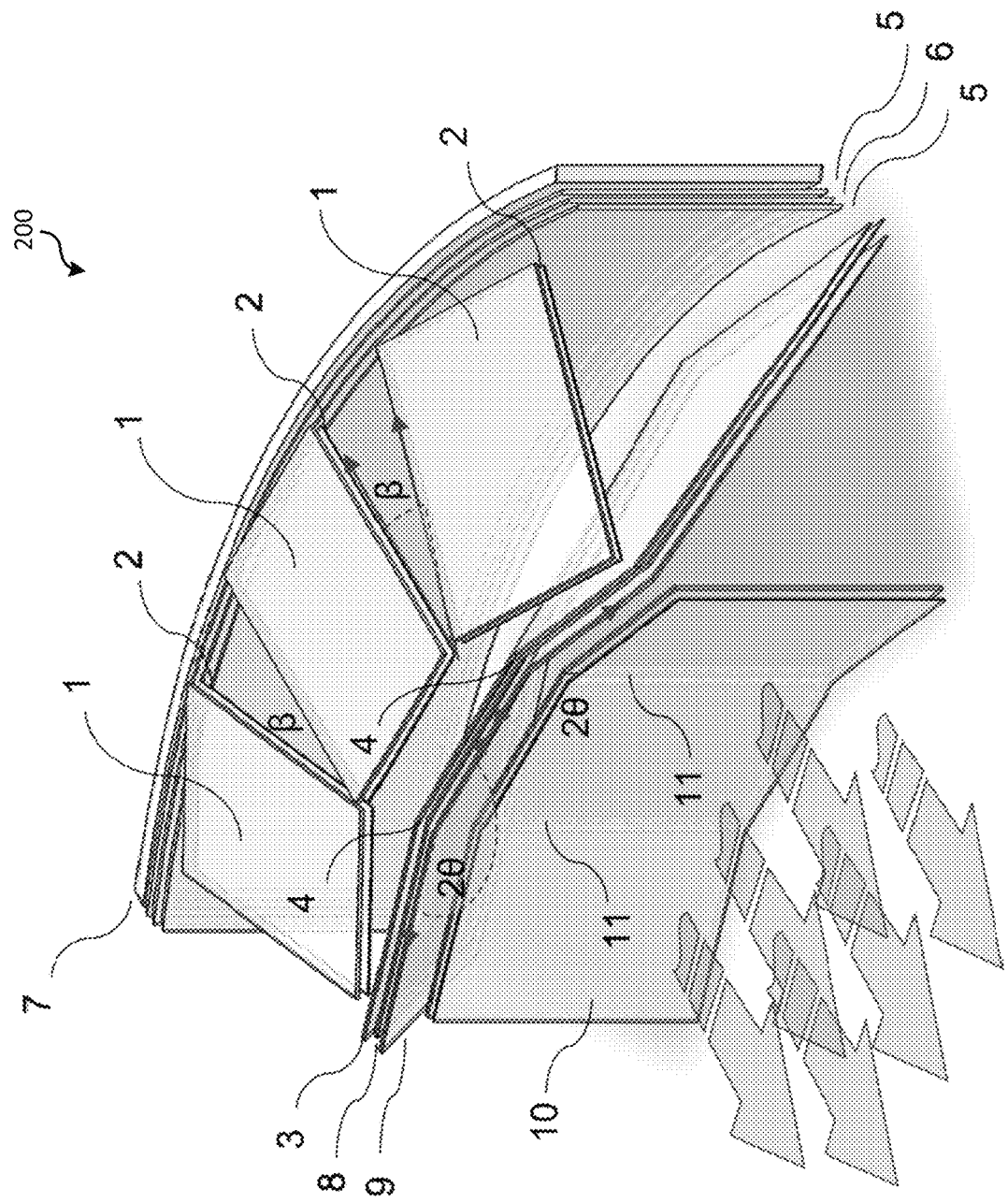
FIG. 1C shows a perspective view of a system for facilitating light field optical fusion, in accordance with some implementations of the disclosure.
Figure 1D:
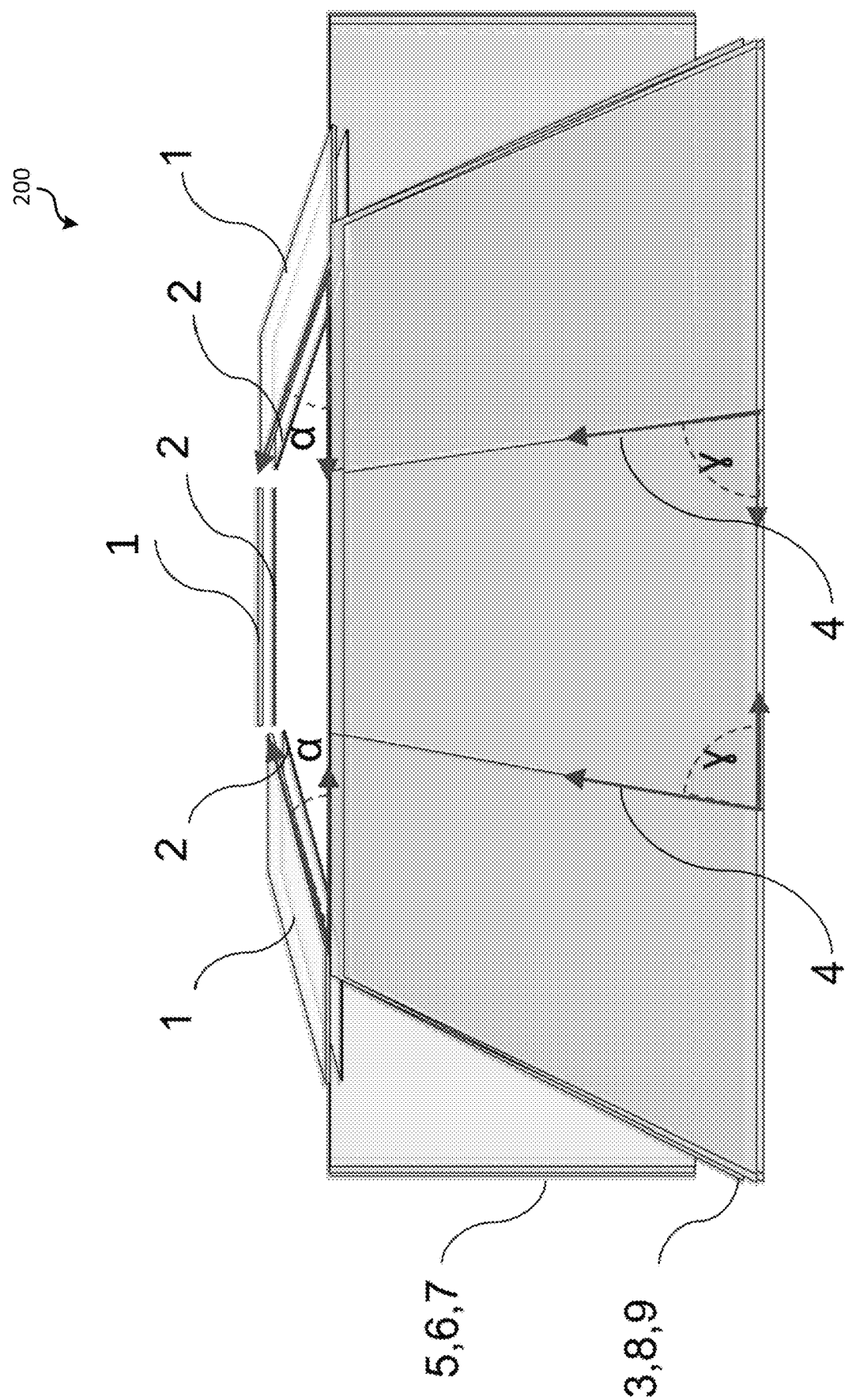
FIG. 1D shows another perspective view of the system of FIG. 1C.

FIGS. 1C and 1D show perspective views of a display system 200 for facilitating light field optical fusion, in accordance with some implementations of the disclosure. As further discussed below, the display system 200 may facilitate light field optical fusion with invisible bends. Display system 200 may fuse the light from three displays 1 in a seamless manner using larger angle invisible bends or bending regions 4. In display system 200, similar to display system 100 illustrated in FIG. 1B, the light emitted from a display 1 passes through a respective layer 2 and has its angular profile or polarization impacted. The light then reflects from the 3-8 layers, passes through layer set 5-6-5, reflects off of curved reflector 7, and goes back through layer set 5-6-5 with rotated polarization that may let the light pass through the layer set 3-8-9, and to the user.

In display system 200, in addition to the two aforementioned angles ($\alpha$, $2\theta$), there is an angle $\beta$ between the sides of adjacent displays 1, and there is an angle Y in the shape of the reflector considering the three-dimensional geometry shown in FIGS. 1C-1D. The fused light output by display system 200 is indicated by large arrows coming out of the display system 200 in FIG. 1C. This light field is now a horizontal tile of three displays, thereby increasing the horizontal FOV and resolution by three times while inducing no tiling line visible to the user. FIG. 1C depicts the reflection image of the two displays (1) at the top and bottom and how they are mating each other in 3D space (this is an imaginary plane, it's not a component or a physical solid object, it is the location in space where the reflection images seem to be coming from) and how they are mating each other in 3D space. In this implementation, the $2\theta$ angle is larger than 90 degrees, and in some implementations it may be from 120-150 degrees. It should be noted that although there is a notable physical gap between the displays 1 at the top of imaging system 200, there is no gap between the reflection of the images from those displays formed by the geometry of the 3-8-9 layers, a key benefit that may be realized by the optical architectures described herein. Another key benefit that may be realized by the implementations described herein, and further described below, is that when light is reflected back from a curved reflector 7 and goes through the bend area, the bends may be engineered in such a way that the inner side of the bend and outer side compensate each other optically so there is overall no distortion induced by the light. For example, in the embodiment shown in FIGS. 1C-1D, the reflectors have a trapezoid-like cross-section and are mating at two 120 degree bends.

Figure 2A:
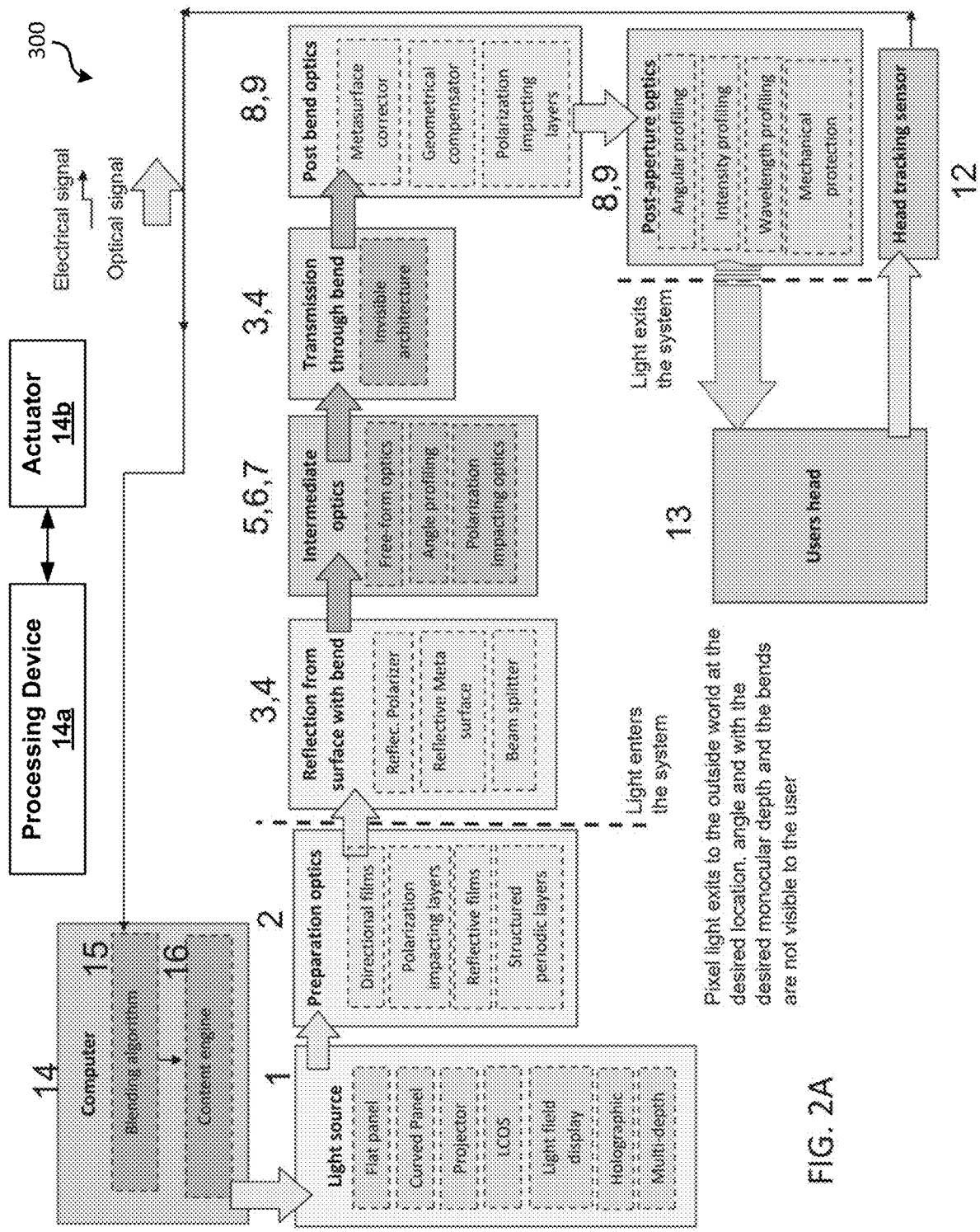
FIG. 2A is a block diagram illustrating example components of a display system, in a step by step fashion, for facilitating light field optical fusion, in accordance with some implementations of the disclosure.

FIG. 2A is a block diagram illustrating example components of a display system 300, in a step by step fashion, for facilitating light field optical fusion, in accordance with some implementations of the disclosure. In specific implementations, display system 300 may be implemented as system 100 or 200, described above. As depicted, the content to be displayed (e.g., video) may be provided by a video signal source such as a computer 14 or other video signal source. The video content may be fed to a blending algorithm 15 that prepares the content based on a signal from a head tracking sensor 12 (e.g., SLAM sensor). The content modified by the blending algorithm 15 may be fed to a content engine 16 that further renders it and sends it to different light sources or displays 1 in the system. The displays, which are emissive displays, then show the images or visual data.

The light emitted by each display 1 passes through layer(s) 2 of a preparation optical component that impacts the angular profile or polarization of the light. The layer(s) 2 may be a privacy film, diffractive optics, waveplates, or may be arbitrarily engineered. The light then goes through a reflection or a set of reflections from the structures that have bend 4. The intermediate optics (e.g., layers 5, 6, 7) impact the angular profile as well as the wavefront of the light in such a way that is desired for the display system 500, e.g., if the display system 500 provides a concentric light field, a planar light field, or just a simple flat 2D image. The intermediate optics may be arbitrarily engineered. In some implementations, the intermediate optics include freeform optics; polarization impacting optics or any other optics to do angular profiling of the light as well as impacting the wavefront. The light then is transmitted through the layer that had the bends.

The bends may be invisible. Further, in some implementations, display system 500 may include a set of post-bend optics or layers 8, 9 to correct for any unwanted remaining light perturbations that need to be corrected for. In an embodiment, the system may include post-bend or pre-bend compensation elements. The light then passes through some post-aperture optics layers 8,9. These layers may impact the polarization to eliminate any unwanted color artifact or ambient reflections. The light then exits the system and into the outside world toward the viewer (users head 13). Here, the head tracking sensor 12 (e.g., SLAM sensor) may pick up the location of the viewer to command the computer to adjust the content accordingly to bring a unified image and blend the fusional area as seamlessly as possible to the user.

In some implementations, the head tracking sensor 12 may be configured to generate sensor data based on the position and/or orientation of the user's eye or head in relation to at least one bent reflector of the optical fusion display system (e.g., a system such as display system 100 or 200). A processing device 14a in display system 300 (e.g., processing device of computer 14) may be communicatively coupled to head tracking or eye tracking sensor 12, and configured to determine, based on the sensor data, an angle between the display panels and the horizon. An actuator 14b of system 100 may be communicatively coupled to the processing device 14a, and operationally coupled with the at least one bent reflector. After the processing device 14a determines the angle, the processing device 14a may transmit, based on the angle, a command that causes the actuator 14b to move the first panel in relation to the second panel. For example, the actuator 14b may modify an angle between the first panel and second panel to match a desired angle. For example, the angle α formed by the geometry display and horizontal line in display system 100 may be modified to match a desired aberration or image size performance at a given head location or gaze direction of the user.

Figure 2B:
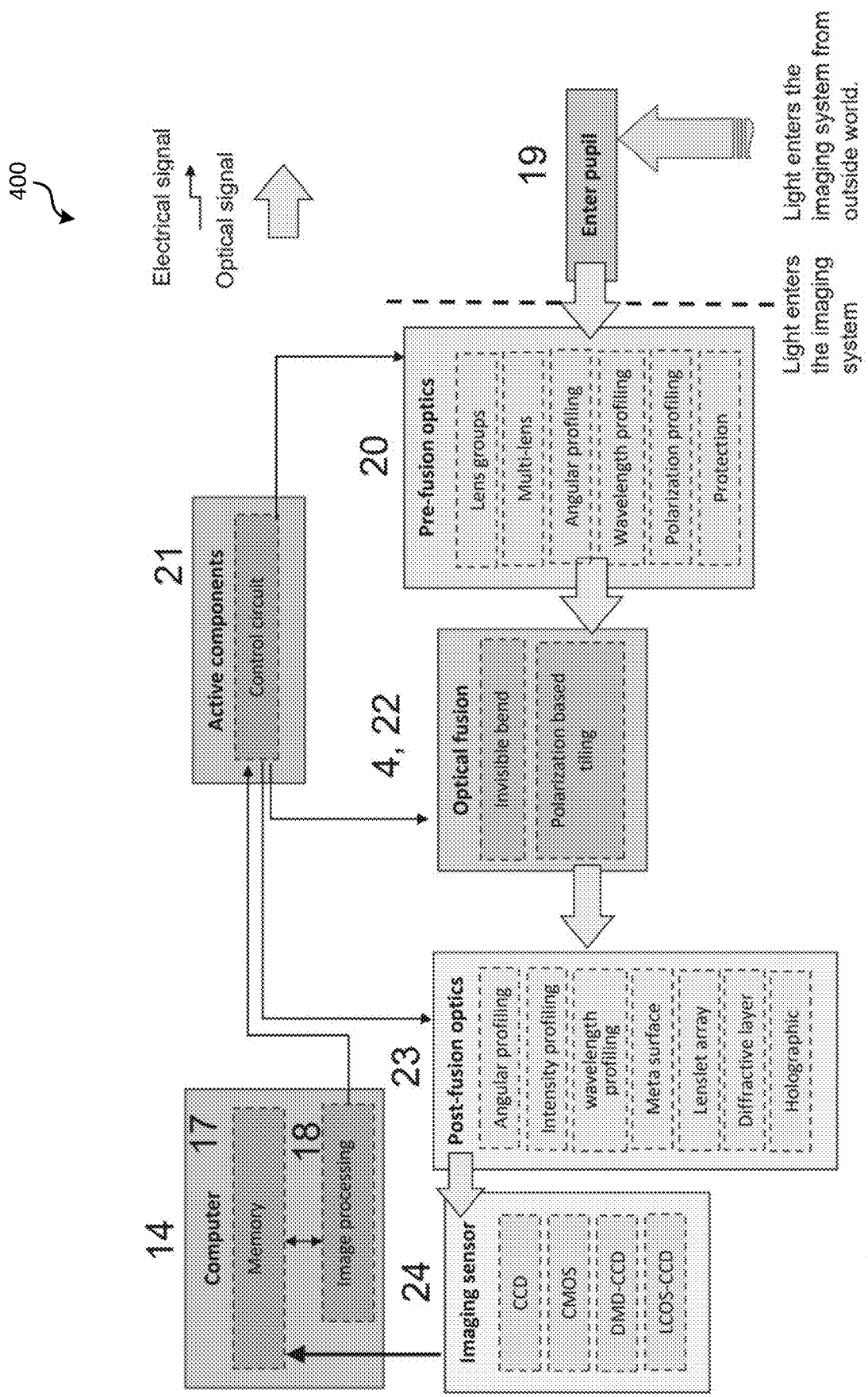
FIG. 2B is a block diagram illustrating example components of an imaging system, in a step by step fashion, for facilitating light field optical fusion, in accordance with some implementations of the disclosure.

FIG. 2B is a block diagram illustrating example components of an imaging system 400, in a step by step fashion, for facilitating light field optical fusion, in accordance with some implementations of the disclosure. In this case, the light first enters the entrance pupil 19 of the imaging system 400 from the outside world. The light then travels through pre-fusion optics 20. The pre-fusion optics may be a lens group or a set of imaging optics that form an image from incoming light. A set of non-limiting examples of such optics is a lens group, a convex mirror imaging system, a diffractive lens, a Fresnel lens, a metalens (metasurface based lens or a lens that uses surface feature sizes below wavelength of the light to converge or diverge the light), a holographic optical element (HOE) lens, etc. The light then travels through fusion optics 22. The fusion optics 22 may work in a reflective mode, leveraging the geometry to tile reflections in the image space, or using polarization in transmissive mode to tile.

The light corresponding to the tiled images in the imaginary image or reflection space is fed through post-fusion optics 23, which either compensates for the bend deficiencies or further helps with the arbitrary optical parameter variations that are expected from the system. The light then creates an image or a set of images, or is recorded as imaging data by the imaging sensor 24. The imaging sensor 24 sends the imaging data to the computer 14. Computer 14 may store the imaging data in a memory 17. An image processing algorithm 18 stored at the computer 14 may signal, based on the stored imaging data, active components 21 through one or more control circuits. The active components 21 may be any set of optics that varies any property of light by an electrical signal (e.g., delivered by a control circuit). Non-limiting examples of active components 21 may include liquid crystal layers, moving lenses, electro-optical components or spatial light modulators, or electronically controlled adaptive optics. These active components 21 may perform arbitrary optical parameter variations expected from the system. For the purpose of miniaturization or optical design requirements, active components 21 may be bent/curved. One of the examples is for a mirror or partial mirror. However, bends may cause optical aberration since they may alter angles of passing rays. The possible causes of this problem are described herein, and solutions are proposed to mitigate or eliminate the undesired effects of bends.

Figure 3B:
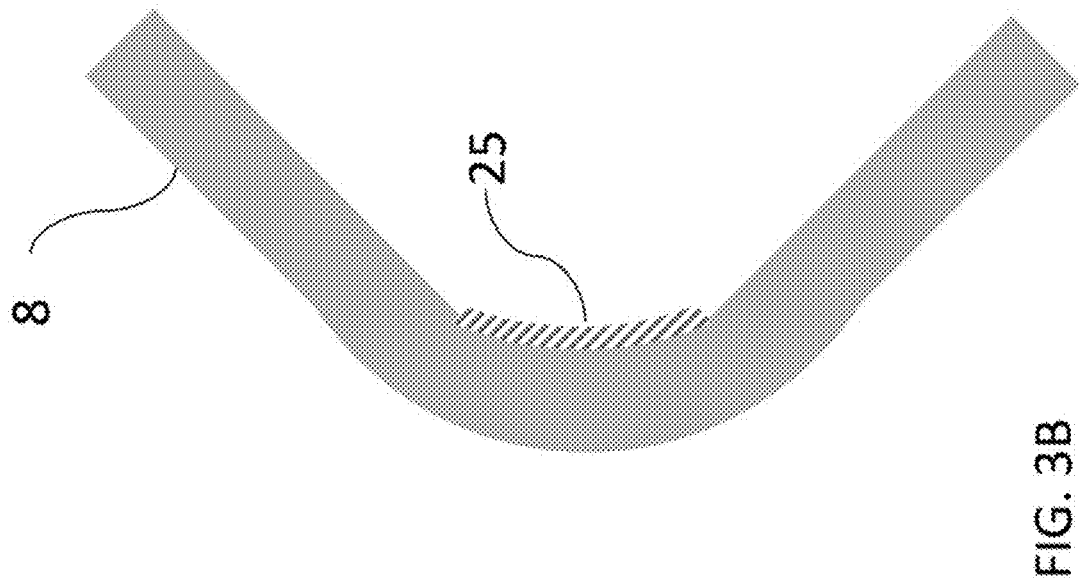
FIG. 3B is a schematic diagram showing a bend for light field optical fusion system, the bend including an integrated meta-corrector, in accordance with some implementations of the disclosure.
Figure 3A:
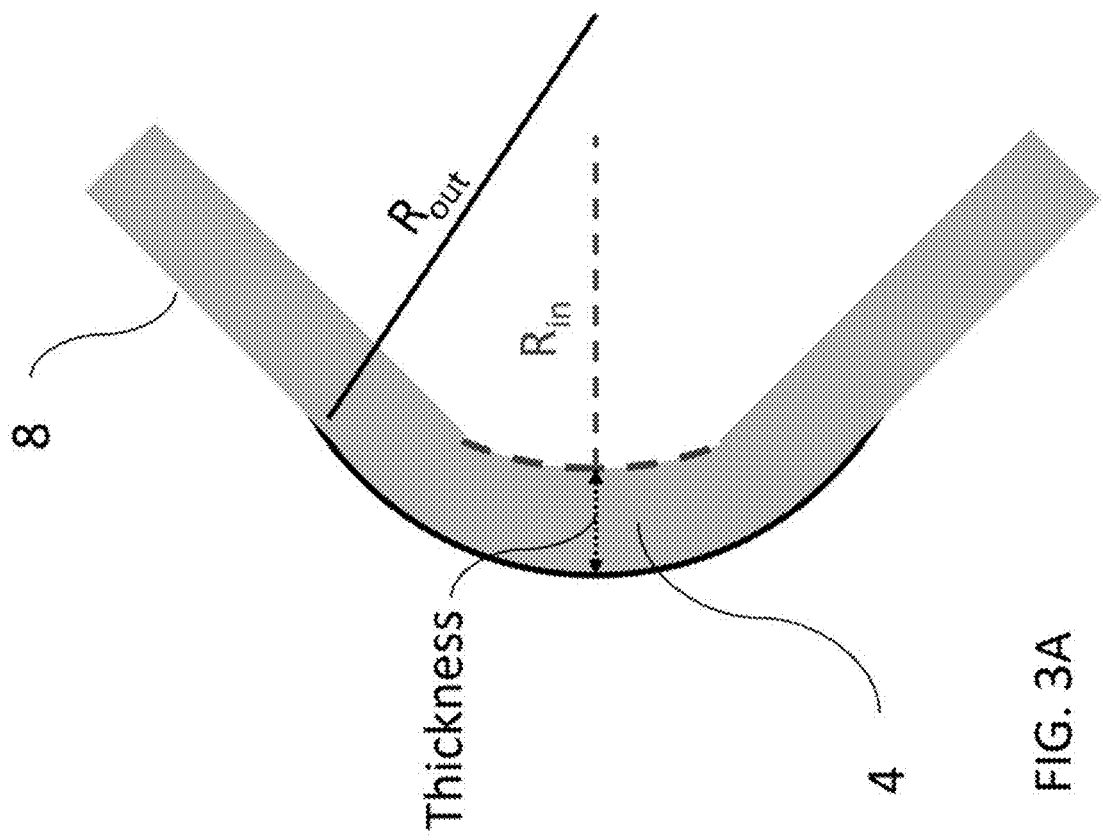
FIG. 3A is a schematic diagram showing a bend for light field optical fusion system, in accordance with some implementations of the disclosure.

FIGS. 3A-3D depict different proposed architectures of a bend 4, in accordance with implementations of the disclosure. In this case, the bend 4 is implemented as part of a reflective layer 8 (meaning they are merged to a single layer) used as a partially reflective mirror (partially reflects incoming light from the display and allow the rest—for example half of the light-to pass through) or polarization mirror (selectively reflects a specific polarization of light and transmits the other perpendicular polarization). Referring to FIG. 3A, consider an extreme case of having a 90 degree bend 4. In this case, the inner and outer surface profiles of the bend 4 may be approximated with circles with a radius of Rut and $R_{out}$ respectively. For simplicity of illustration, a 2D case is assumed. In a 3D case, a sphere instead of a circle may be assumed.

Referring to FIG. 3B, this case is similar to the case of FIG. 3A, except that the bend 4 includes an integrated meta-corrector 25 on the inner facet of the bend 4. The meta-corrector 25 may alternatively be placed on the outer facet of the bend, or one meta-corrector may be placed on the inner facet, and the other meta-corrector may be placed on the outer facet of the bend 4. The use of two meta-correctors may provide more parameters to optimize the bend performance.

Figure 3D:
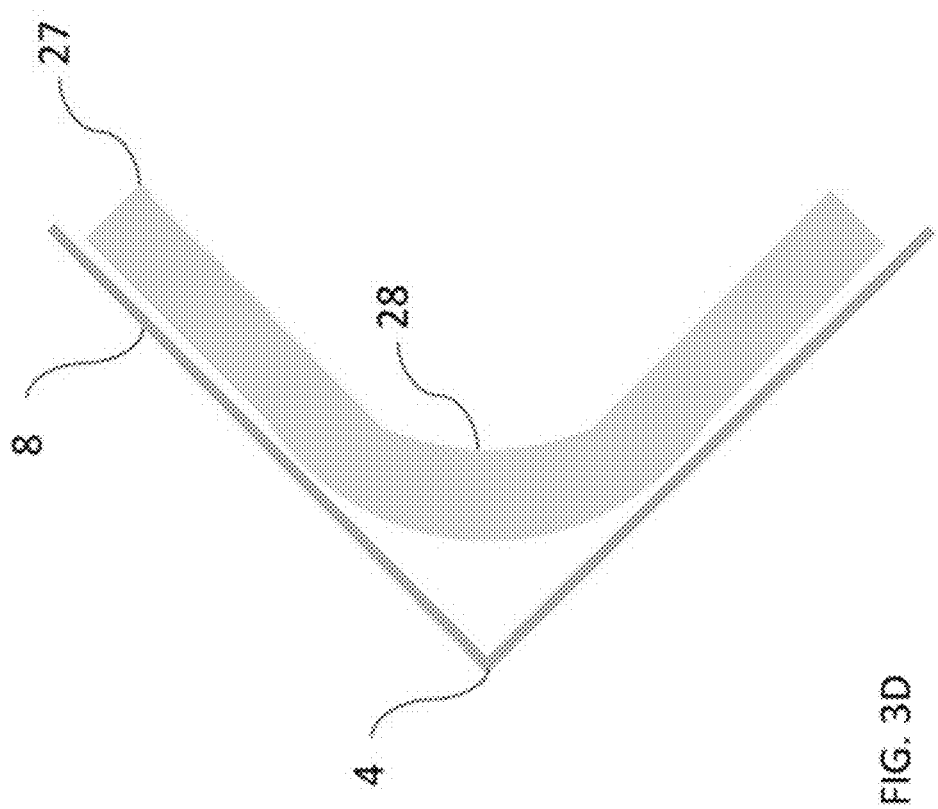
FIG. 3D is a schematic diagram showing a bend for light field optical fusion system, the bend stacked with another component that compensates for aberrations caused by the bend, in accordance with some implementations of the disclosure.
Figure 3C:
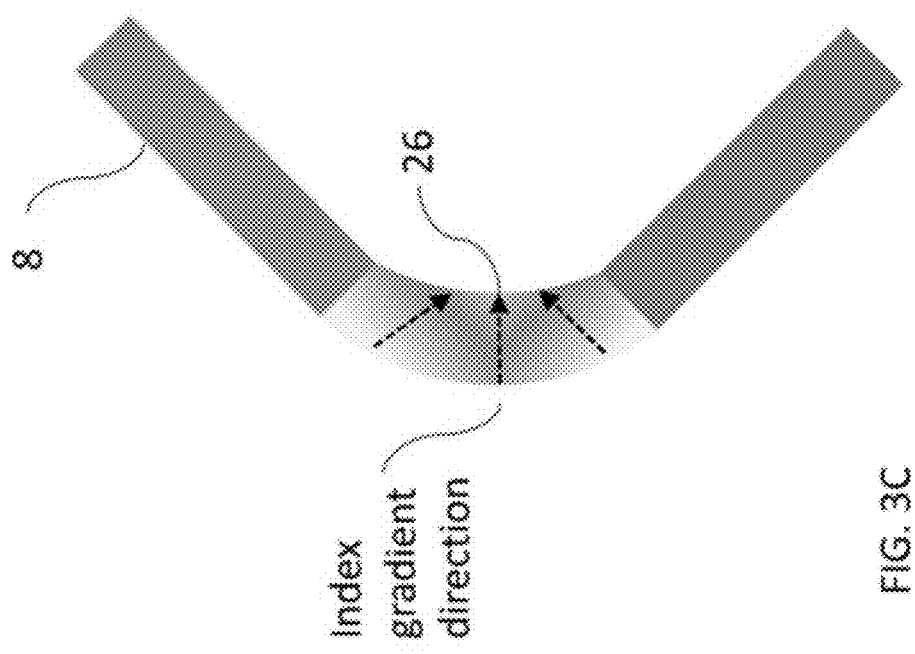
FIG. 3C is a schematic diagram showing a bend for light field optical fusion system, the bend having a refractive index graded along the bend to minimize aberration, in accordance with some implementations of the disclosure.

Referring to FIG. 3C, in this case a bend 26 has a refractive index that is graded along the bend to minimize aberration caused by the bend. Referring to FIG. 3D, in this case an ultra-small bend 4 is stacked with another component 27 that compensates for aberrations caused by the bend 4. The sub-component 28 may be considered another bend with one main difference: sub-component 28 has an anti-reflection coating on it and only refracts the rays in such a way to correct aberrations caused by the bend 4.

Figure 4A:
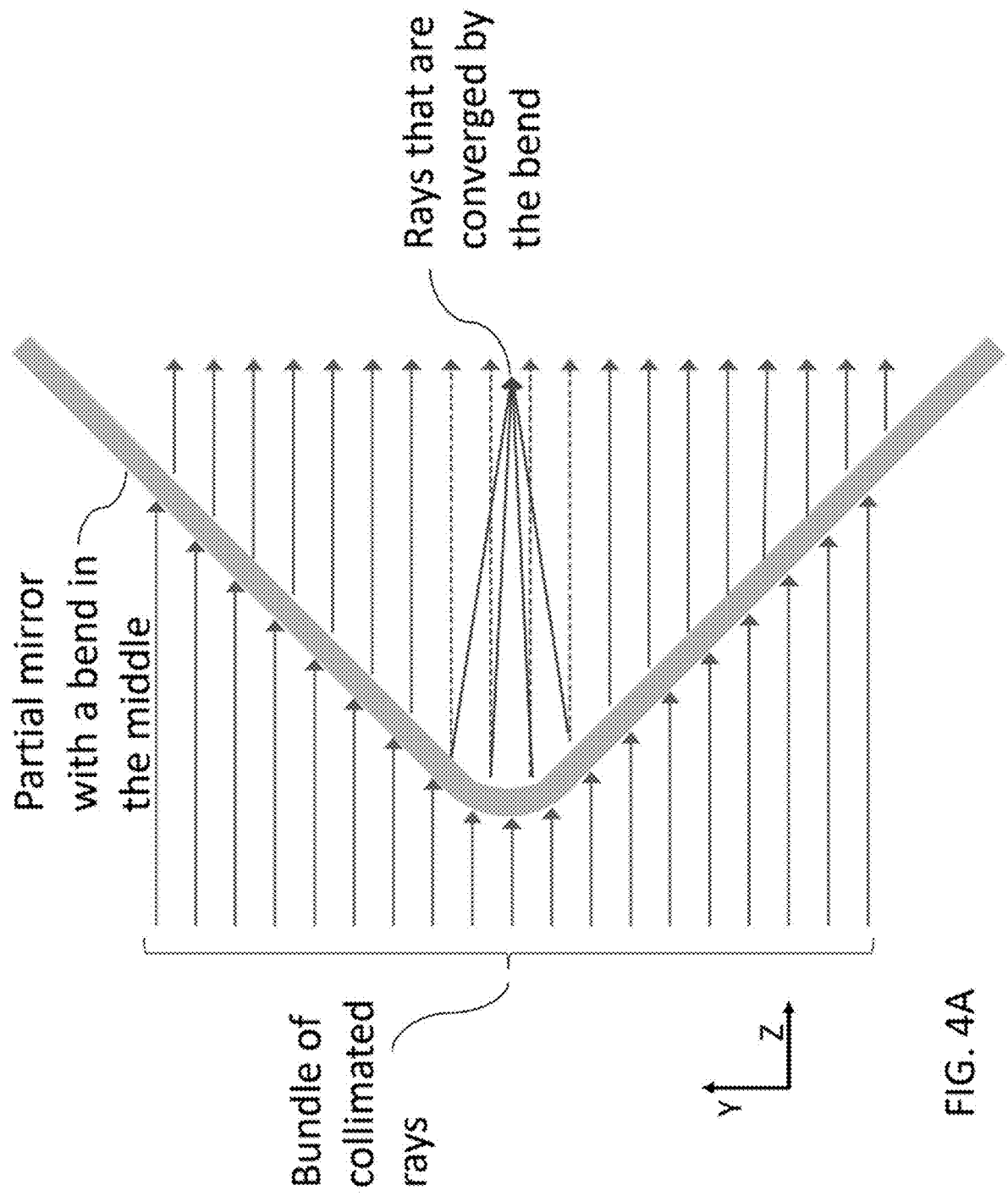
FIG. 4A shows a partial mirror of a system showing transmission of a bundle of rays through the bend in the middle of the partial mirror.
Figure 4B:
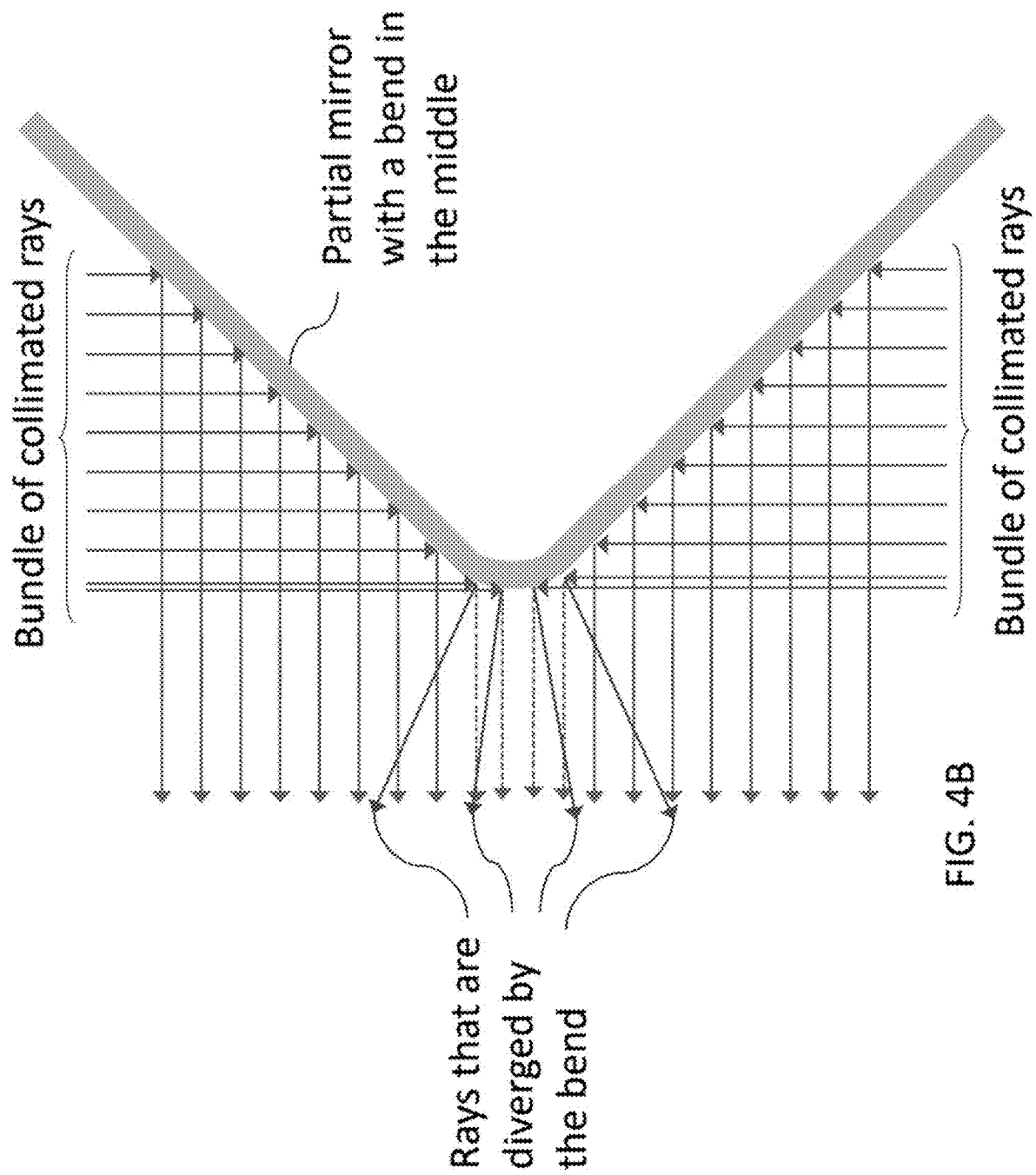
FIG. 4B shows a partial mirror of a system showing a reflection of a bundle of rays through the bend.

FIG. 4A shows a partial mirror of a system showing transmission of a bundle of rays through the bend in the middle of the partial mirror. The partial mirror (e.g. beam splitter, polarization mirror) includes top and bottom flat sections connected via a curved section (bend). Collimated light passing through this partial mirror first experiences refraction (some part of the light may also reflect back, not shown here) due to the index mismatch between the component (glass refractive index is 1.53) and the surrounding medium. When rays exit from the opposite side of the flat sections, they refract again to their original angle (before the component). The original angles of rays are preserved after passing through the flat sections due to having the same surrounding medium everywhere and assuming the flat sections consist of two parallel surfaces. However, rays passing through the bend experience optical power, and their angles change. This optical power is due to the fact that the surface normal of the bend section is a function of its position and it is different from the entrance facet (left-side, FIG. 4A) of the bend to the exit facet (right-side, FIG. 4A) of the bend. This undesired effect is conceptually shown in FIG. 4A where part of the rays that interact with the bend converge (rays may also diverge after a bend or randomly scatter after the bend, depending on parameters of bend such as its radius of curvature and thickness) after the component resulting in optical aberrations (altering the wavefront). FIG. 4B shows a partial mirror of a system showing a reflection of a bundle of rays through the bend. The bend of the partial mirror is in the reflection mode and some rays are scattered/diverged by the bend, causing optical aberration.

In accordance with implementations, the bend may be designed with minimized aberrations based on the architectures shown in FIGS. 3A-3D.

Assuming a 2D bend whose inner and outer surfaces have circular profiles (FIG. 3A), several parameters in the design may be optimized to mitigate the aberrations of the bend, including inner radius ($R_{in}$), outer radius ($R_{out}$), thickness, and material refractive index. To evaluate the effectiveness of the design, a figure of merit is defined as an average angle deviation (AAD), where AAD is the average value of rays' angle errors due to interaction with the bend and is calculated as:

$$AAD = ave(\Sigma \Delta\theta) \quad (1)$$

where $\Delta\theta = |\theta_{out} - \theta_{in}|$, $\theta_{in}$ is the original angle of incoming rays (before bend), and $\theta_{out}$ is the output angle (after interaction with the bend). Unless otherwise stated, to calculate the AAD, the input angle is swept between −30 to 30 degrees, and bends with a thickness of 3 mm are considered. Also, only rays whose angles are altered by the bend are considered. The goal of the design and optimization process is to minimize this value, thus reducing the optical aberrations.

FIG. 5A-FIG. 5D show ray simulation results for optimizing bend parameters to enable a seamless optical fusion using different versions of circular bends, in accordance with some implementations of the disclosure. With reference to FIG. 5A-FIG. 5D, there are regions where the AAD is zero shown by white color 31 & 32. The region where AAD is nonzero is shown by light or dark grays. The lighter the gray, the smaller the AAD. The darker the gray, the larger the AAD. For any selected $R_{out}$, there exists an optimum $R_{in}$ that results in minimum AAD. For example, for $R_{out}$ of 7 mm, the optimum value of $R_{in}$ is 6.5 mm resulting in AAD=3.33 degrees. For different values of $R_{out}$, there is almost a fixed value ($R_{in} - R_{out}$) resulting in a minimum AAD shown by the dashed line 29 in FIG. 5A. In addition, for any fixed value of ($R_{in} - R_{out}$) increasing $R_{out}$ results in the reduction of AAD.

Figure 5A:
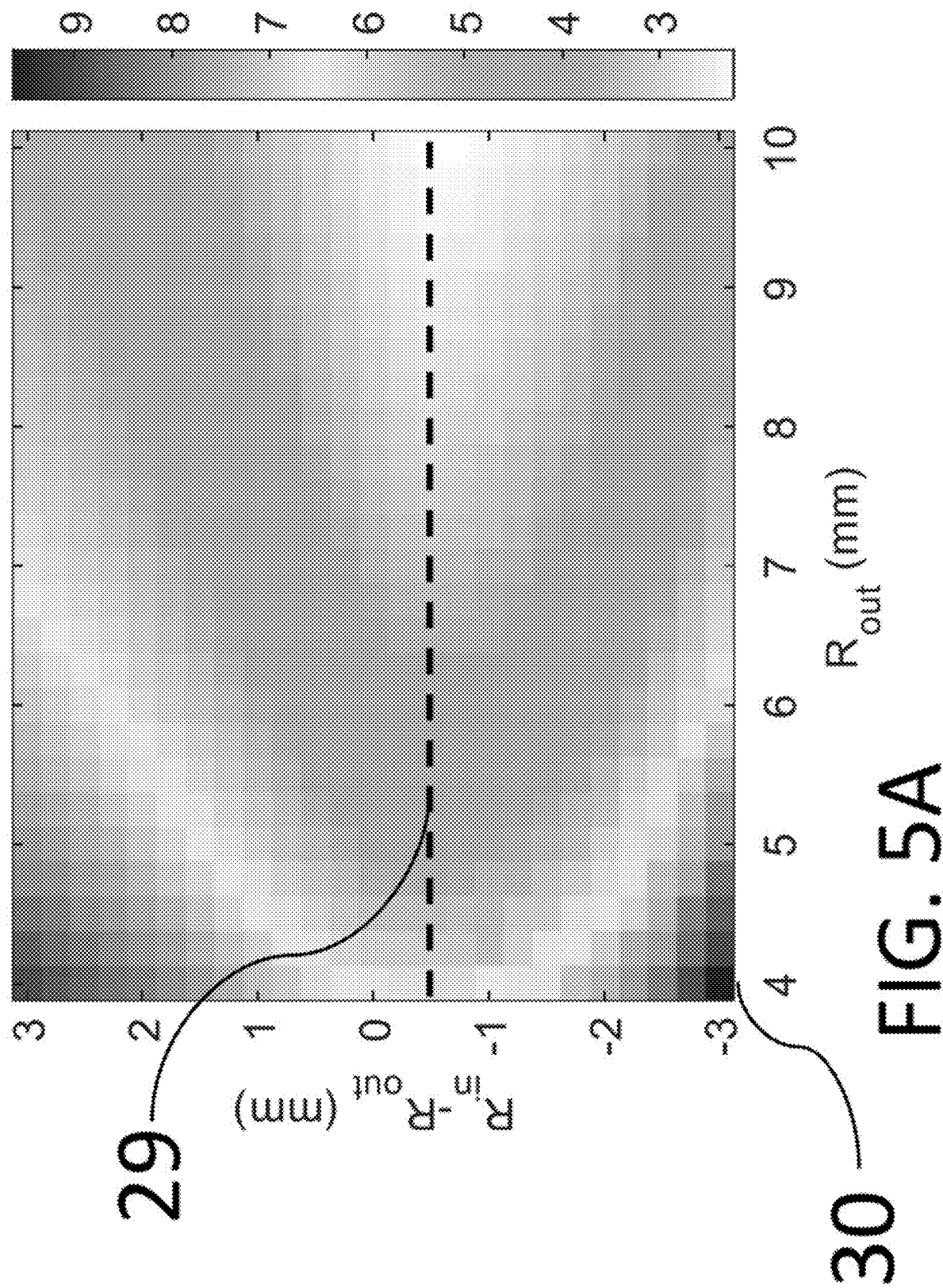
FIG. 5A shows simulation results showing the average value of rays' angle errors due to interaction with the bend as a function of the bend's inner and outer radius, in accordance with some implementations of the disclosure.
Figure 5B:
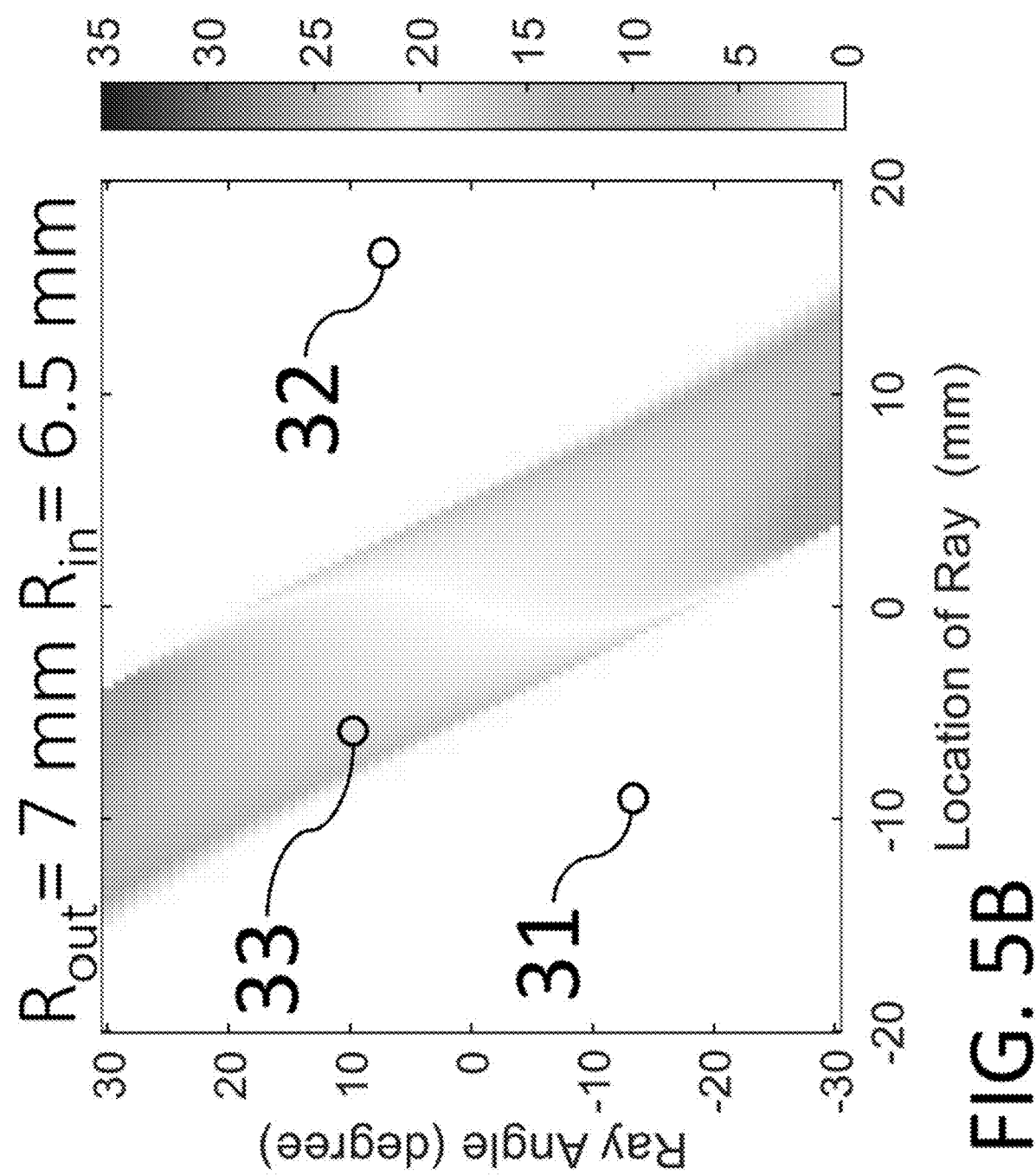
FIG. 5B shows simulation results showing the average value of rays' angle errors as a function of original positions of rays and their initial angle for a given bend inner radius and outer radius, in accordance with some implementations of the disclosure.
Figure 5C:
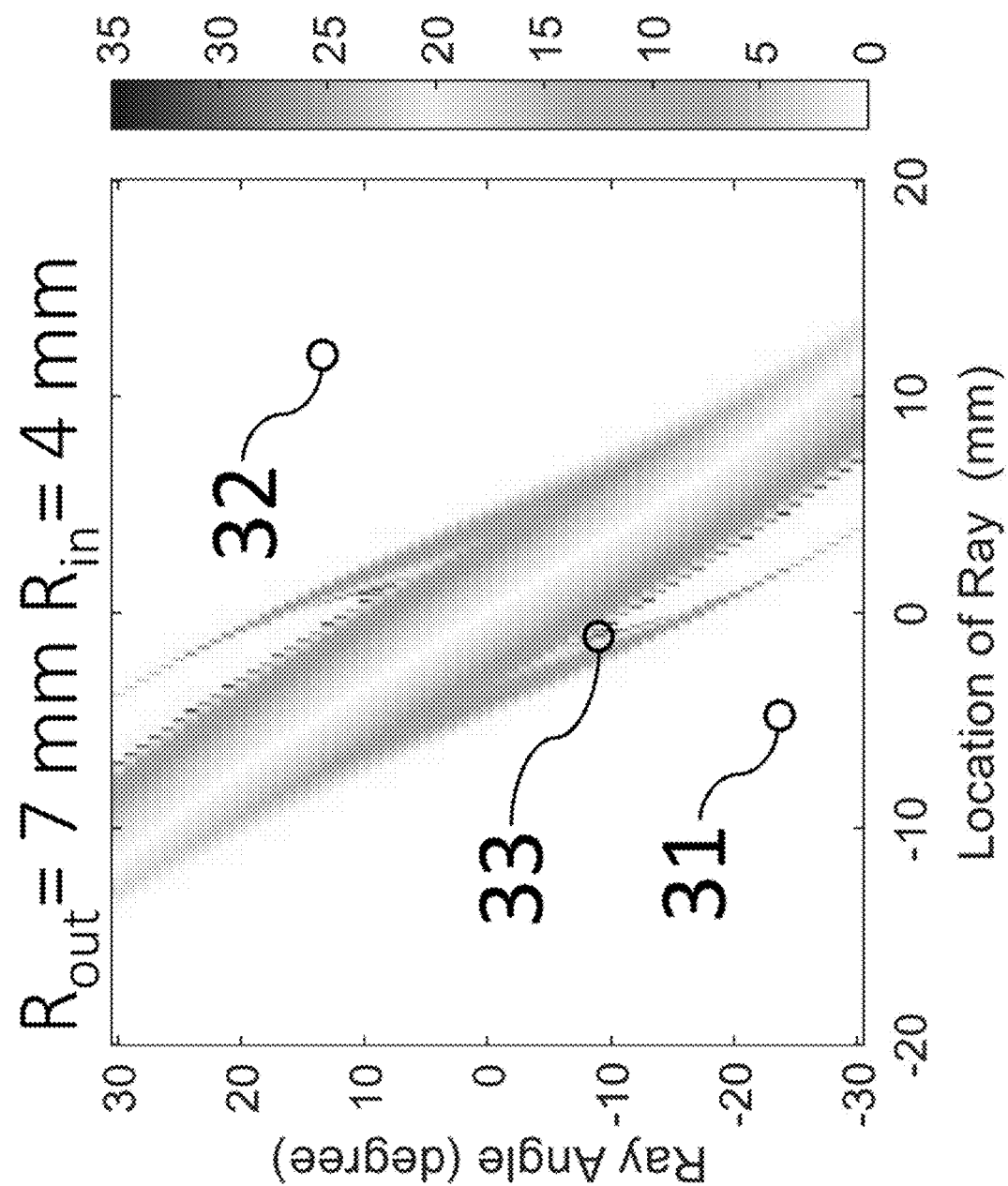
FIG. 5C shows simulation results showing the average value of rays' angle errors as a function of original positions of rays and their initial angle for a given bend inner radius and outer radius, in accordance with some implementations of the disclosure.
Figure 5D:
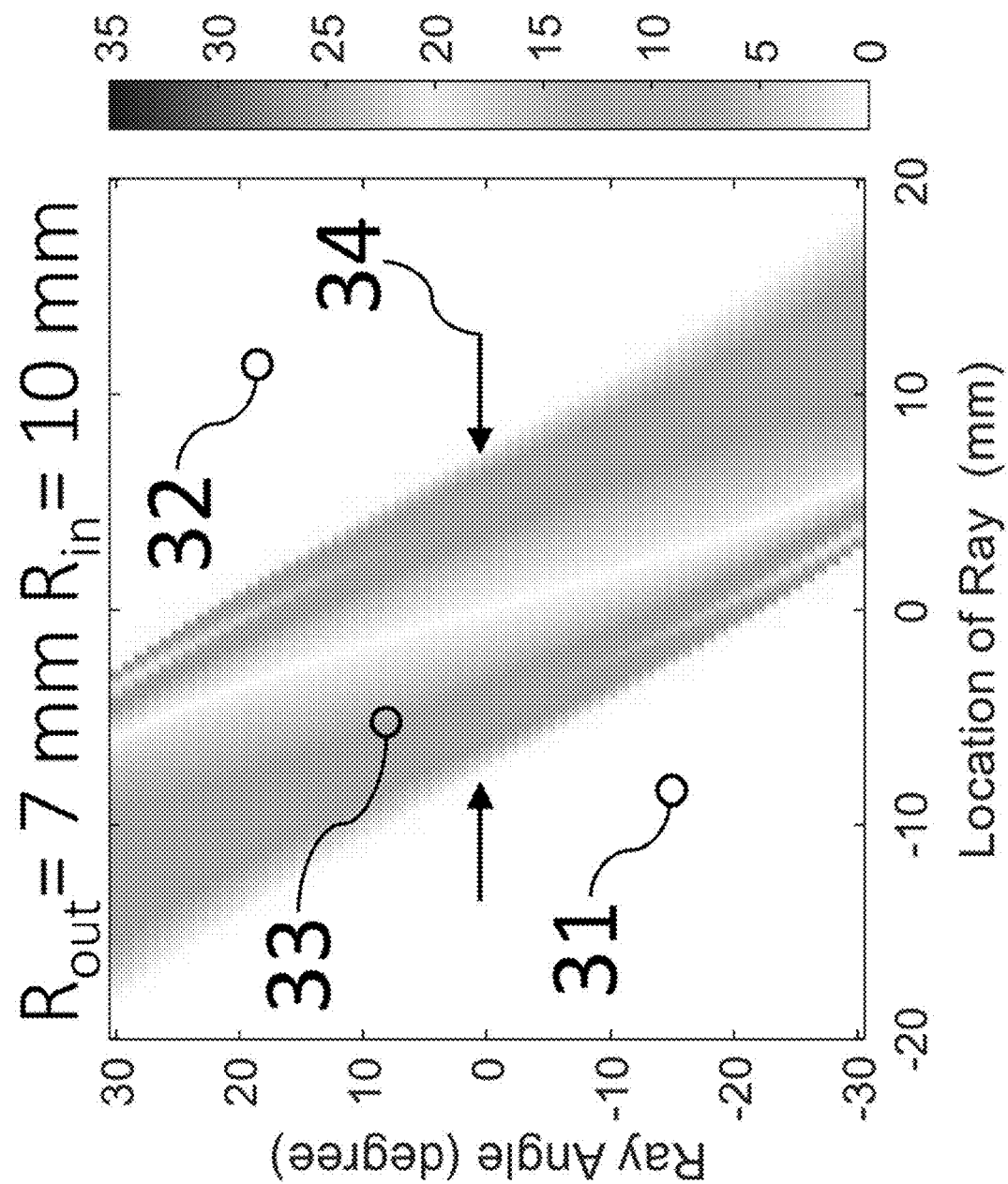
FIG. 5D shows simulation results showing the average value of rays' angle errors as a function of original positions of rays and their initial angle for a given bend inner radius and outer radius, in accordance with some implementations of the disclosure.

FIG. 5A shows the AAD as a function of the bend's inner and outer radius. Further, the AAD was calculated as a function of original positions of rays (position where rays originate from the light source 1) and their initial angle for three different cases: $R_{out}$=7 mm and $R_{in}$=6.5 mm (FIG. 5B), $R_{out}$=7 mm and $R_{in}$=4 mm (FIG. 5C), and $R_{out}$=7 mm and $R_{in}$=10 mm (FIG. 5D). As shown in FIG. 5C, the AAD may reach a maximum value of 35 degrees at region 33. It is notable that by reducing $R_{in}$ the length of the area (on display) where rays angles are altered by the bend reduces (shown by two arrows 34 in FIG. 5D) however, there is an optimal value for $R_{in}$ where AAD is minimized.

Figure 6A:
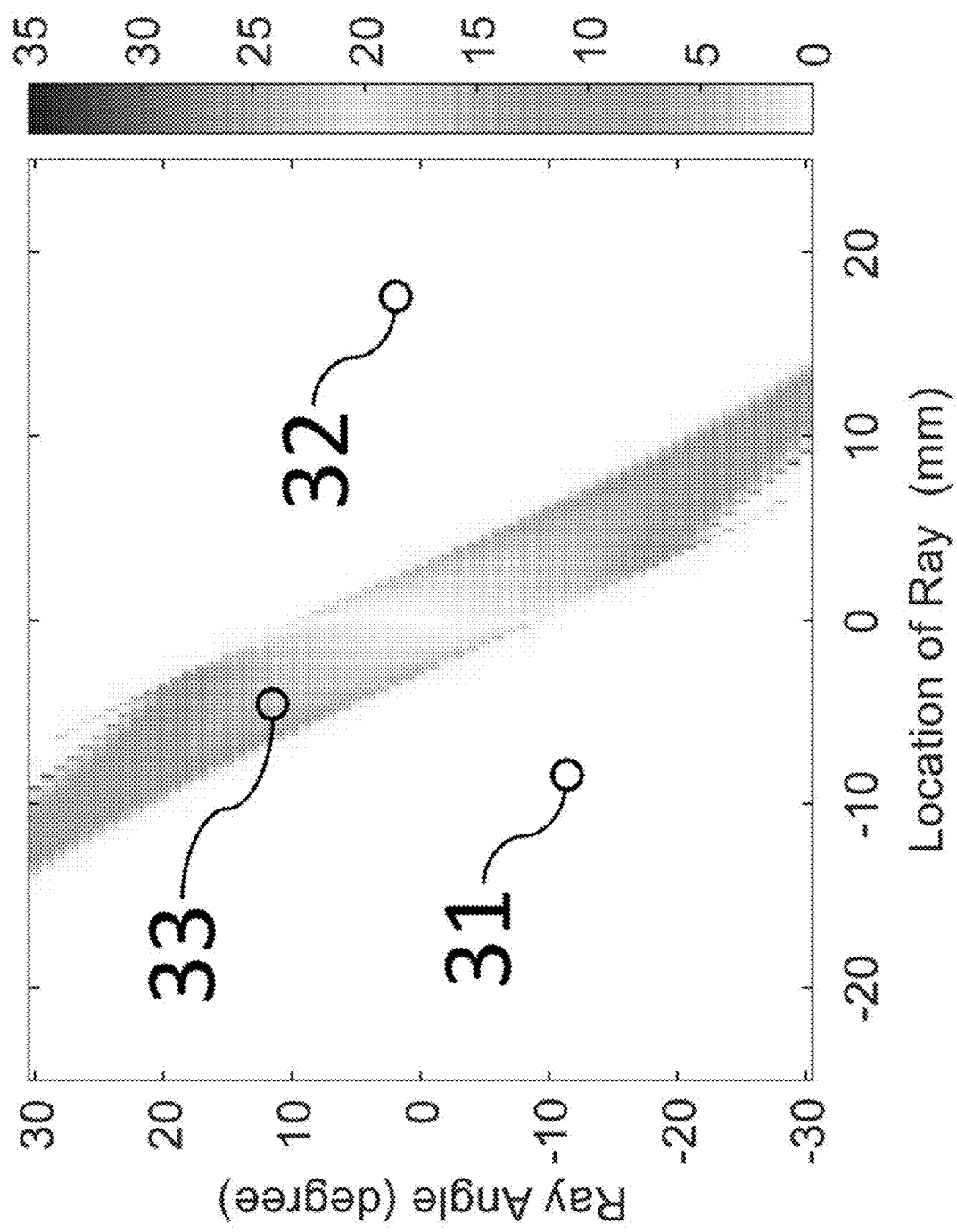
FIG. 6A shows simulation results showing the average value of rays' angle errors as a function of original positions of rays and their initial angle for a given circular bend inner radius and outer radius, in accordance with some implementations of the disclosure.
Figure 6B:
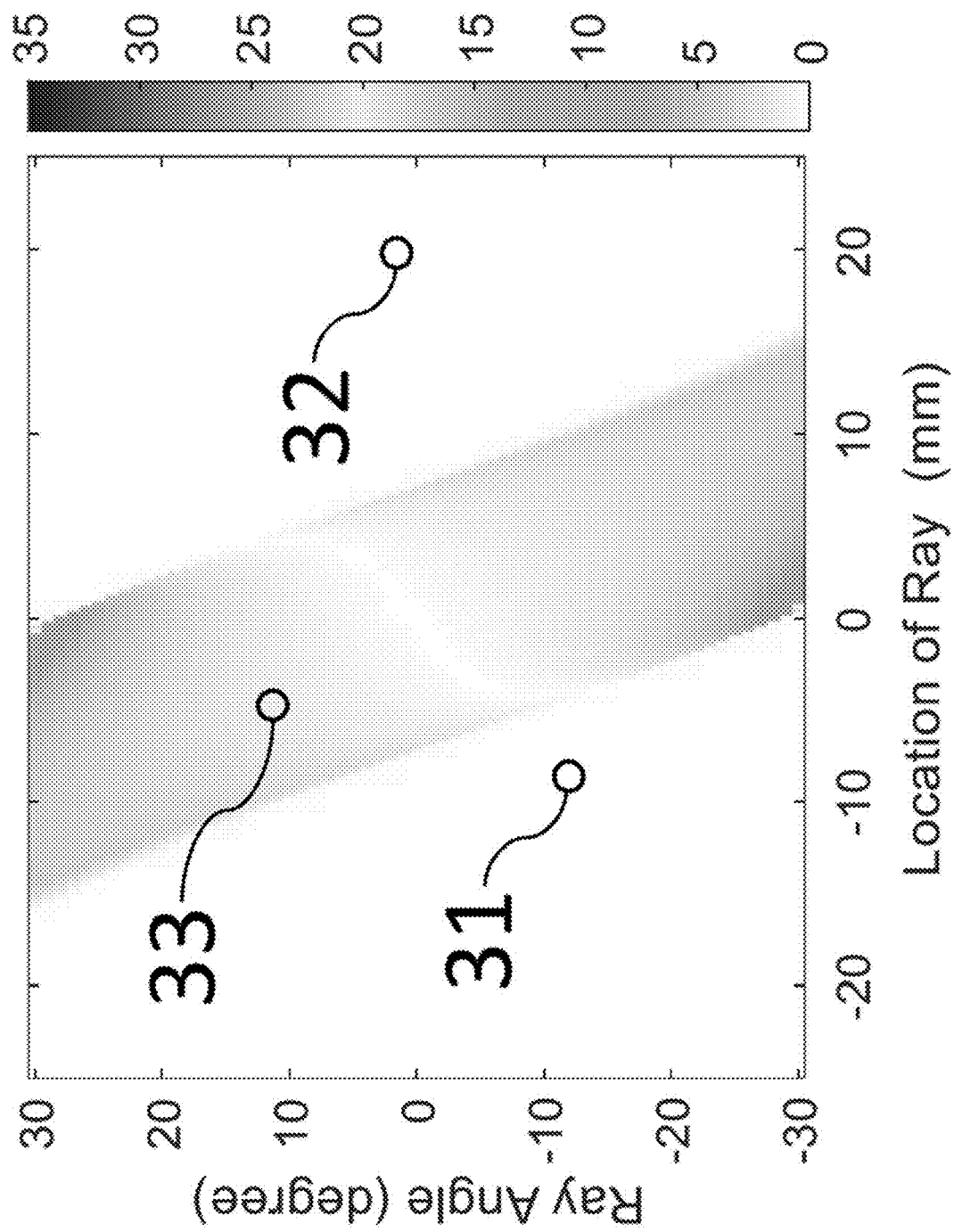
FIG. 6B shows simulation results showing the average value of rays' angle errors as a function of original positions of rays and their initial angle for a given circular bend inner radius and outer radius, in accordance with some implementations of the disclosure.
Figure 6C:
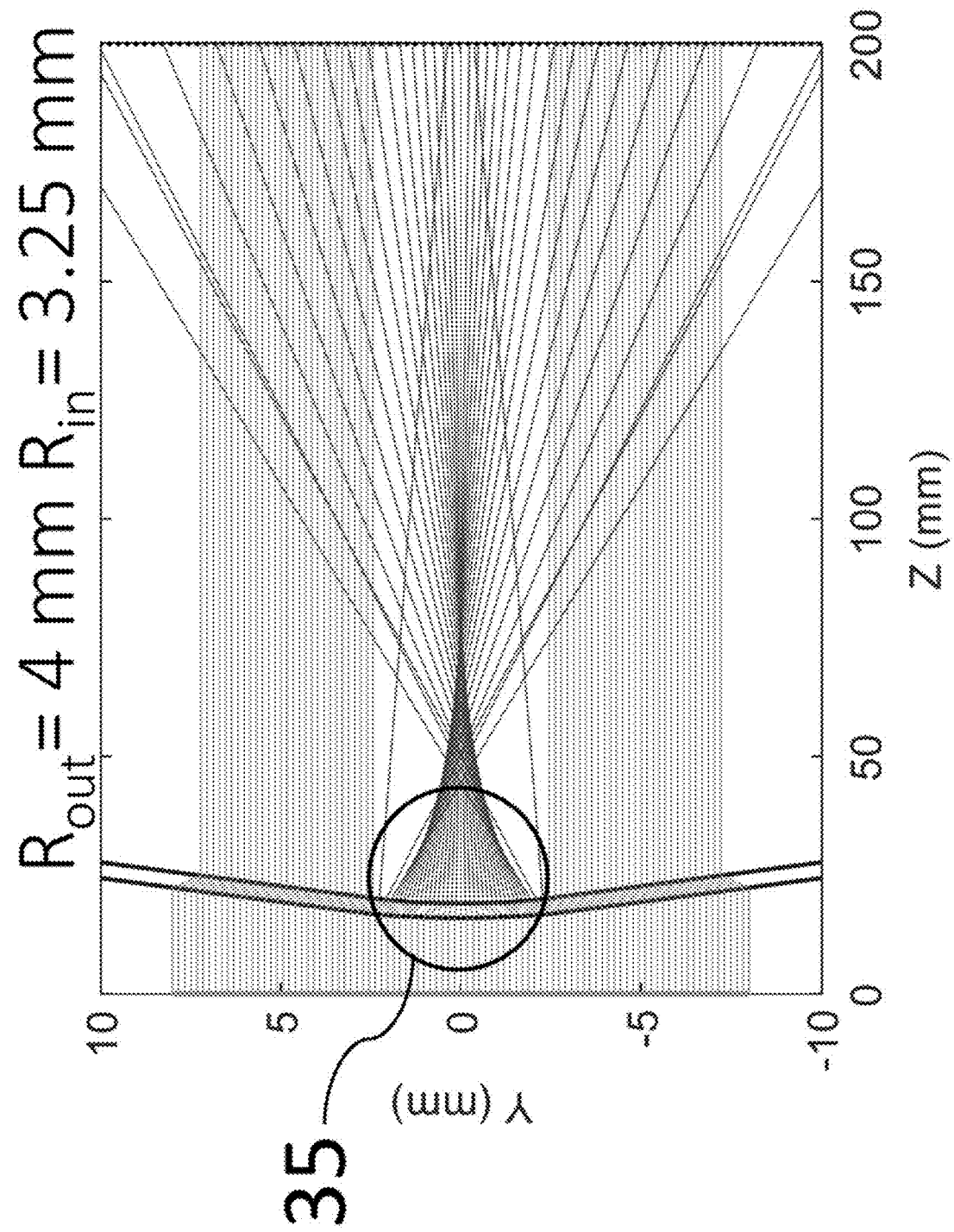
FIG. 6C shows simulation results including ray tracing analysis illustrating how a circular bend interacts with collimated rays for a smaller bend outer radius, in accordance with some implementations of the disclosure.
Figure 6D:
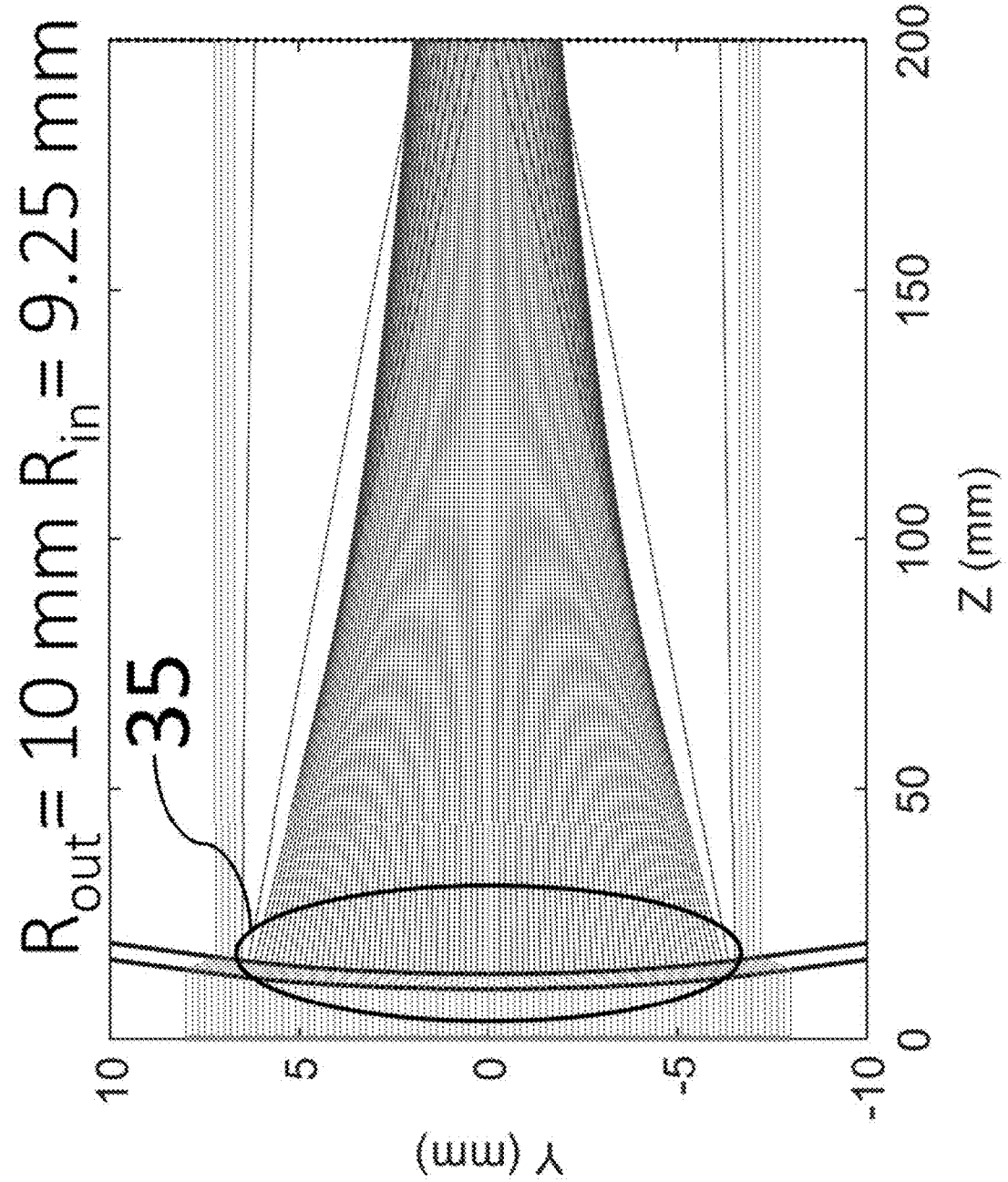
FIG. 6D shows simulation results including ray tracing analysis illustrating how a circular bend interacts with collimated rays for a larger bend outer radius, in accordance with some implementations of the disclosure.

FIGS. 6A-6D show simulation results for circular bends to indicate the invisibility region, in accordance with some embodiments. In particular, FIGS. 6A-6D show the effect of the bend on an incoming ray angle for different $R_{out}$ and fixed $R_{in} - R_{out}$ = −0.75 mm. FIG. 6A and FIG. 6B show AAD as a function of the location of the ray at the display and its original angle for $R_{out}$=4 mm and $R_{in}$=3.25 mm (FIG. 6A) and $R_{out}$=10 mm and $R_{in}$=9.25 mm (FIG. 6B). For both FIG. 6A and FIG. 6B, the optimized value of $R_{in}$ is selected based on simulations in FIG. 5A. Increasing $R_{out}$ results in the reduction of AAD. This is illustrated in Ray tracing analysis in FIG. 6C and FIG. 6D showing how bend interacts with collimated rays ($\theta_{in}$=0). For smaller $R_{out}$ (FIG. 6C), rays passing through the bend 35 are converged much faster (larger AAD) whereas, for the larger $R_{out}$ (FIG. 6D), the divergence effect is less.

Figure 7A:
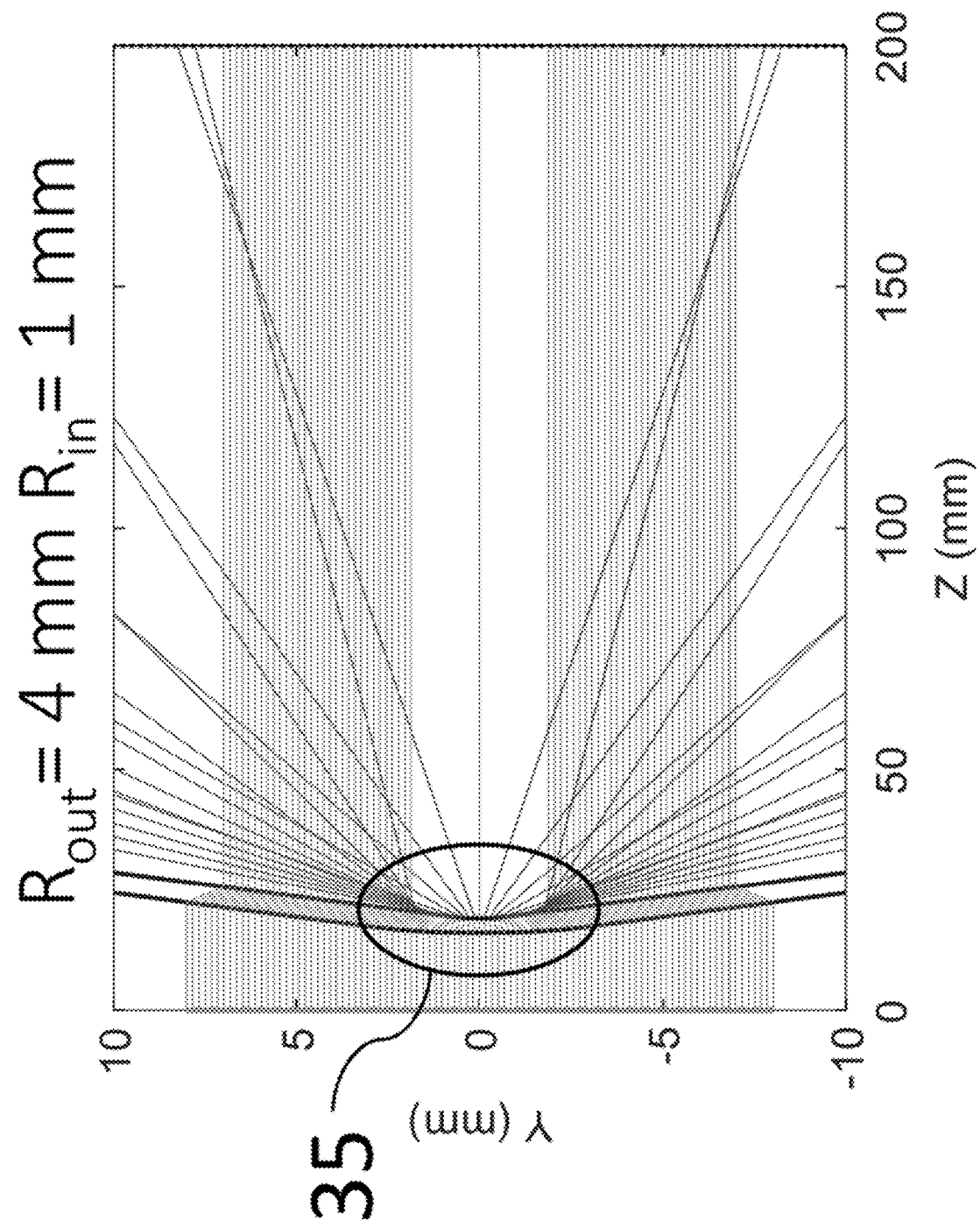
FIG. 7A shows simulation results including ray tracing analysis illustrating how a concentric circular bend interacts with collimated rays, in accordance with some implementations of the disclosure.
Figure 7B:
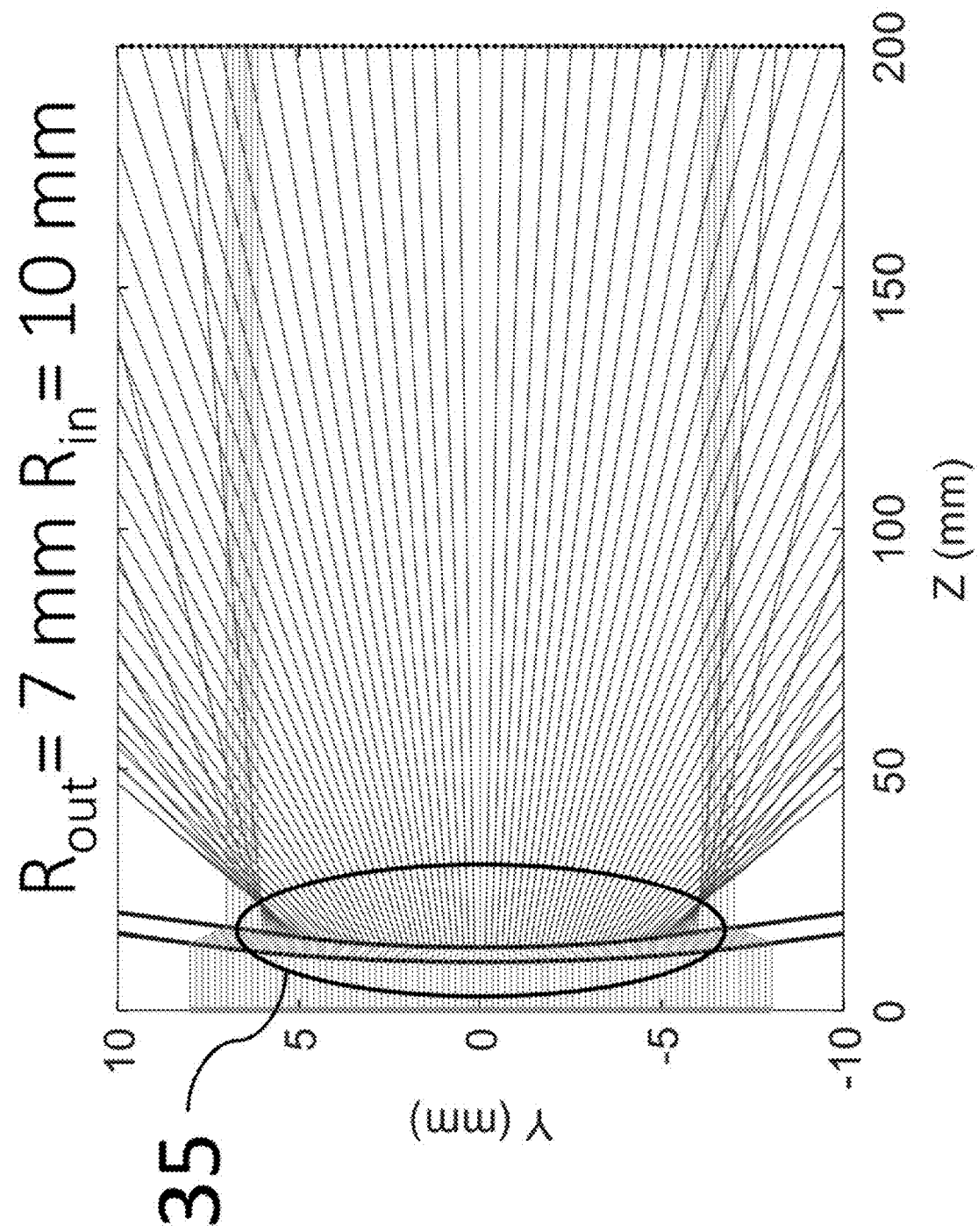
FIG. 7B shows simulation results including ray tracing analysis illustrating how a concentric circular bend interacts with collimated rays, in accordance with some implementations of the disclosure.

FIG. 7A-FIG. 7B show simulation results evaluating concentric circular bends to indicate the invisibility region, in accordance with some embodiments. In particular, FIG. 7A and FIG. 7B show special cases where the center of the inner and outer circle of the bend coincides (concentric circles). FIG. 7A shows the ray-tracing analysis for a bend with $R_{out}$=4 mm and $R_{in}$=1 mm and thickness of 3 mm. It is clear that the bend significantly alters incoming angle of the ray. The aberration from the bend may be reduced by increasing the radius of curvature as shown in FIG. 7B, however, the aberration is still higher than other cases where inner and outer curvatures are not parts of concentric circles.

Figure 8:
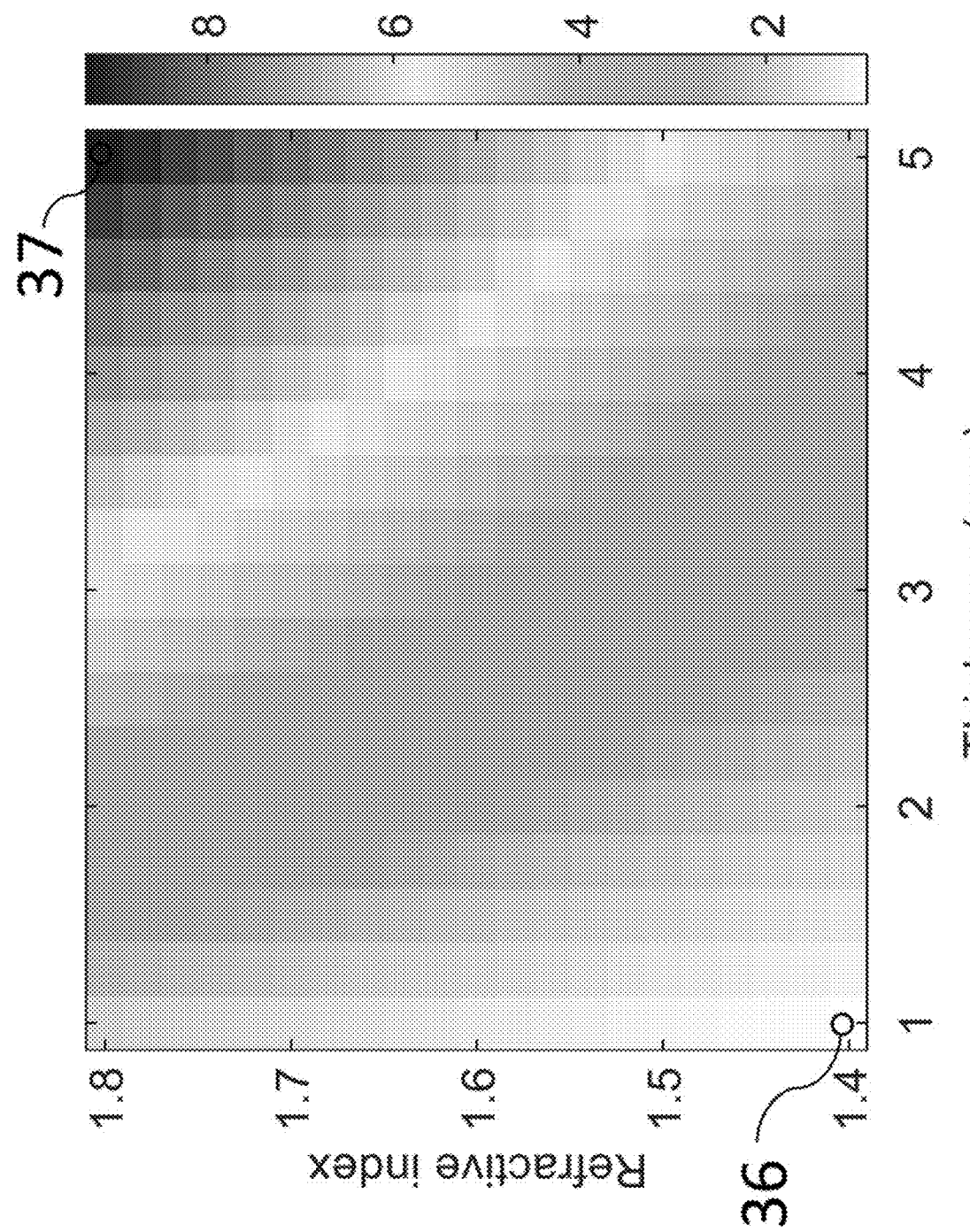
FIG. 8 shows simulation results showing the average value of rays' angle errors due to interaction with the bend as a function of the bend's thickness and refractive index, in accordance with some implementations of the disclosure.

FIG. 8 shows the AAD as a function of a bend's thickness and refractive index. As shown, the thicker the bend the higher the AAD. Similarly, increasing the refractive index escalates AAD. Accordingly, it is preferable to have a bend with the lowest refractive index and smallest thickness (36) and avoiding higher refractive index and larger thickness (37).

Figure 9A:
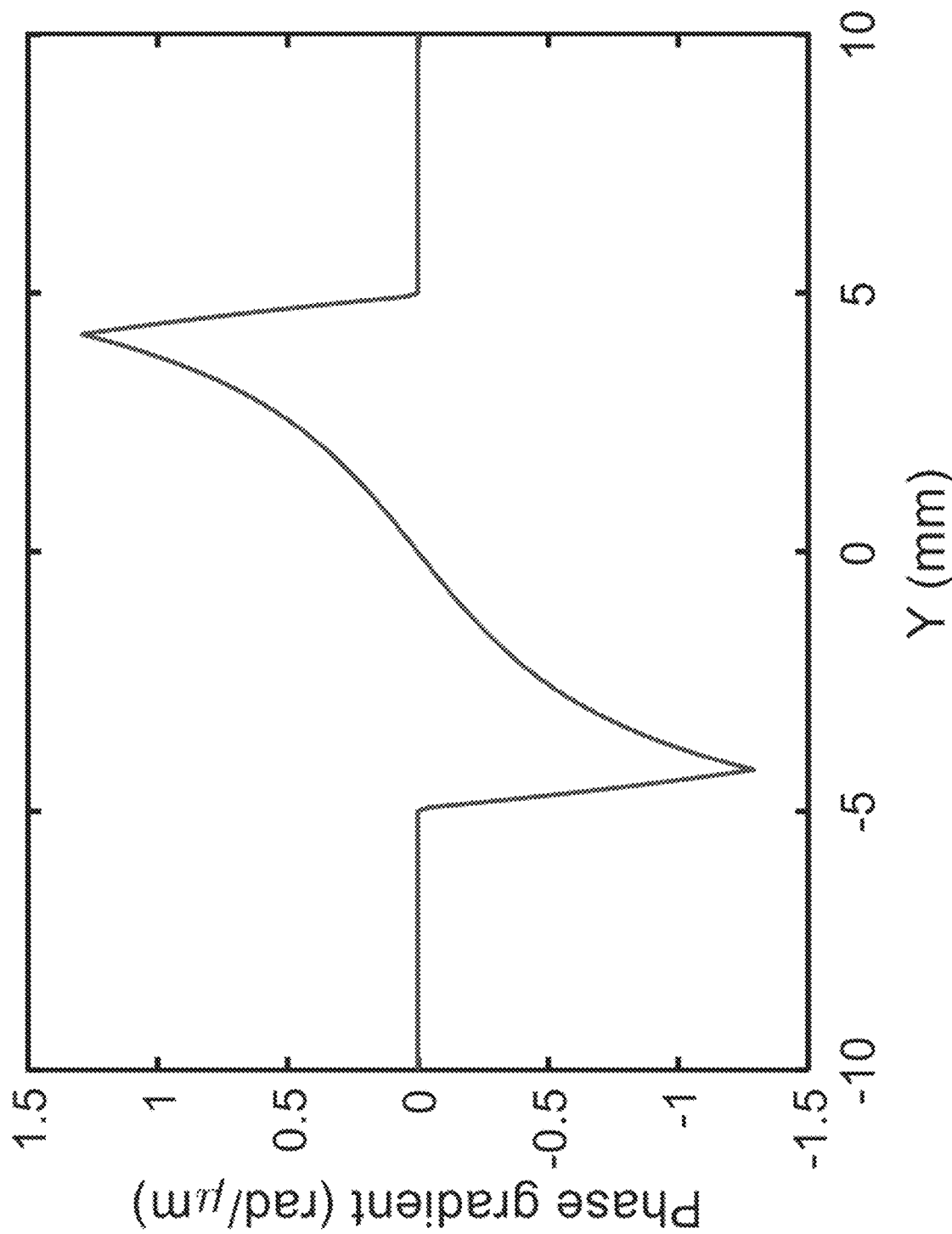
FIG. 9A shows the phase gradient of a metasurface as a function Y, in accordance with some implementations of the disclosure.
Figure 9B:
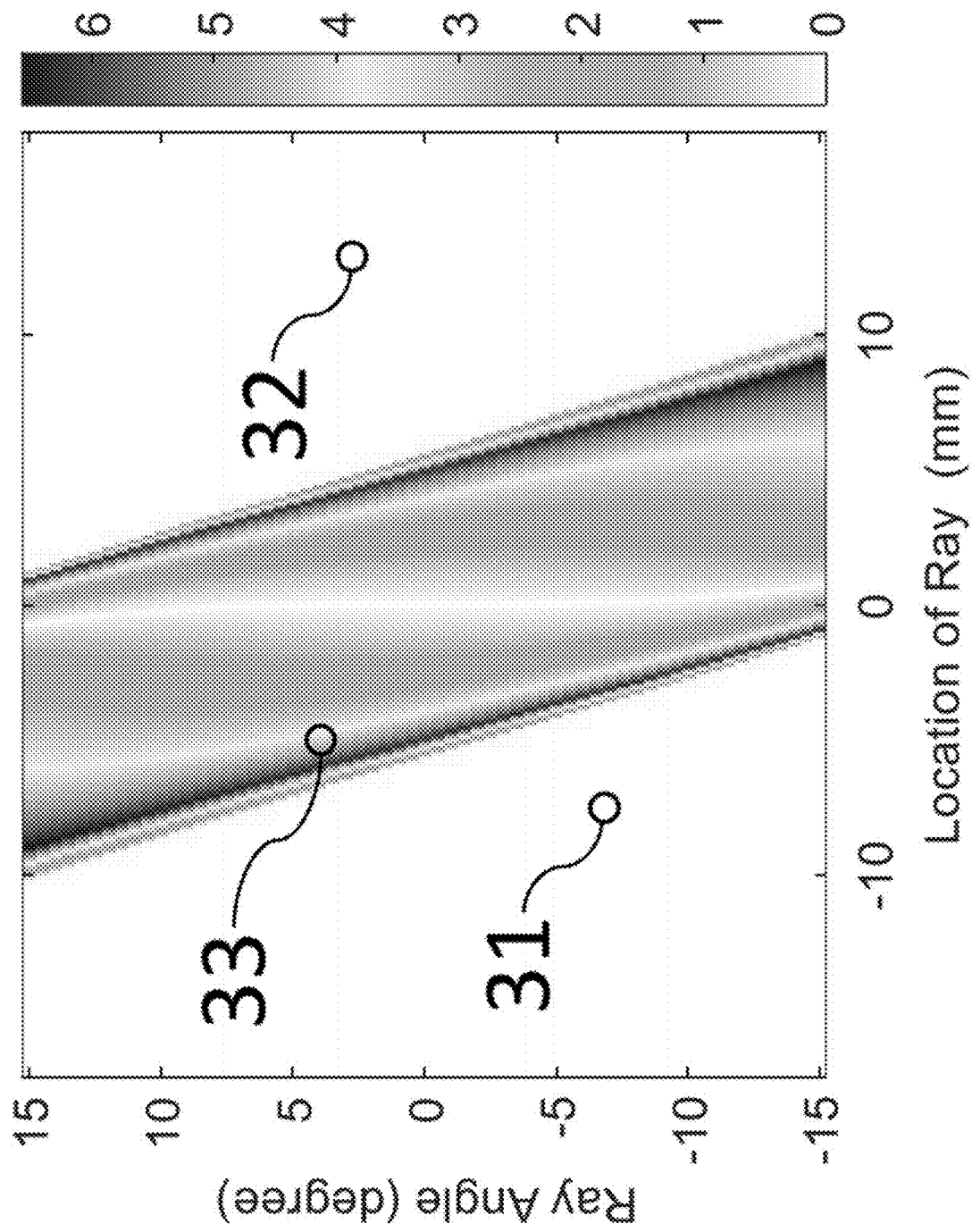
FIG. 9B shows simulation results showing the average value of rays' angle errors as a function of original positions of rays and their initial angle for a bend without a metasurface, in accordance with some implementations of the disclosure.
Figure 9C:
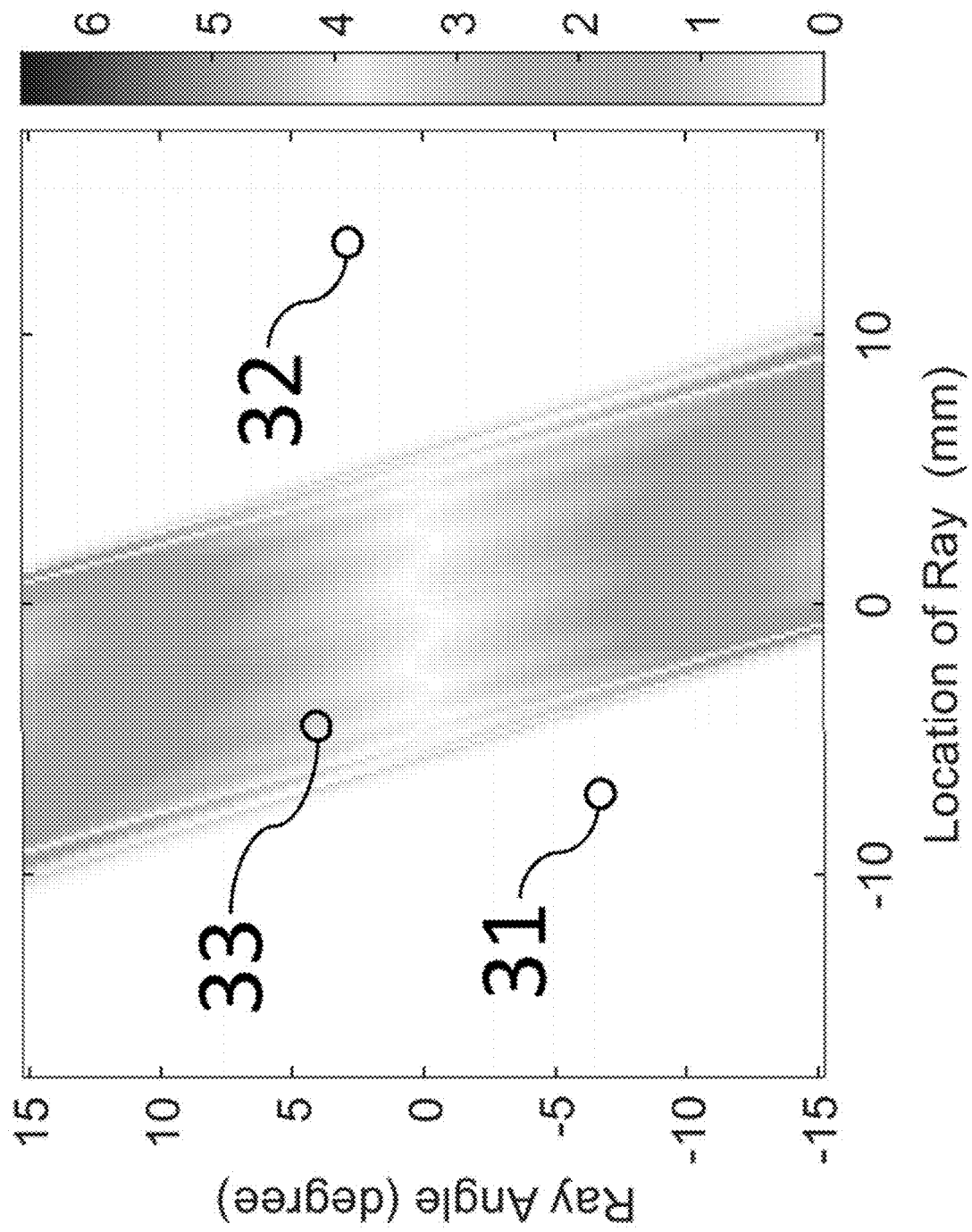
FIG. 9C shows simulation results showing the average value of rays' angle errors as a function of original positions of rays and their initial angle for a bend with a metasurface, in accordance with some implementations of the disclosure.
Figure 9D:
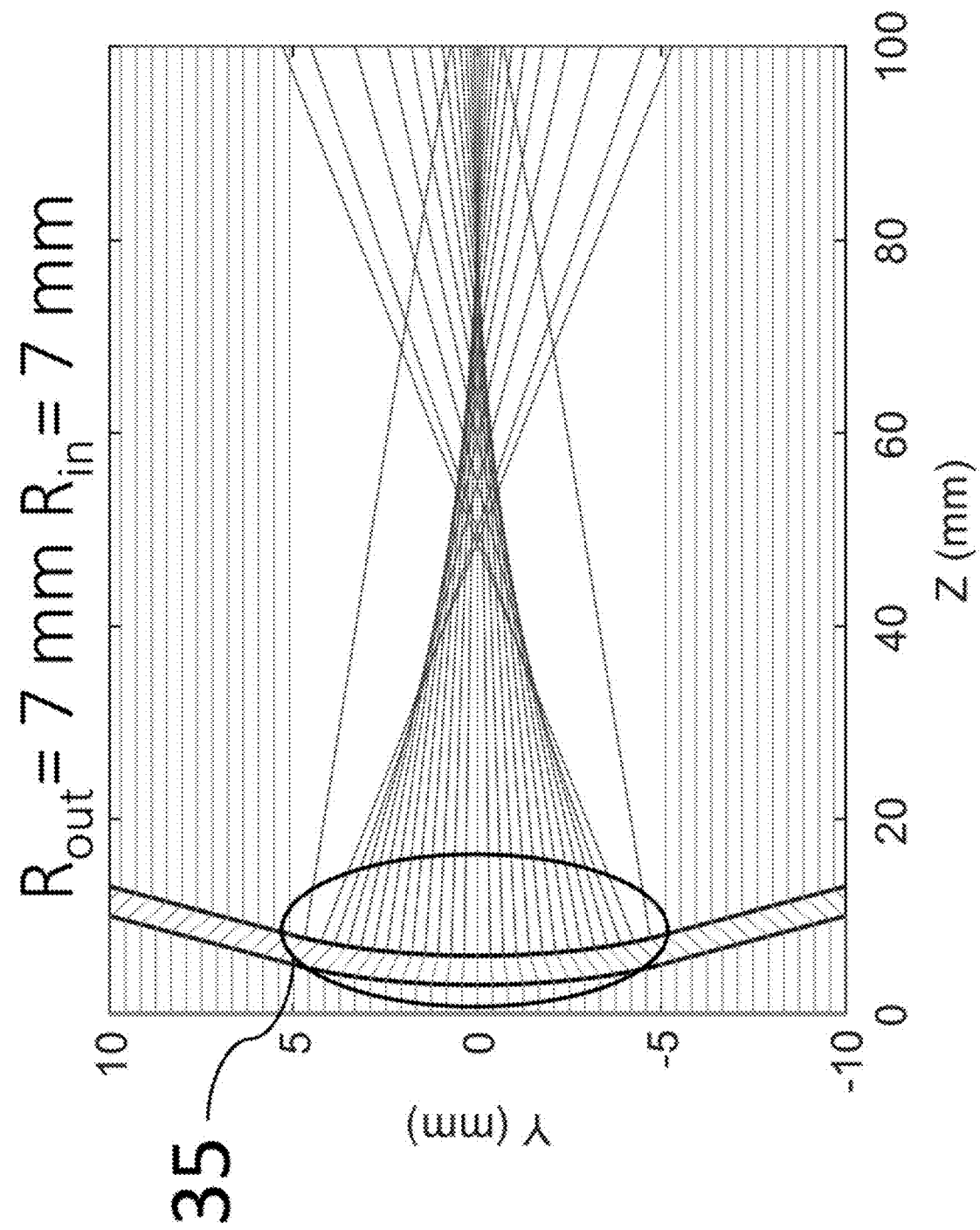
FIG. 9D shows simulation results including ray tracing analysis illustrating how a bend without metasurface interacts with collimated rays, in accordance with some implementations of the disclosure.
Figure 9E:
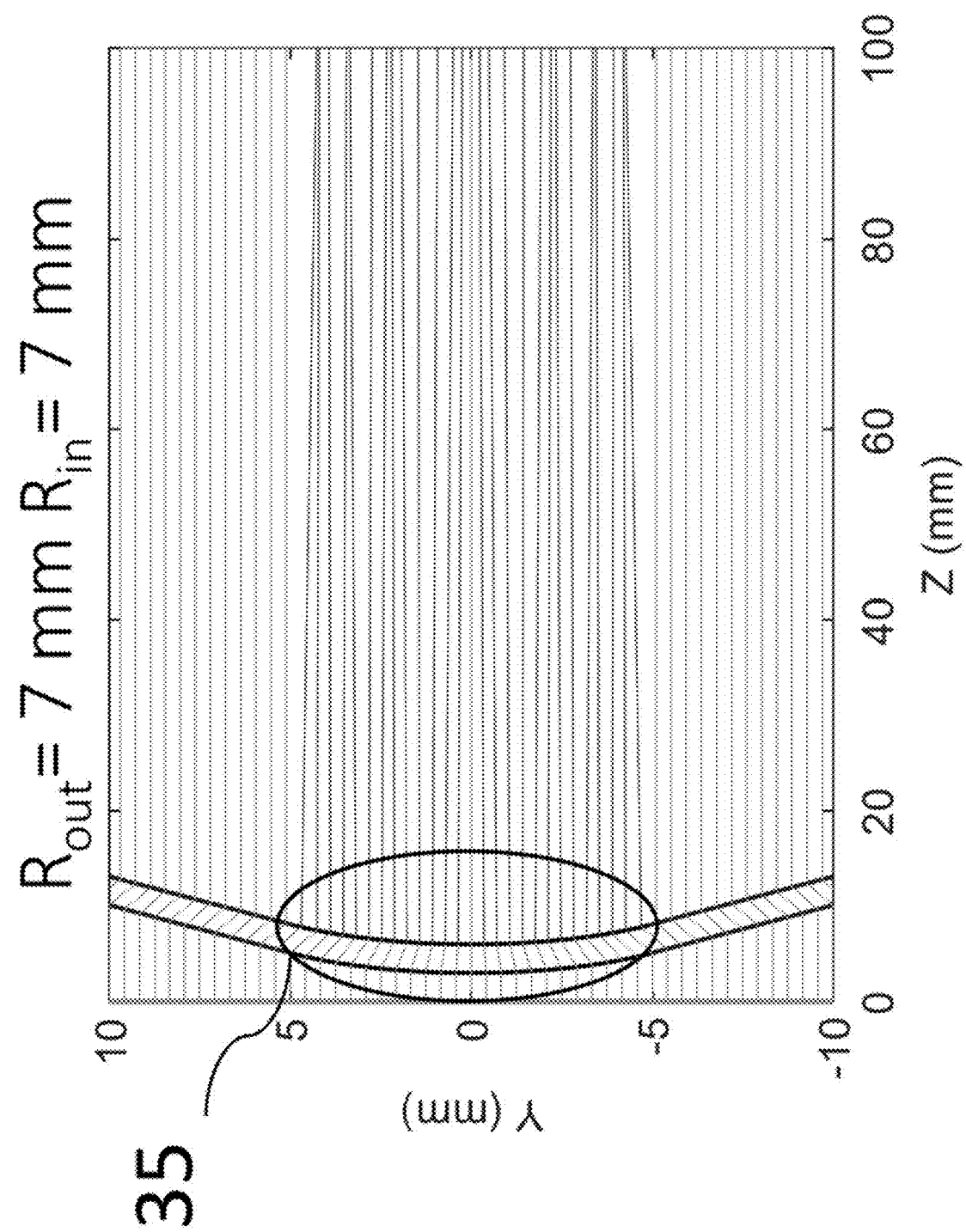
FIG. 9E shows simulation results including ray tracing analysis illustrating how a bend with metasurface interacts with collimated rays, in accordance with some implementations of the disclosure.

As discussed above, in addition to optimizing the inner and outer radius, the bend may be complemented with a metasurface (e.g., FIG. 3B) to correct the aberration caused by the bend. The potential advantages of a metasurface are considered with reference to FIGS. 9A-E. Here, the metasurface is considered to be placed on the inner surface of the bend (the metasurface may be placed on the outer surface or on both surfaces) and the required phase gradient of metasurface (FIG. 9A) as a function of Y (FIG. 4A) is calculated. To design the metasurface, first, a bend with $R_{out}$=7 mm and $R_{in}$=7 mm, thickness 3 mm (with no metasurface) is considered for calculating AAD as a function of the location of rays at the display and its original angle as shown in FIG. 9B. It is clear that the bend without metasurface notably deflects the center rays. Then, the phase gradient of the metasurface is calculated to minimize these angular deflections at each point on the inner surface of the bend. FIG. 9C shows the use of a metasurface significantly reduces the AAD. Ray-tracing simulations of this bend without and with metasurface are shown in FIG. 9D and FIG. 9E, respectively, highlighting the effect of a metasurface on reducing the optical aberrations. Further, the metasurface may be used to implement any phase gradient without the requirement of changing fabrication techniques which make it much easier to redesign and manufacture. For example, even if there is some tolerance in the manufacturing of the bend, it may be considered in the metasurface to achieve optimal performance. This may increase the manufacturing yield and reduce costs.

Figure 10A:
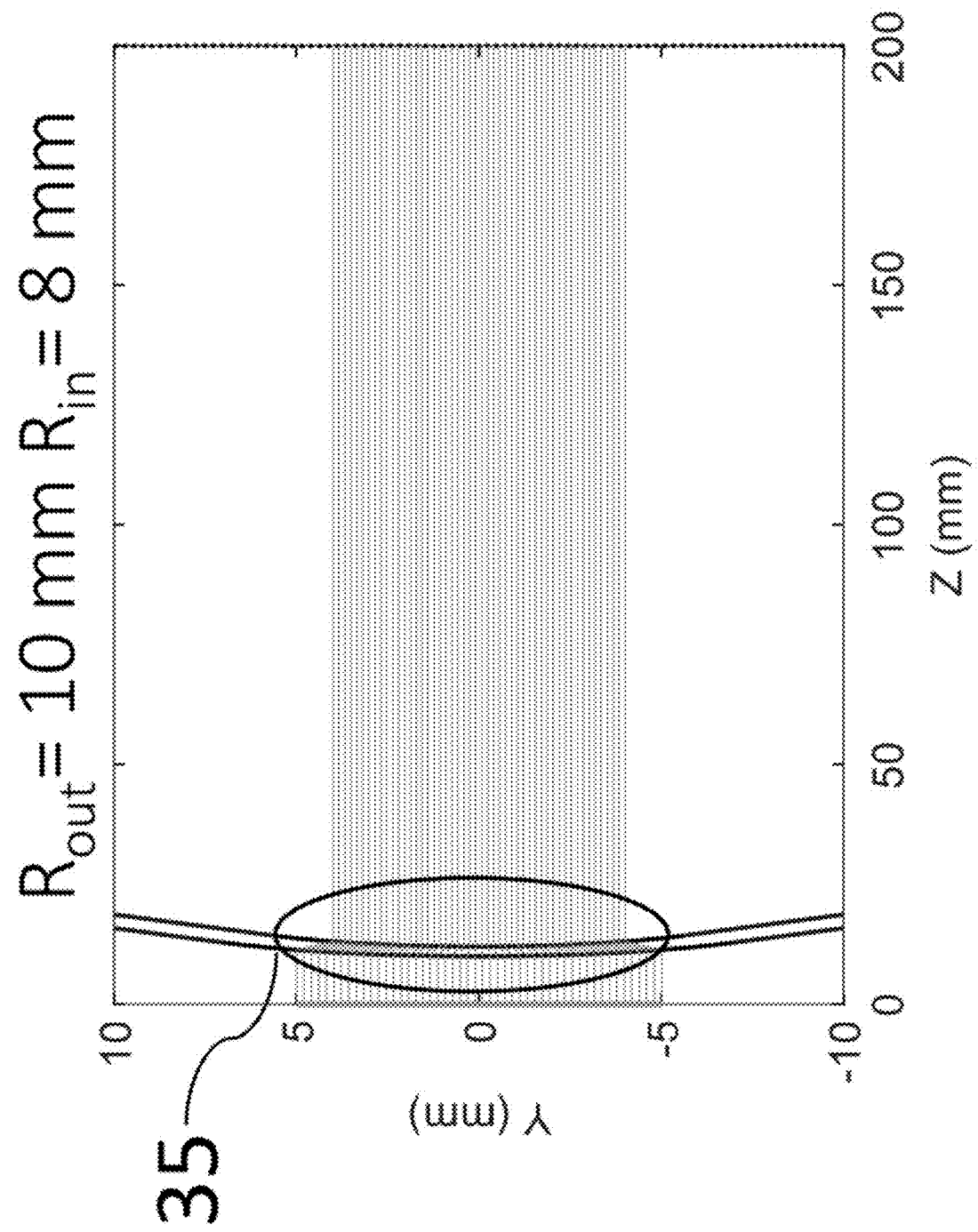
FIG. 10A shows simulation results including ray tracing analysis illustrating how a bend with a circular surface profile and with embedded GRIN profile inside the bend region interacts with collimated rays, in accordance with some implementations of the disclosure.
Figure 10B:
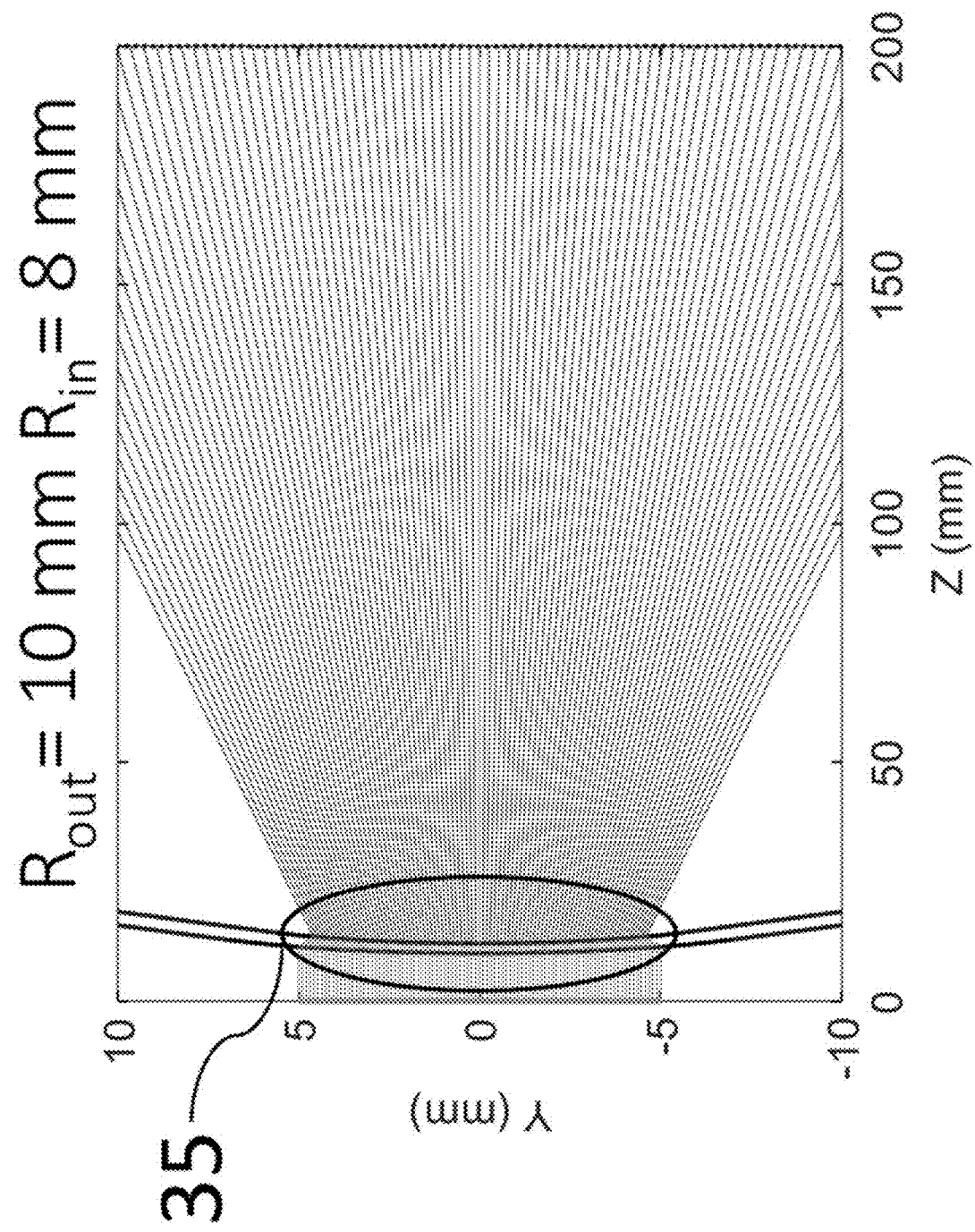
FIG. 10B shows simulation results including ray tracing analysis illustrating how a bend with a circular surface profile and without embedded GRIN profile inside the bend region interacts with collimated rays, in accordance with some implementations of the disclosure.

With reference now to FIGS. 10A-10B, surface profiles of the bend may be considered to be circular for simplicity. One may see these two surfaces as lenses, the exterior acting as a positive lens converging incoming rays and interior acting as a negative lens diverging incoming rays. The problem arises from the fact that the absolute optical power of these lenses is not equal. Therefore, they do not cancel each other and ultimately alter the angle of incoming rays. One way of compensating for this optical power mismatch is to grade the index of the bend section to make an integrated Gradient-Index Lens (GRIN). FIG. 3C schematically shows one of the examples for generating a GRIN profile. Gradient index profile direction and profile may be different (horizontal, vertical, radial, 2D, 3D) depending on the surface profiles of the bend.

FIG. 10A shows a ray-tracing analysis of a bend with a circular surface profile and GRIN lens in the middle. The GRIN lenses change the direction and angle of rays that already experience refraction at the exterior surface in such a way that after the next refraction by the interior surface, their angles are equal to their original angle (no aberration). By contrast, FIG. 10B shows how this bend alters the angle of rays when there is no GRIN lens integrated into the middle of the bend.

Figures 11A, 11B:
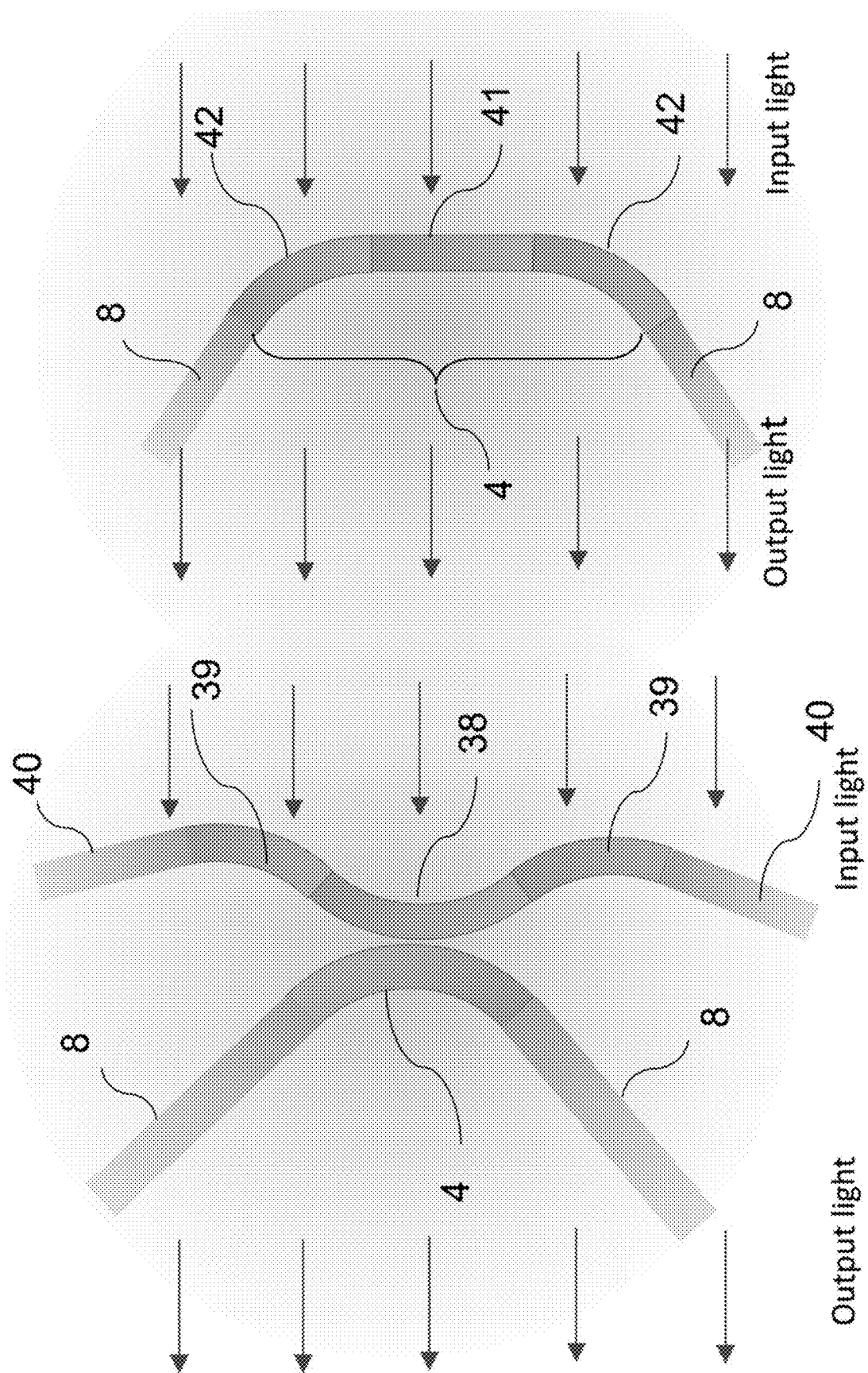
FIG. 11A depicts geometric compensation of a bend by using pre-compensator with the bend, in accordance with some implementations of the disclosure.
FIG. 11B depicts geometric compensation of a bend by segmenting the bending into multiple bends having smaller localized curvature, in accordance with some implementations of the disclosure.

FIGS. 11A-11C depict different implementations for geometric compensation of a bend 4. Again, reflective layer 8 is attached to bend 4. Referring to FIG. 11A, since bend 4 is not able to have minimal perturbation to the light, that is it cannot be fully invisible to the eye (e.g., due to fabrication limitations in the geometry of the bend), a pre-compensator or pre-compensation optical layer 38-39-40 is utilized. This layer helps to pre-compensate or prepare the light for the bend 4 so that together they can become invisible to the viewer. This layer has three segments. Segment or pre-compensation bend 38 is the counterpart to the actual bend 4. The segments 39 on two sides of the bend are there to compensate for additional perturbation that is induced by the segment 38 itself from different angles. The segment 40 is the rest of the substrate that is there to hold the pre-compensator mechanically and position it behind bend 4. In some implementations, the pre-compensator may be a post-compensator performing a very similar correction to the light field transmitted through the original bend. In some implementations, Fourier transforms might be used to assess or design the shape of the pre-compensation bend 38 in such a way that the bend relaxes to a flat surface with minimal perturbation to the light, meaning that the pre-compensation bend 38 may have several side lobes similar to a sync function to have a geometrical curve with minimal frequency components. In either case, it is intended that the light that passes through the entire pre-compensator 38-39-40, and that bend 4 and reflective layer 8 are viewed unperturbed to the viewer's eye.

FIG. 11B shows a different way to reduce the perturbation induced by the bend 4 by segmenting the original bend 4 into multiple bends having smaller localized curvature. This is effectively equivalent to having a larger radius of curvature as discussed previously with reference to FIG. 5A. FIG. 11B shows the geometrical segmentation of a 90-degree bend 4 divided into an intermediate segment 41 and two bent segments 42. The intermediate segment 41 is actually flat but now each bent segment 42 of the bend is effectively a 135-degree bend instead of 90 degrees.

FIG. 11C shows an example embodiment of an additive compensation with an index-matched transparent layer (usually a polymer) for pre-compensation or post-compensation. Here, section 43 is the part of the layer that pre-compensates or post-compensates whatever the bend 4 cannot accommodate for. Section 44 is a thin layer that is laminated on reflective layer 8 and holds section 33. The difference between this design and FIG. 11A is that there is no air gap between the layers in FIG. 11C and the compensator which is laminated to the bent substrate.

Figure 12A:
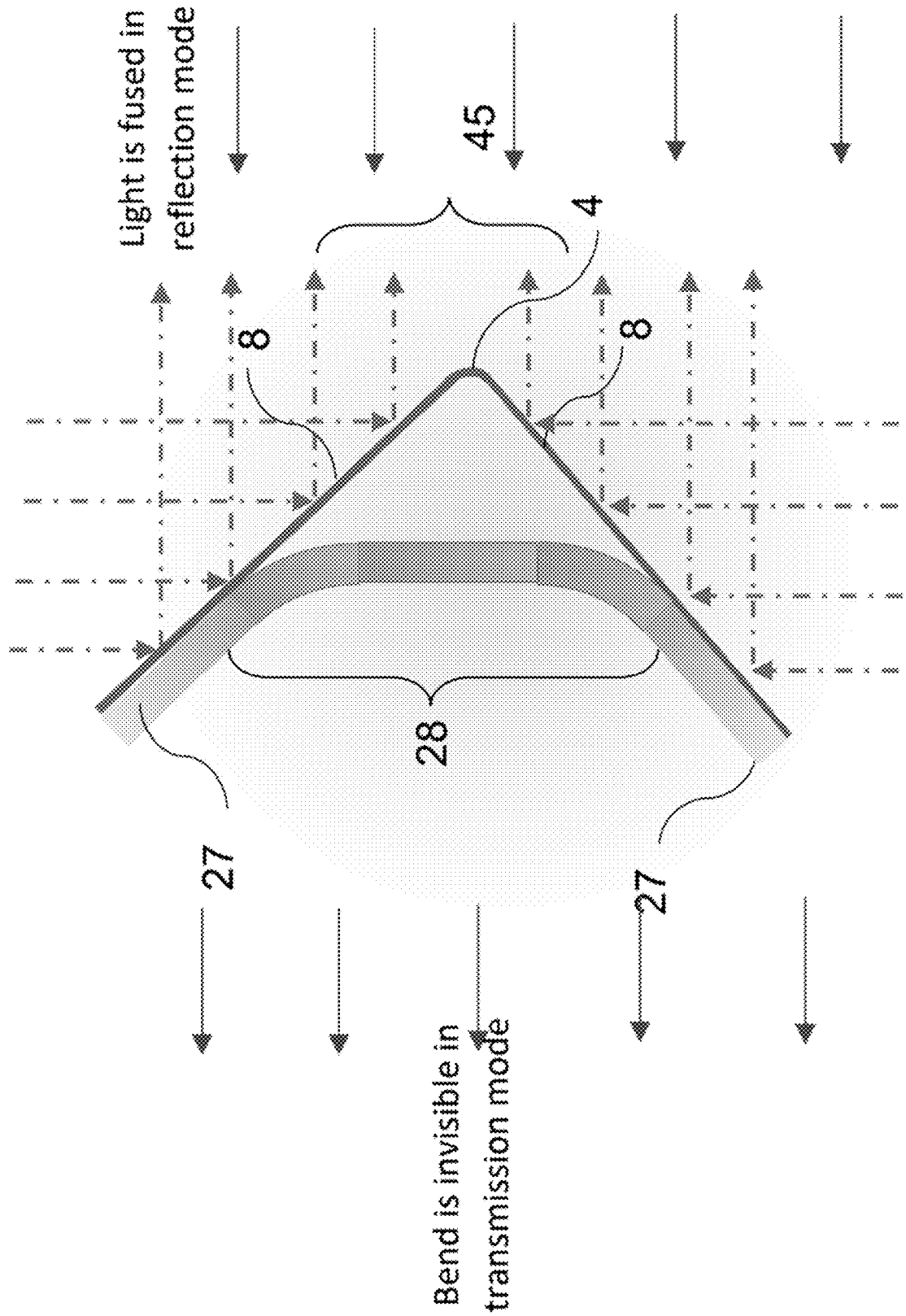
FIG. 12A shows a hybrid bend structure, in accordance with some implementations of the disclosure.

FIG. 12A shows an example embodiment of a hybrid bend structure 45, in accordance with implementations of the disclosure. Here, the substrate 27 bends at regions 28 with a larger curvature so that the bend is transparent in a transmission mode. This thicker bend (which is a two-segment bend in this example, but may be a single segment bend) acts as a mechanical substrate for a much thinner layer that has a much sharper bend 4. The sharper bend 4 helps to have less light perturbation in the light that is reflecting from the bend structure 45, as well as having thinner material that is pending in air in transmission mode. The idea is to mechanically support a very thin but sharp bend. In this case, the thinner thickness and larger radius helps to further make the bend invisible to the user. The thickness of these layers may be arbitrarily engineered but in display applications that are not near-eye displays, the thickness may be a few tens of microns for the thin layer and on the order of one millimeter to three millimeters for the supporting transparent structure.

Figure 12B:
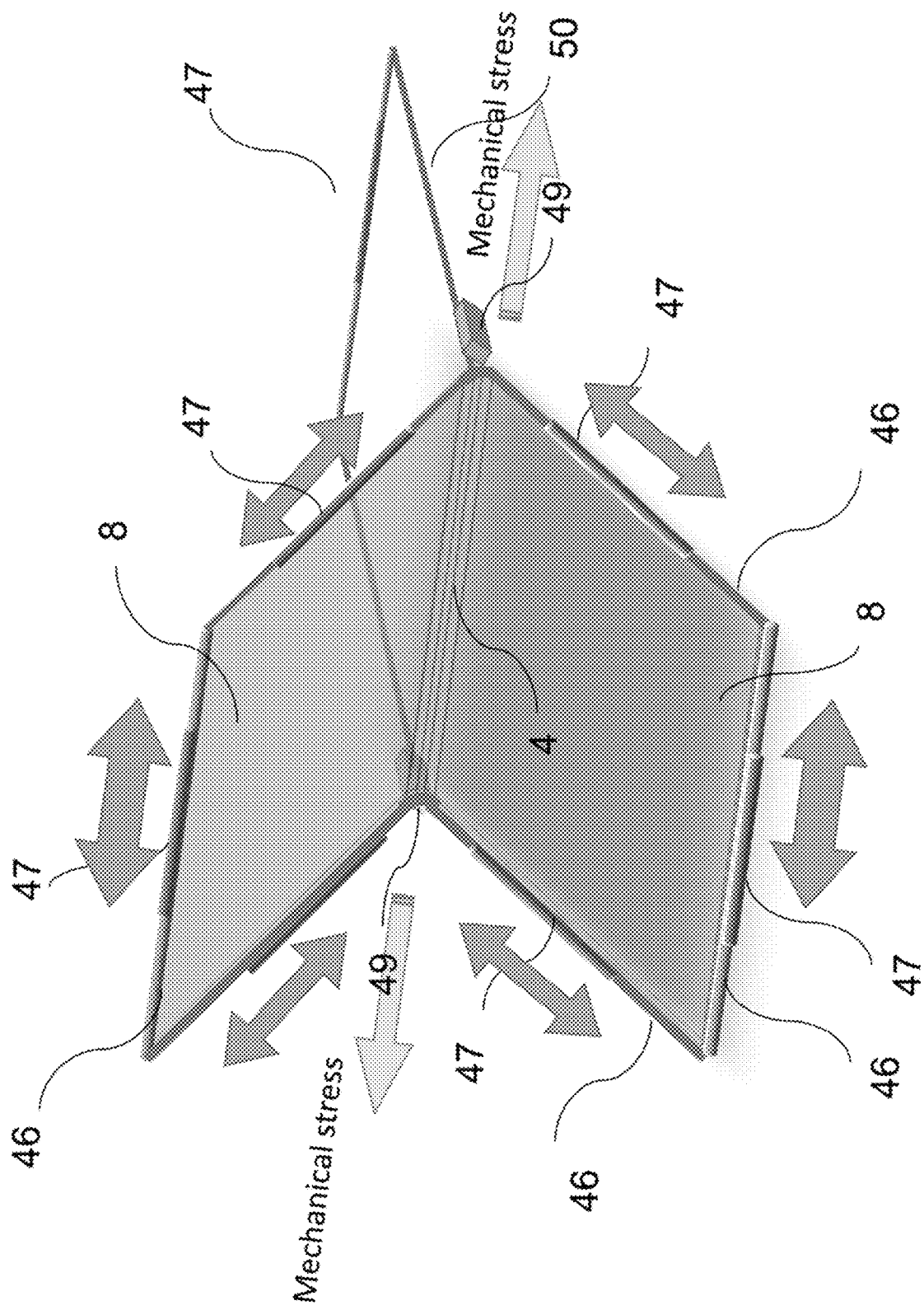
FIG. 12B shows a bend structure where a thin flexible bend layer is stretched mechanically by a mechanical frame, in accordance with some implementations of the disclosure.
Figure 12C:
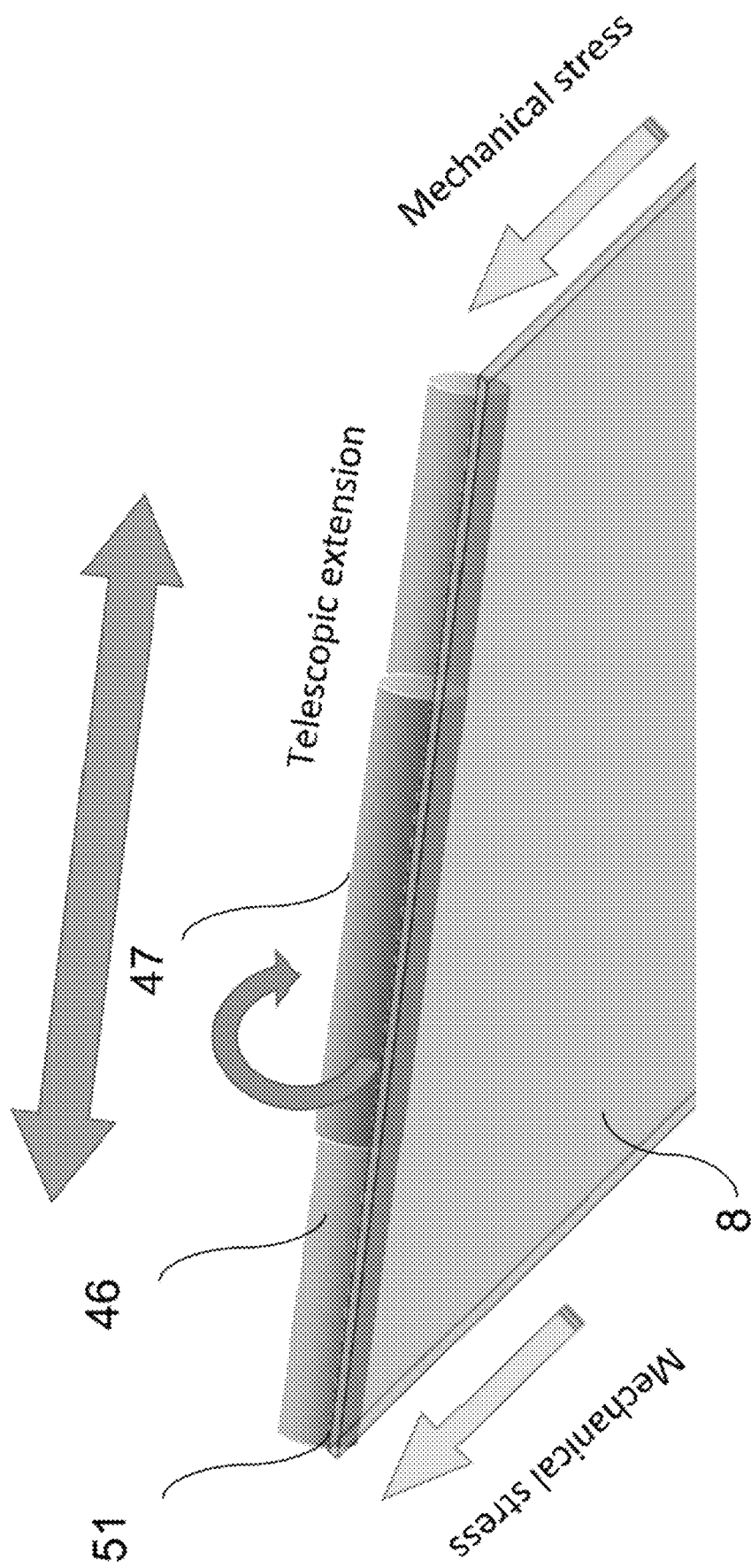
FIG. 12C shows a bend structure where a thin flexible bend layer is stretched mechanically by a mechanical frame, in accordance with some implementations of the disclosure.
Figure 12D:
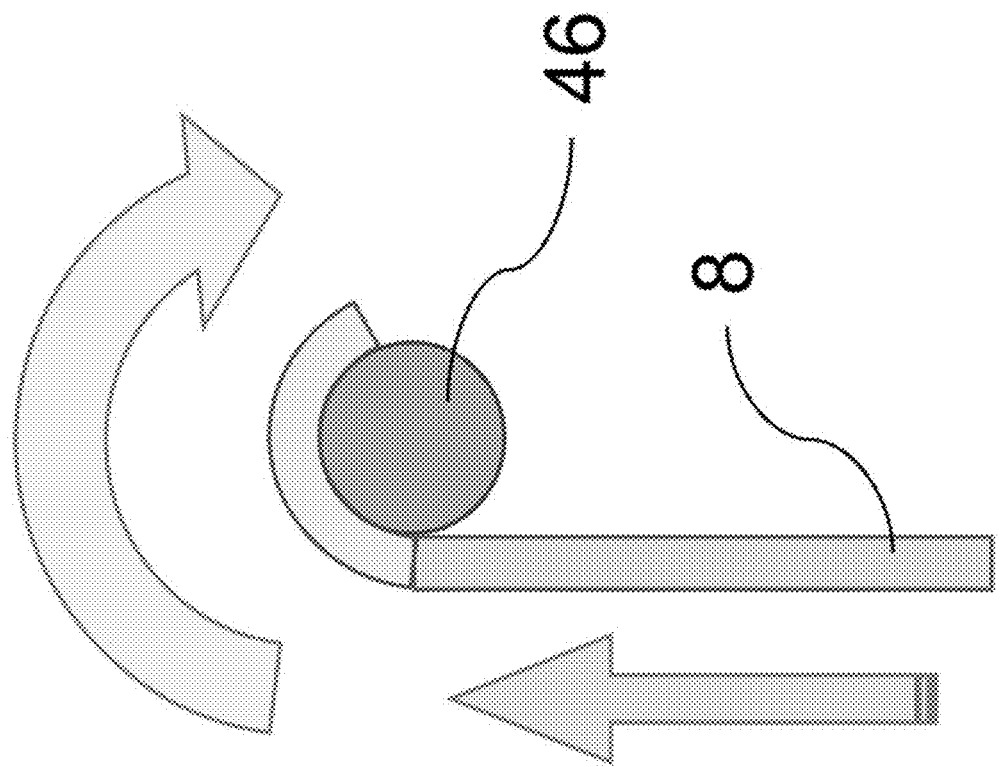
FIG. 12D shows a bend structure where a thin flexible bend layer is stretched mechanically by a mechanical frame, in accordance with some implementations of the disclosure.

FIGS. 12B-12D shows an example embodiment of a bend structure where a thin flexible bend layer (e.g., a reflective polymer film or thin sub-millimeter flexible glass) is stretched mechanically by a mechanical frame (e.g., by rolling it over the frame chassis). The direction of arrows shows how the force is acting in the film. The mechanical frame has a chassis 46. The sides of the frame may roll or extend like a telescopic tube by twisting sections 47. This allows adjustment of the stress to the desired level to get the maximum flatness of section 8 of the bend. By twisting, the stress may be increased, but additionally, since the frame expands by the telescopic structure of some of the sides then the force on the layer may be controlled in the desired fashion. Mechanical connection point 49 to chassis 46 of the display and imaging system provides support to the frame at the point of bend 4. The extension 50 of the chassis goes to the back telescopic structure 47 that allows stretching the film at the bend from both sides. Since the frame is solid and has the bend profile in it when the film is stretched, it may follow the geometric profile of the film in the bend. The film is attached to all sides of the frame in such a manner to follow the desired geometrical bend. With layer stressing the bend may be very thin down to few tens of micrometers. This means that the radius of the bend itself may also be in the few tens of micrometers which may help to make it invisible both in reflection or transmission mode or combination of both.

FIGS. 13A-13G and 14A-14B illustrate some advantages of bend designs based on free-form optics, in accordance with implementations of the disclosure.

Figure 13A:
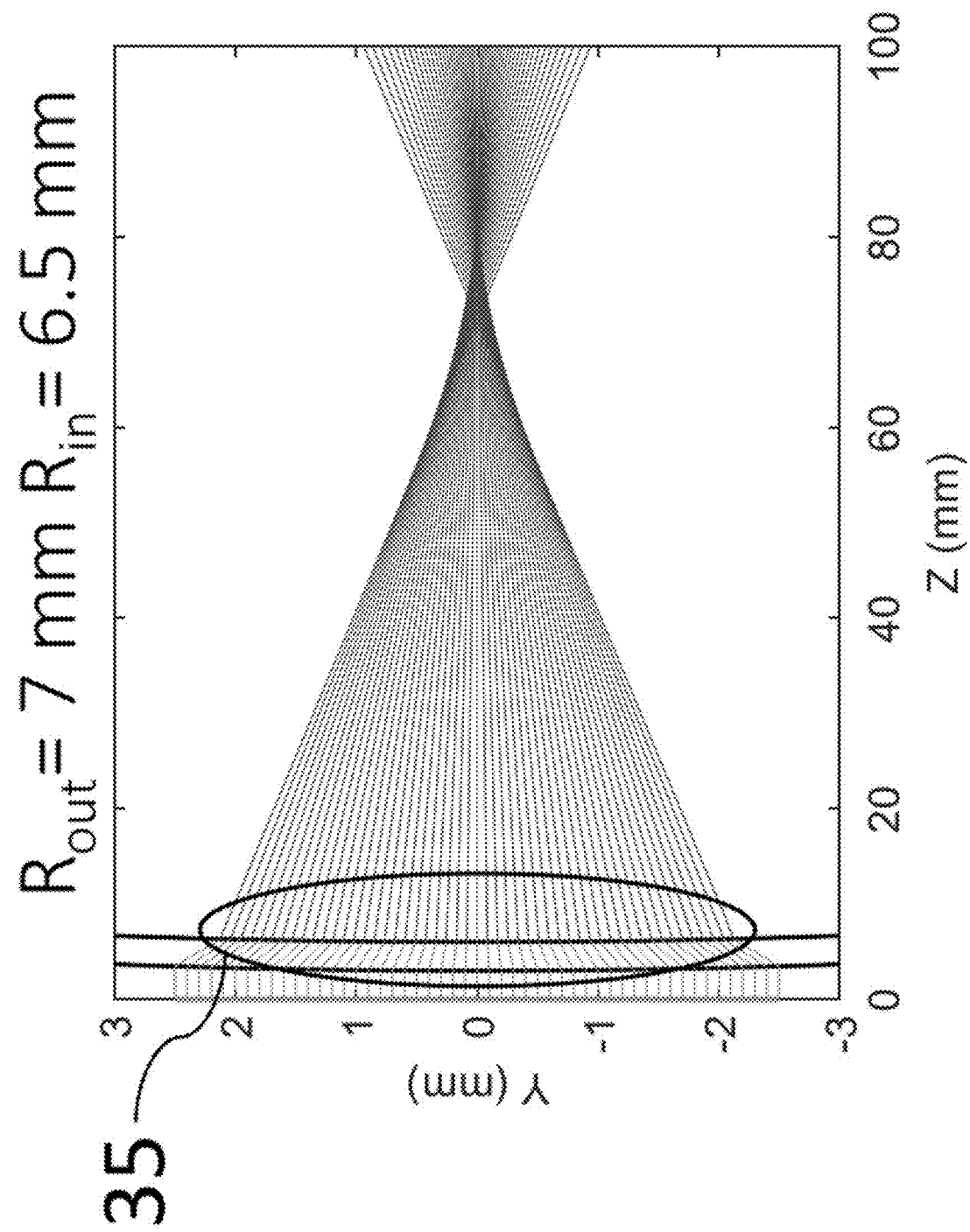
FIG. 13A shows simulation results including ray tracing analysis for a bend for rays at zero angles, where the interior surface has a parabola profile, in accordance with some implementations of the disclosure.

FIG. 13A shows a ray-tracing analysis for a bend with $R_{out}$=7 mm and $R_{in}$=6.5 for rays at zero angles. $R_{in}$ is selected based on the optimization shown in FIG. 5A, resulting in minimum AAD for $R_{out}$=7 mm. To further reduce the AAD, the interior curvature is replaced with a surface with a parabola profile ($\alpha X^2$, $\alpha$: parabola's coefficient, constant value).

Figure 13B:
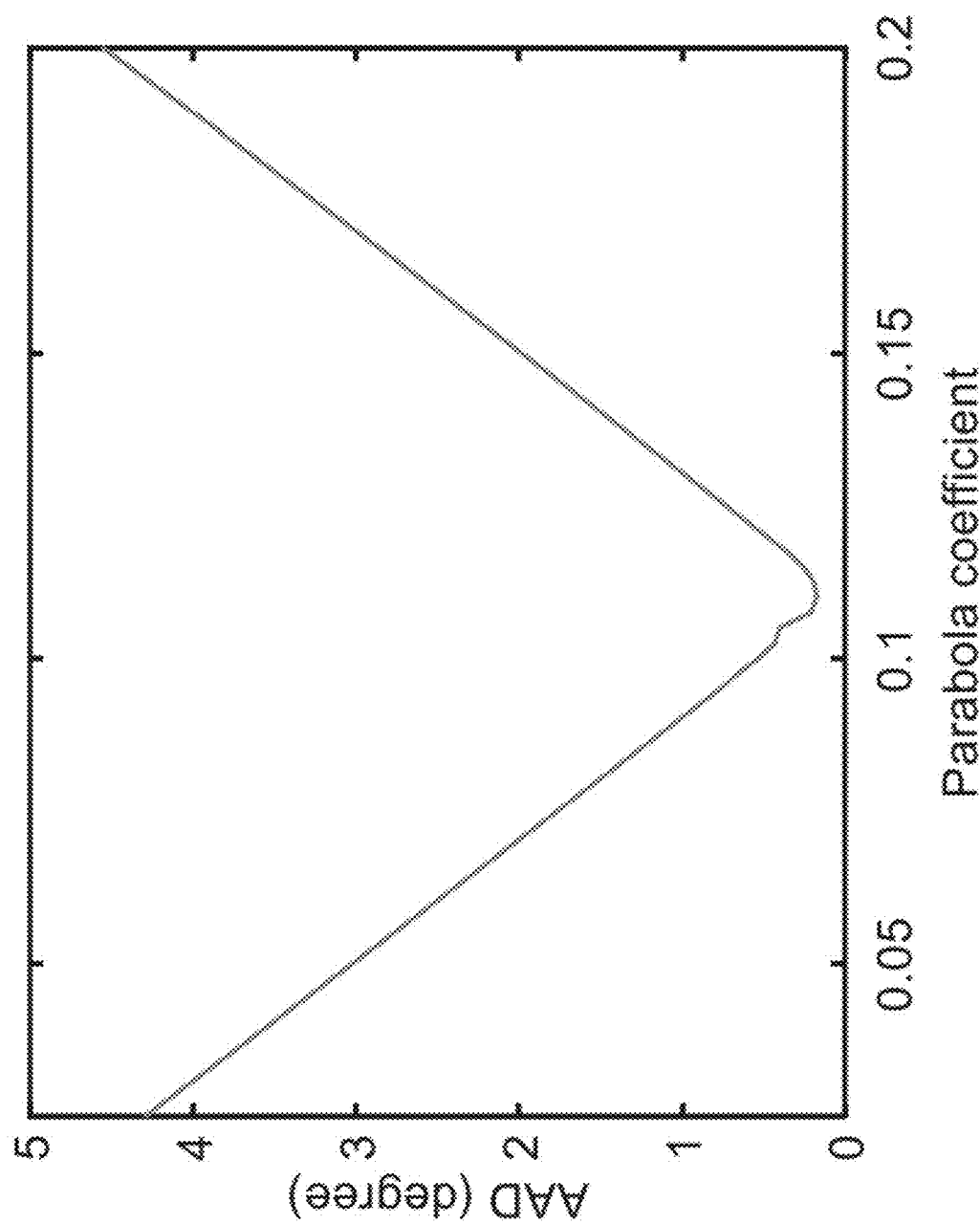
FIG. 13B shows simulation results showing the average value of rays' angle errors due to interaction a the bend having an interior surface with a parabola profile, as a function of the parabola's coefficient, in accordance with some implementations of the disclosure.

FIG. 13B shows the AAD as a function of the parabola's coefficient ($\alpha$). As shown for a=0.11, AAD reaches the minimum value.

FIG. 13C shows the ray-tracing analysis for a bend where the exterior surface has $R_{out}$=7 mm and interior surface follows a parabola profile ($0.11X^2$). The ray angular deviation is significantly mitigated compared to FIG. 13A. Further, although a parabola profile is considered in FIG. 13C it may be another profile such as a hyperbola or in general a free-form surface.

Figure 13D:
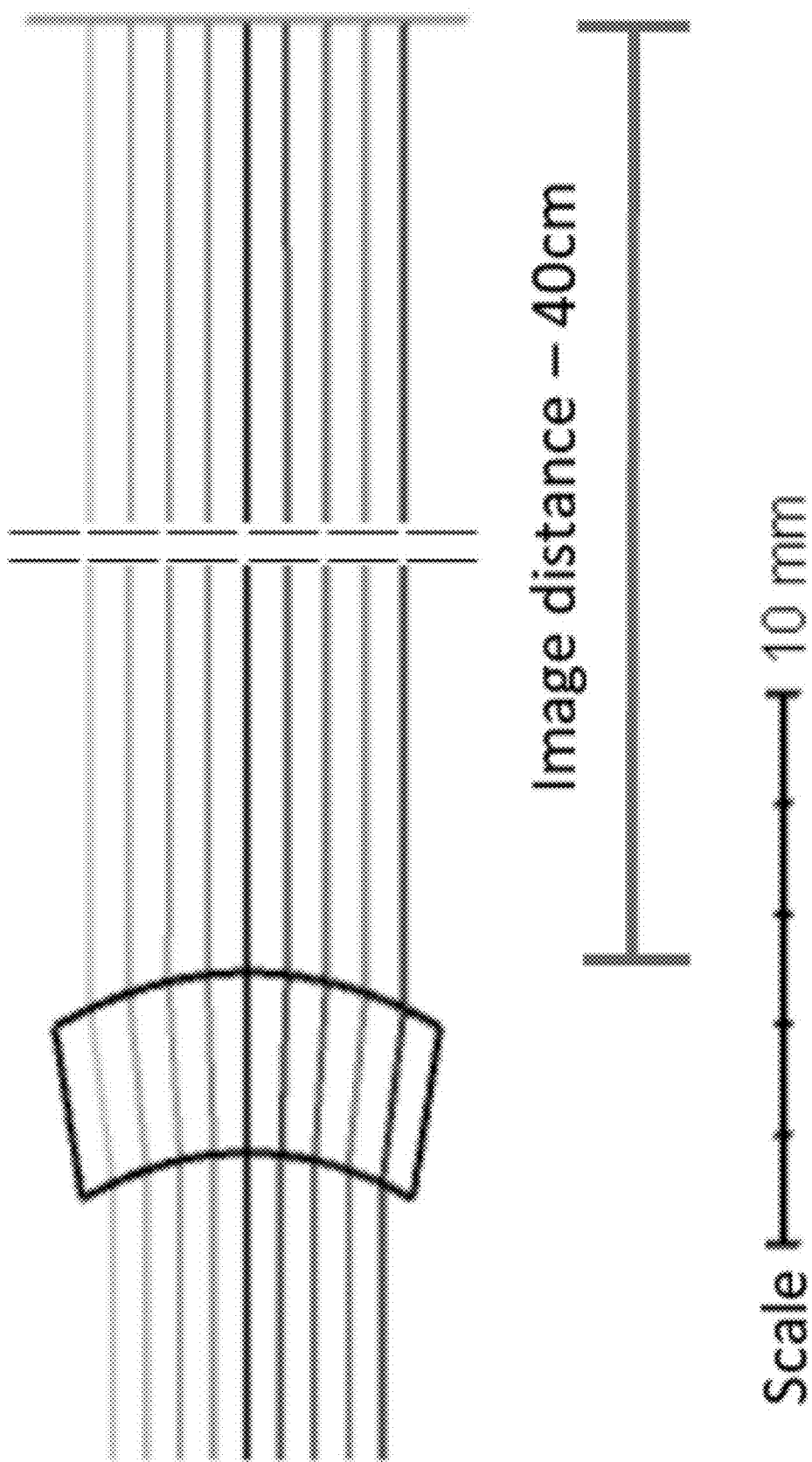
FIG. 13D shows a bend where both interior and exterior surface profiles are designed as free-from optics, in accordance with some implementations of the disclosure.
Figure 13E:
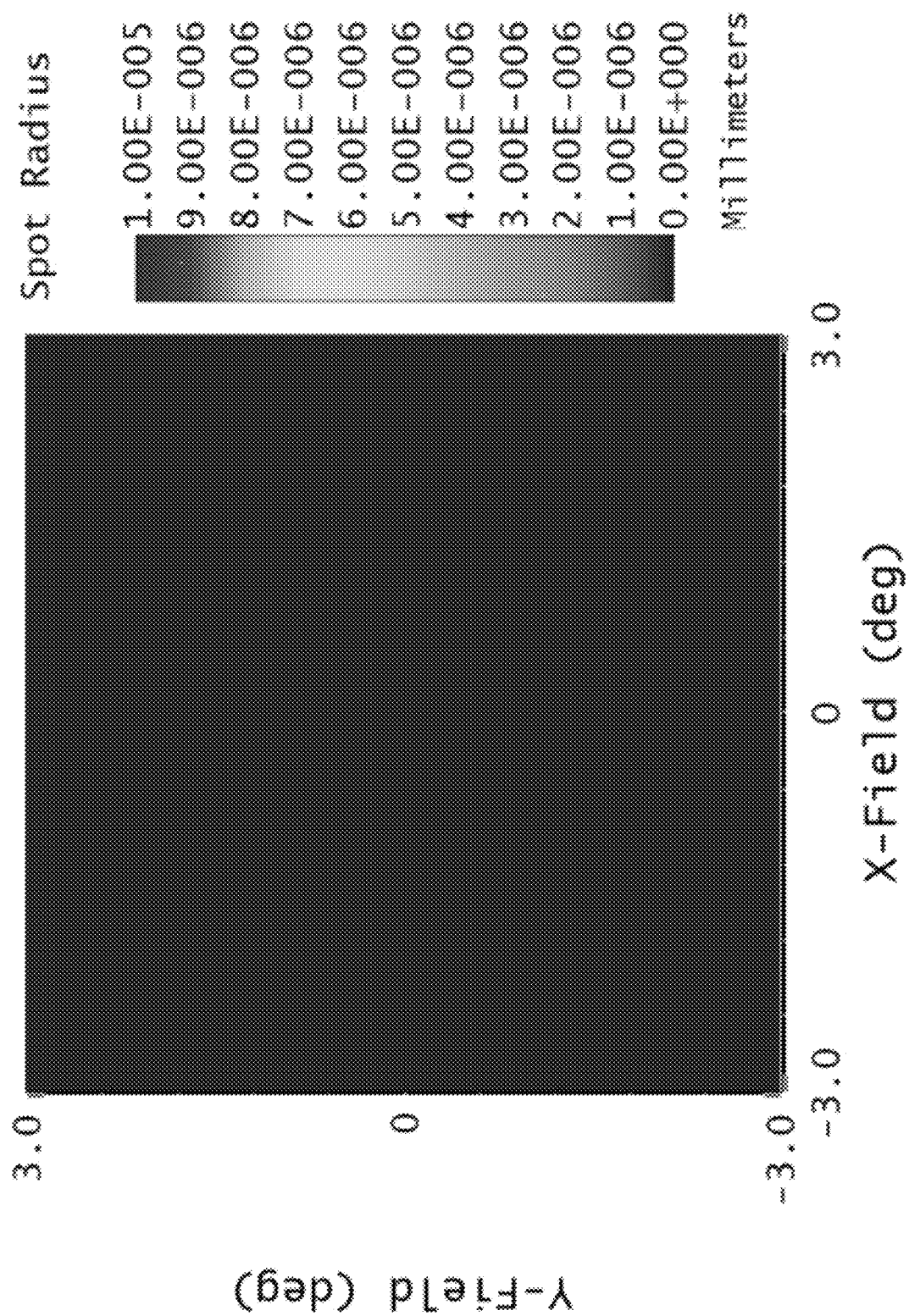
FIG. 13E shows an RMS map calculated for the bend of FIG. 13D, in accordance with some implementations of the disclosure.

In some implementations, the bend performance may be improved by replacing both surfaces of the bend structure by a free-form optics as shown in FIG. 13D. In this example, the free form optics is of the polynomial family, which means its curvature is expressed as a polynomial. Further, the surface of the free-from may be expressed based on any arbitrarily mathematical formula and equation and it is not limited to polynomial. Considering a 2D case and for 3D cases, the surface profile may be a function of X, Y, and Z and it may be even time-dependent and controlled by an external signal. FIG. 13D show the bend with both interior and exterior surface profile designed as free-from. This bend has 135-degree bend angle and the interior surface is designed by ZEMAX to have a profile of:

$$Z=-8.57\times10^{-2}Y^2-3.10\times10^{-7}Y^4-5.61\times10^{-8}Y^6-9.57\times10^{-9}Y^8 \quad (2)$$

and the exterior surface profile is design to have a profile of:

$$Z=-7.37\times10^{-2}Y^2+1.51\times10^{-7}Y^4+2.66\times10^{-8}-8Y^6+2.39\times10^{-9}Y^8 \quad (3)$$

where Y and Z are the vertical axis and horizontal axis, respectively. As shown in FIG. 13D, collimated rays stay collimated after interaction with the bend. A more rigorous analysis is shown in FIG. 13E where the very low-value RMS map calculated by the ZEMAX Software (OpticStudio) proves trivial aberration caused by the bend. This highlights the power of free-form optics enabling elimination of the aberration caused by the bend.

A free-form may be designed based bend with bend angle of 90-degree where the interior surface is designed to have a profile of:

$$Z=-1.70\times10^{-1}Y^2+6.4\times10^{-5}Y^4+7.05\times10^{-6}Y^6+8.8\times10^{-7}Y^8 \quad (4)$$

and the exterior surface profile is design to have a profile of:

$$Z=-1.31\times10^{-1}Y^2-2.64\times10^{-5}Y^4-1.80\times10^{-6}Y^6-1.39\times10^{-7}Y^8 \quad (5)$$

Figure 13F:
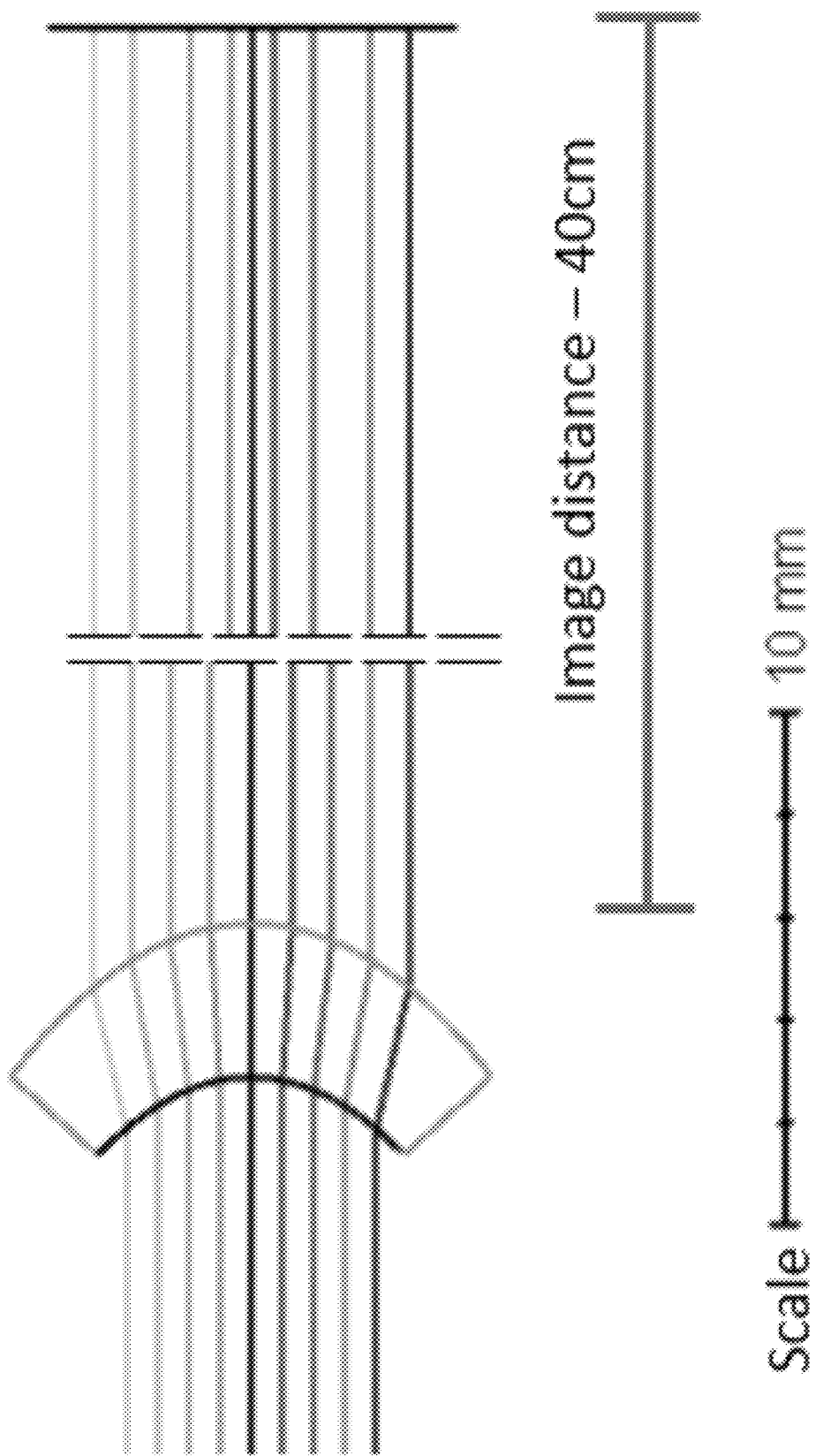
FIG. 13F shows a bend where both interior and exterior surface profiles are designed as free-from optics, where the bend angle is 90 degrees, in accordance with some implementations of the disclosure.
Figure 13G:
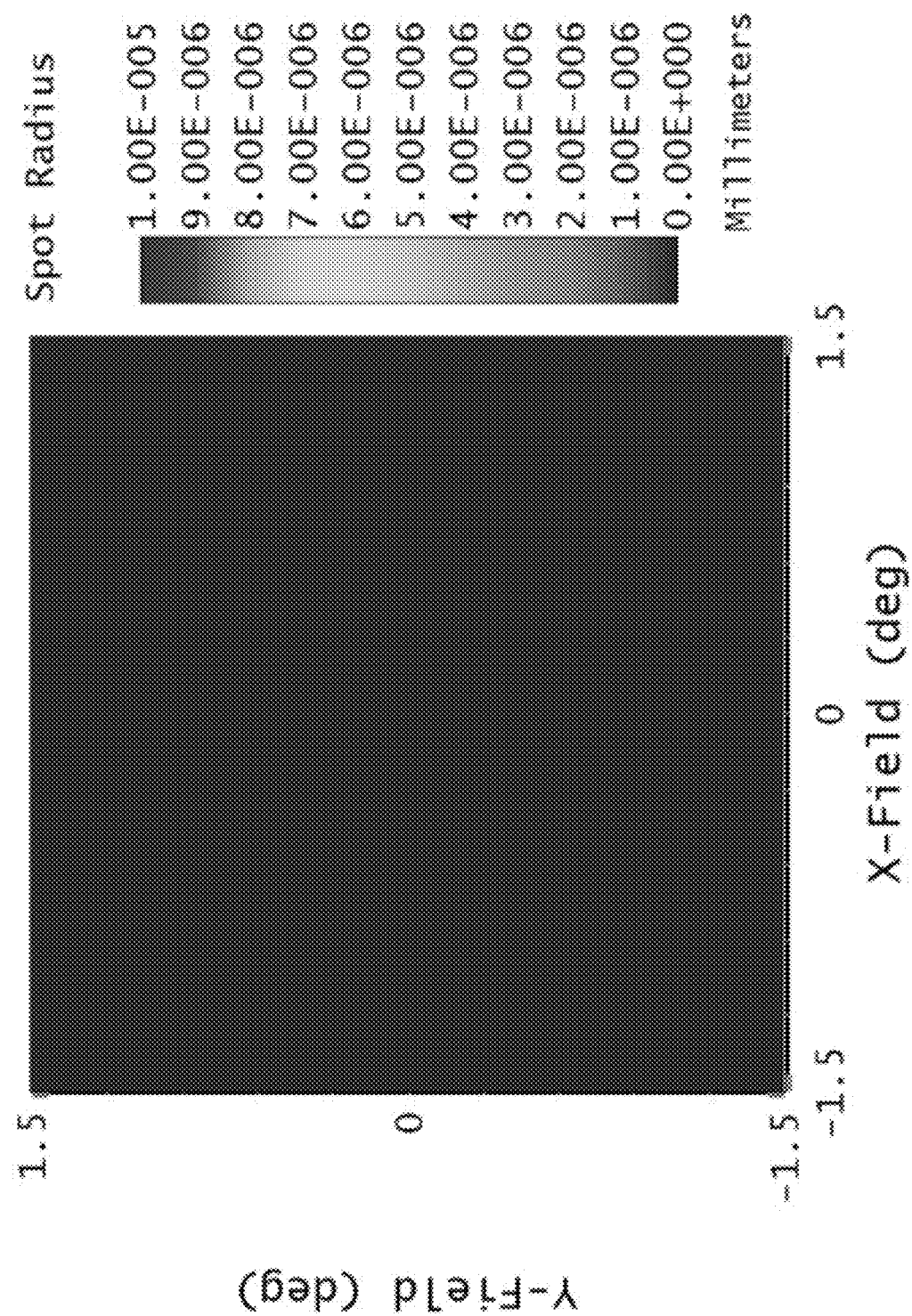
FIG. 13G shows an RMS map calculated for the bend of FIG. 13F, in accordance with some implementations of the disclosure.

The results are shown in FIG. 13F and FIG. 13G. The collimated light barely affects may be seen by the bend and stay collimated even after 40 cm propagation. FIG. 13G also confirms this observation where the RMS map is very small for the entire shown X-field and Y-field.

Figure 14A:
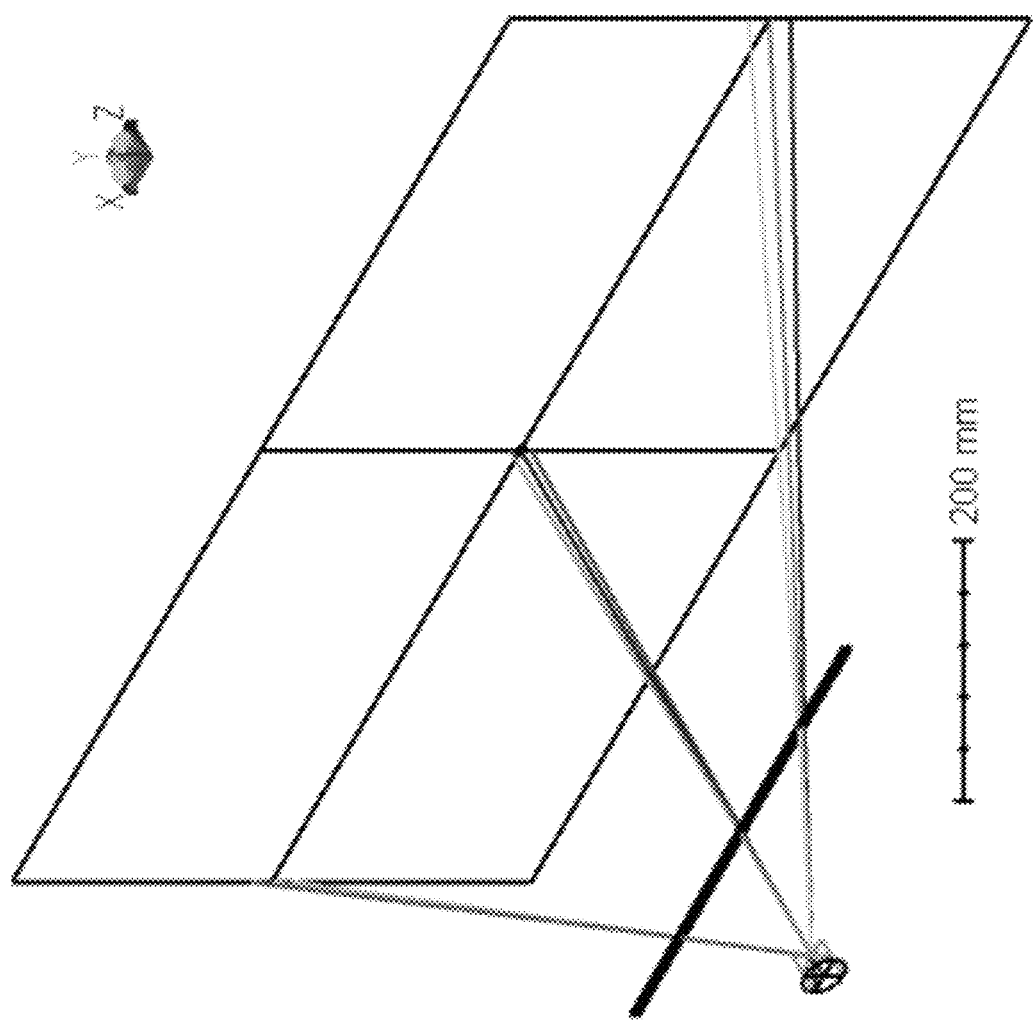
FIG. 14A depicts a perspective view of a simulation showing rays going through an invisible bend to a larger virtual image from a wide-angle, in accordance with some implementations of the disclosure.
Figure 14B:
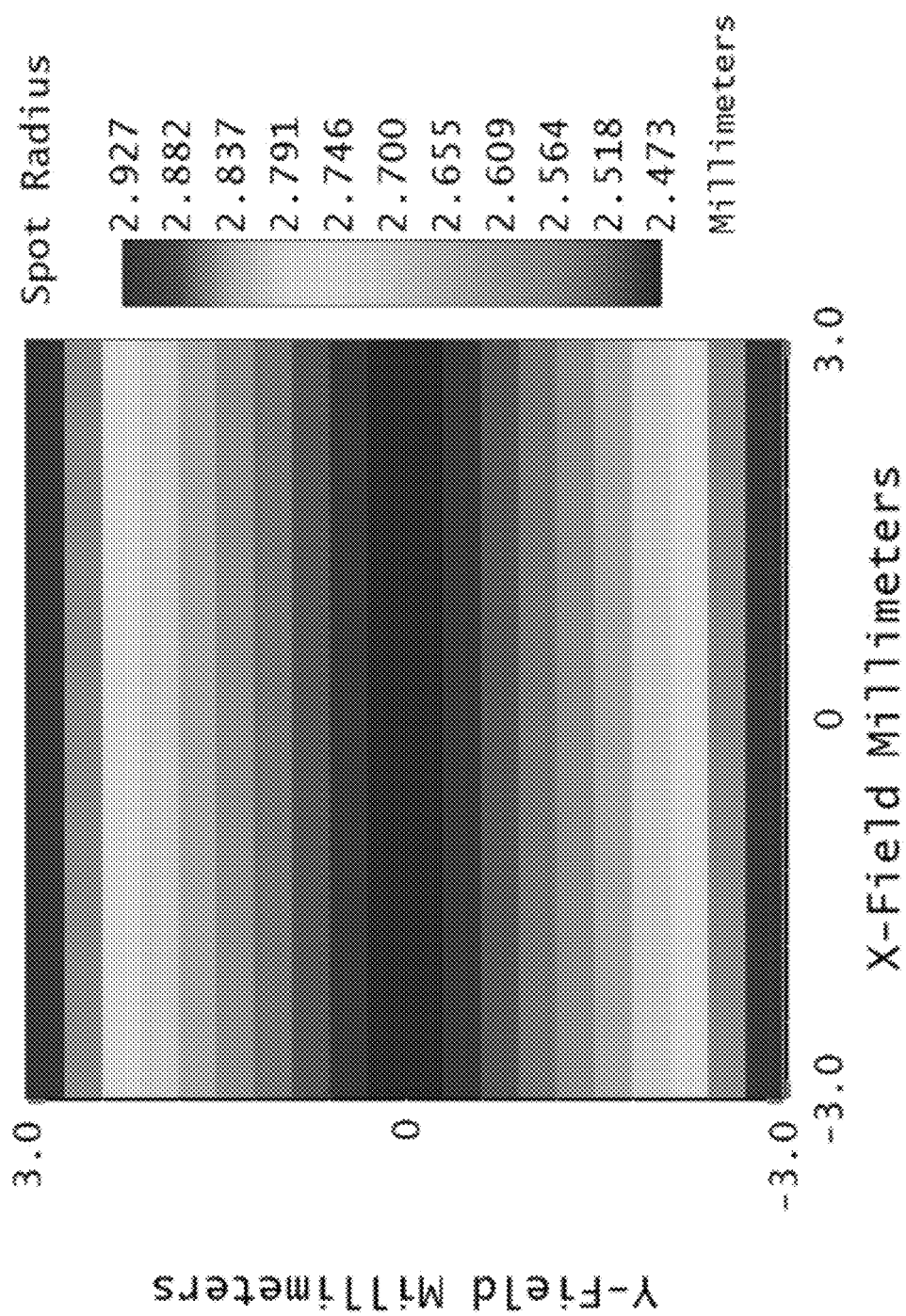
FIG. 14B shows the performance based on an invisible bend with a designed interior surface profile, in accordance with some implementations of the disclosure.

The effect of a bend at different incident angles may be analyzed (FIG. 14A and FIG. 14B) for a display system. FIG. 14A depicts a perspective view of ZEMAX simulation showing rays going through the invisible bend to a larger virtual image from a wide-angle. FIG. 14B shows the performance based on the invisible bend with the designed interior surface profile of:

$$z=-1.36\times10^{-1}Y^2-1.28\times10^{-3}Y^4+7.60\times10^{-5}Y^6-1.76\times10^{-6}Y^8 \quad (6)$$

and the exterior surface profile of:

$$z=-1.11\times10^{-1}Y^2-1.07\times10^{-6}Y^4-3.58\times10^{-6}Y^6+5.39\times10^{-8}Y^8 \quad (7)$$

Here, the coefficients (polynomial) of the free-form surface are optimized when considering the performance across the entire horizontal and vertical angle range in a transmission mode.

Although previous embodiments have been primarily described in the context of bends that work in a transmission mode, letting light pass through, and the optimization was aimed to reduce optical aberration of transmitted light, the same embodiments may be applied for bends that work in a reflection mode (e.g., FIG. 4B) where optimization may be performed to reduce optical aberration of reflected light. In some embodiments, a bend may be optimized to work for both a transmission mode and reflection mode with minimal aberration with the methods discussed above.

Figure 15:
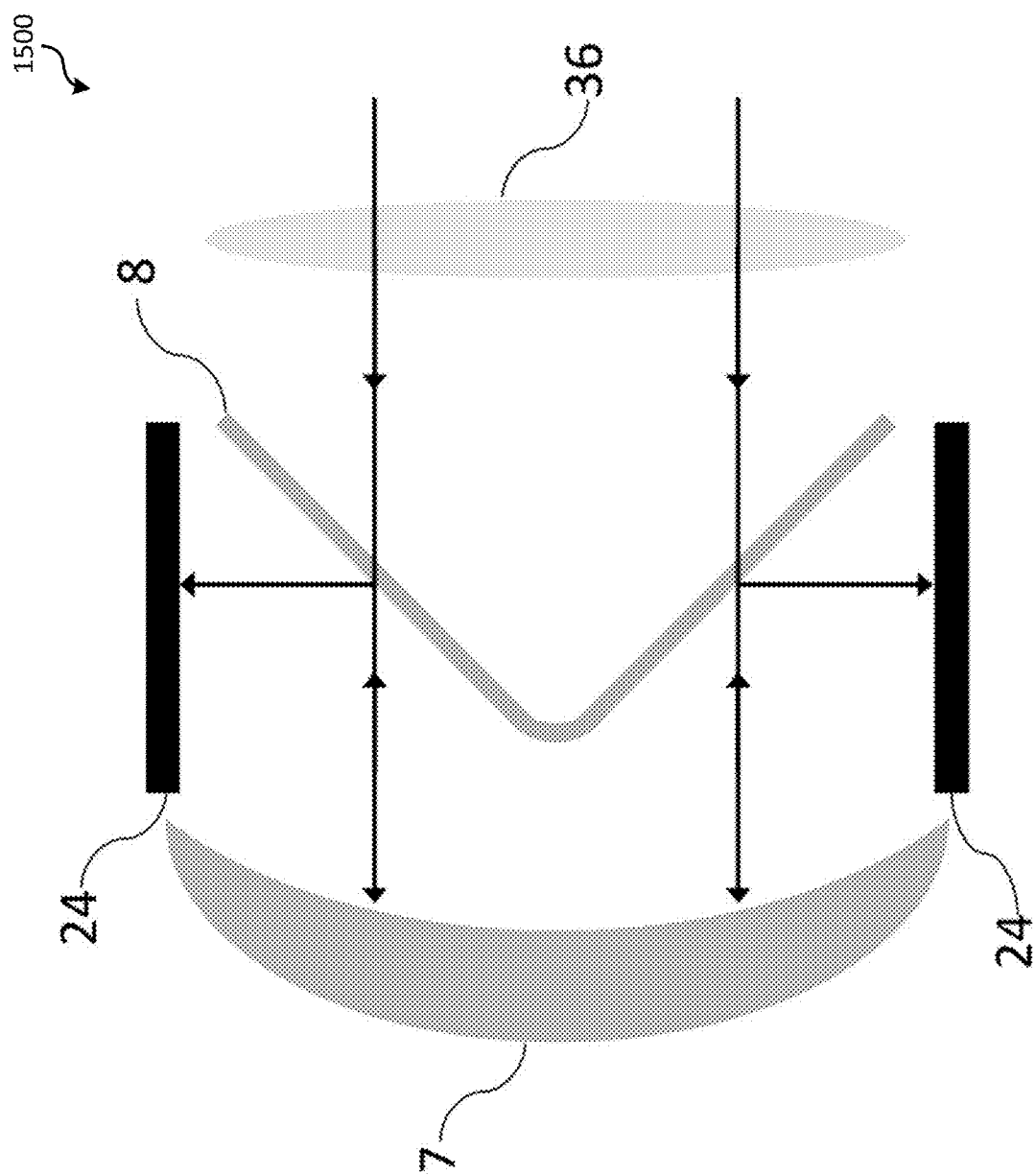
FIG. 15 depicts components of a small form factor optical fusion imaging system that may be used to record and capture images, in accordance with some implementations of the disclosure.

Although previous embodiments have been primarily described in the context of using bends in display systems to provide a viewer a large field of display (e.g., in a small form factor), the aforementioned bends may also be used in imaging systems where the rays are coming outside the embodiment (e.g., from a scene). For example, FIG. 15 depicts components of a small form factor imaging system 1500 that may be used to record and capture images. In this example, instead of a display, a light detector, camera, or imaging sensor 24 is used to record the image coming from outside the system.

As previously discussed, when light reflects from the bend 4 or is transmitted through the bend 4, the fusional area 11 in the image space may be prone to unwanted distortion. This usually means that the image is slightly stretched or distorted at the fusional area. Additionally, this distortion may be a function of the position of the viewer. To address such distortion, two general algorithms are described herein for compensating for such unwanted distortions. Although described primarily in the context of display systems, it should be noted that the same concept may be used in imaging apparatuses that use optical fusion.

Figure 16A:
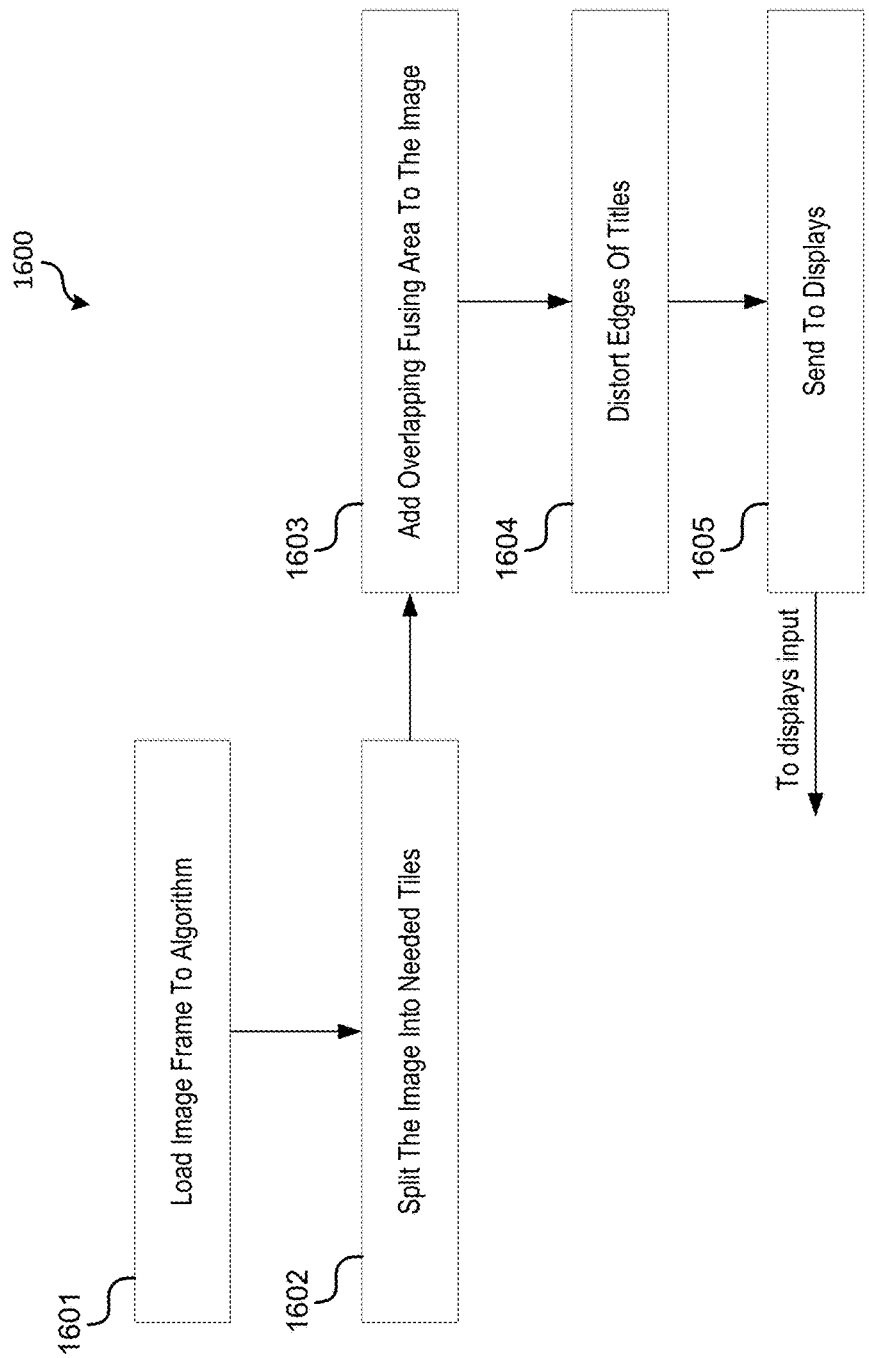
FIG. 16A is a flow diagram illustrating an example method including computational steps taken to enhance optical fusion in a static optical fusion setting where there is no head tracking sensor involved, in accordance with some implementations of the disclosure.

FIG. 16A is a flow diagram illustrating an example method 1600 including computational steps taken to enhance optical fusion in a static optical fusion setting where there is no head tracking (e.g., SLAM) sensor 12 involved, in accordance with implementations of the disclosure. Although described with respect to one image frame, it should be noted that steps 1601-1605 may be applied to each image frame of a video shown in the display system. At operation 1601, the image frame is loaded to the algorithm 15. At operation 1602, the image data is split into a number of needed tiles depending on how the image from displays of the optical fusion display system are to be tiled in the imaginary reflection space. The tiles (e.g., reflections from each display) may be the same size. At operation 1604, the edges of each tile are distorted. A geometrical distortion map may be applied that impacts the image in a linear or nonlinear fashion in the spatial domain. For example, the map can be a barrel distortion or a pin cushion distortion to help compensate the distortion induced by the optics of the system. Each tile may be distorted at the edges by means of a scalar transformation and/or intensity variation. A non-limiting example is to have a linear variant mask such that the intensity starts at 1 in the center of the image and then at the margins of the image the image intensity drops linearly to zero as it goes to the final column of the image. This blending may allow images from different displays to merge seamlessly at the area of the bend. At operation 1605, data corresponding to the distorted tile images are sent to the displays via a display input. Data corresponding to each distorted tile image may be input to a respective one of the displays of the optical fusion display system for output. By virtue of pre-distorting and/or masking the images (e.g., by applying a geometric distortion along an intensity map), the images output by the displays and reflected by the optical fusion system may blend seamlessly without any visible bezel lines in between them.

Figure 16B:
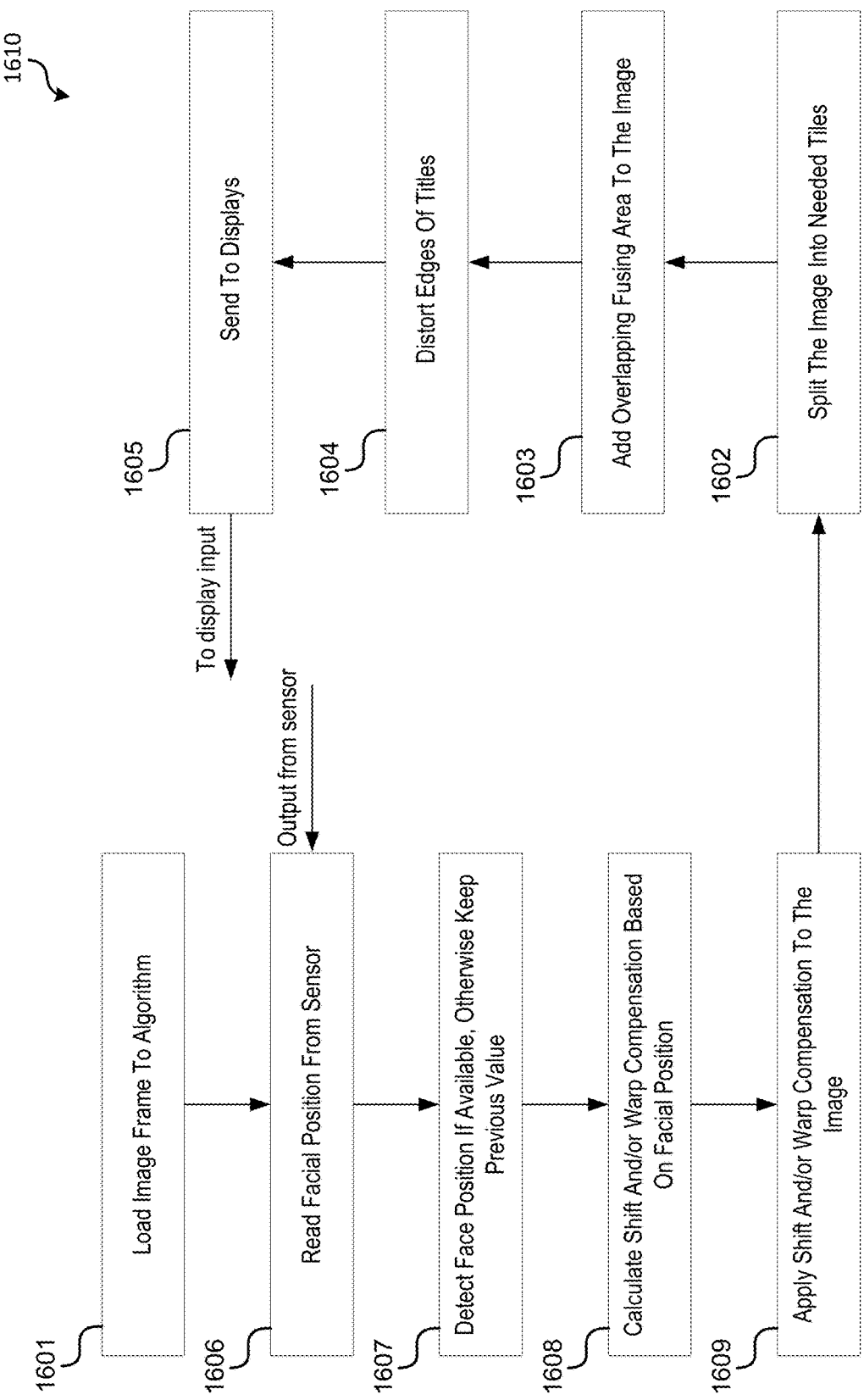
FIG. 16B is a flow diagram illustrating an example method including computational steps taken to enhance optical fusion in a static optical fusion setting where there is a head tracking sensor involved, in accordance with some implementations of the disclosure.

FIG. 16B is a flow diagram illustrating an example method 1610 including computational steps taken to enhance optical fusion in a dynamic optical fusion setting where there is head tracking (e.g., SLAM) sensor 12 involved, in accordance with implementations of the disclosure. Although described with respect to one image frame, it should be noted that steps 1601-1609 may be applied to each image frame of a video. FIG. 16B is similar to FIG. 16A except now at each frame the distortion that is to be applied to each tile is impacted by the viewer location data that is provided by the head tracking sensor 12. At operation 1601, the image frame is loaded to the algorithm 15 as described above. At operation 1606, a position of the user's face (which may have a specific orientation) is read from the head tracking sensor 12 (e.g., SLAM sensor). At operation 1607, to keep track of the face position and/or orientation, detect face position if available, otherwise keep previous position value. At operation 1608, a shift and/or warp compensation of the image is calculated based on the face position of the user. At operation 1609, the shift and/or warp compensation is applied to the image to update it. The remaining operations (1602-1605) may be applied to the shifted and/or warped image in a manner similar to that described above with reference to FIG. 16A.

Figure 17:
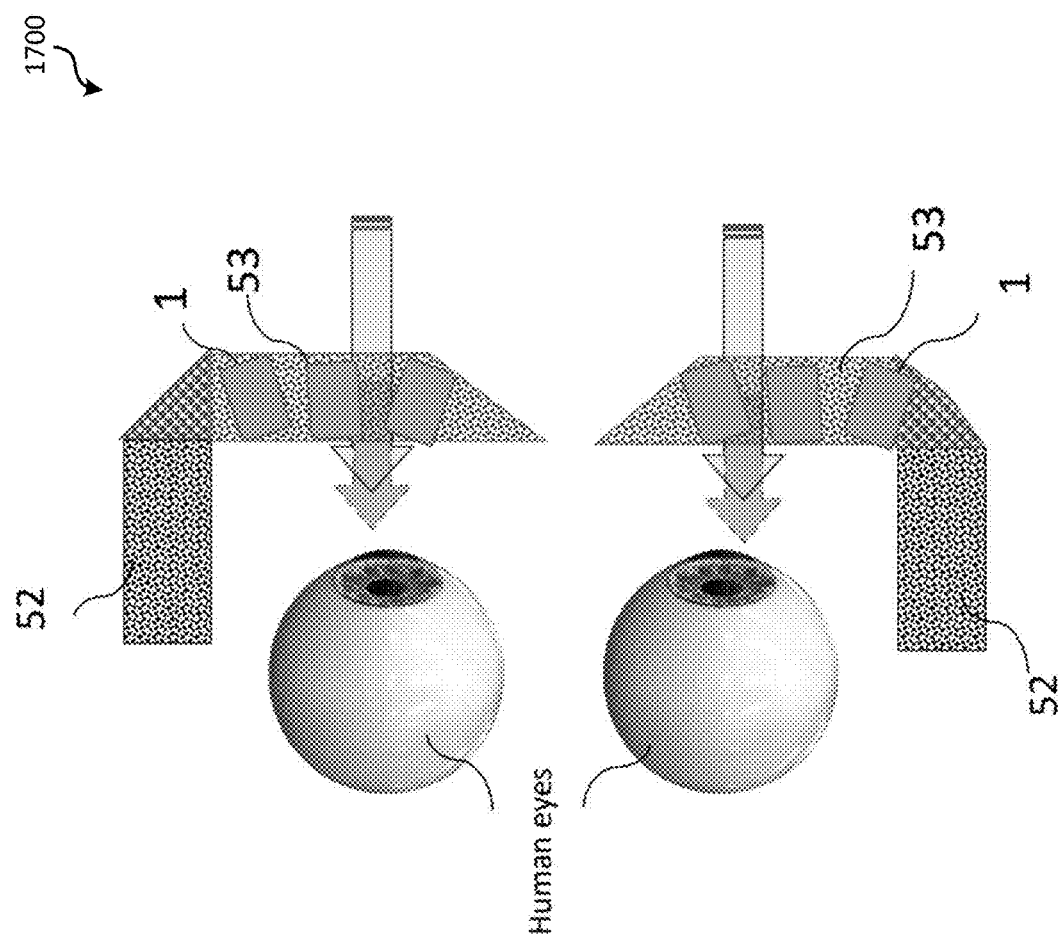
FIG. 17 shows optical fusion in near-eye displays for augmented and virtual reality applications, in accordance with some embodiments.

FIG. 17 depicts a display system 1700 showing how a smaller scale of the embodiment of any of FIGS. 1A-1D may be used for head-mounted displays or individual near-eye displays 53 in augmented reality and/or virtual reality applications, in accordance with implementations of the disclosure. In this example, the display system 1700 has three angled displays 1 for each eye, similar to the example of FIG. 1C. Mechanical structure 52 holds the displays near the users' eyes. For augmented reality applications, the reflector 7 may be a semi-reflector so it lets the light in from the outside world. For virtual reality applications, the reflector 7 may be an occlusive surface and a full mirror.

Optical fusion may allow unlimited (up to 360 degrees horizontally) increase in the field of view by tiling the light from an array of displays and fusing them with seamless edges. This may be done through the geometry of the reflective surfaces that tiles the reflection of the displays and then guides it back through invisible bends toward the user or sensor. Optical fusion may additionally reduce the form factor for a given field of view of concentric light field displays by allowing the user's head (or eyes in case of the near-eye display) to go further into the curvature of the light field. The light field may come from a single depth plane or a plurality of depth planes or even from an autostereoscopic plane or any other type of emissive displays. Optical fusion may also reduce the form factor of lenses and increase the brightness of the lens by allowing large concave mirrors to be used instead of transmissive lenses.

The present disclosure has described various systems and methods for facilitating light field optical fusion. These systems and methods may be implemented by a variety of different display systems and/or imaging systems. For example, the systems and methods described herein may be implemented in AR or VR headsets, desktop displays, any type of consumer camera, scientific cameras, telescopes, microscopes, etc.

FIG. 18 illustrates a chip set 2200 in which embodiments of the disclosure may be implemented. For example, the chip set 2200 may be incorporated in any of the optical fusion display systems or optical fusion imaging systems described herein. Chip set 2200 can include, for instance, processor and memory components incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 2200 includes a communication mechanism such as a bus 2202 for passing information among the components of the chip set 2200. A processor 2204 has connectivity to bus 2202 to execute instructions and process information stored in a memory 2206. Processor 2204 includes one or more processing cores with each core configured to perform independently. A multi-core processor enables multiprocessing within a single physical package. Examples of a multi-core processor include two, four, eight, or greater numbers of processing cores. Alternatively or in addition, processor 2204 includes one or more microprocessors configured in tandem via bus 2202 to enable independent execution of instructions, pipelining, and multithreading. Processor 2204 may also be accompanied with one or more specialized components to perform certain processing functions and tasks such as one or more digital signal processors (DSP) 2208, and/or one or more application-specific integrated circuits (ASIC) 2210. DSP 2208 can typically be configured to process real-world signals (e.g., sound) in real time independently of processor 2204. Similarly, ASIC 2210 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 2204 and accompanying components have connectivity to the memory 2206 via bus 2202. Memory 2206 includes both dynamic memory (e.g., RAM) and static memory (e.g., ROM) for storing executable instructions that, when executed by processor 2204, DSP 2208, and/or ASIC 2210, perform the process of example embodiments as described herein. Memory 2206 also stores the data associated with or generated by the execution of the process.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A display system for optically fusing light, comprising:
multiple image sources configured to emit light corresponding to multiple respective image portions;
a back reflector; and
a bent reflector optically coupled to the back reflector, the bent reflector to tile a reflection of the light emitted by the image sources, and output, in a virtual plane in front of a viewer, a single continuous image of the multiple respective image portions, the single continuous image being larger than each of the multiple respective image portions, and the multiple respective image portions being blended together in the single continuous image.

2. The display system of claim 1, wherein:
the bent reflector comprises multiple segments and a bend region including a first segment of the multiple segments attached to a second segment of the multiple segments at an angle;
each of the segments is configured to receive the light emitted by a corresponding one of the multiple image sources, and reflect the light to the back reflector;
the back reflector is configured to: modify a polarization or an angular profile of the light reflected by each of the segments; and after modifying the polarization or the angular profile, reflect the light back to the segments such that the light passes through the segments, and
the angle is configured such that after the light reflected by the back reflector passes through the segments, the multiple respective image portions are tiled or fused.

3. The display system of claim 2, wherein each of the segments comprises:
a first layer configured to: receive the light emitted by the corresponding one of the image sources, and change the polarization of the received light or a reflective efficiency of a second layer that is adjacent to the first layer; and
the second layer, wherein the second layer is configured to reflect the light to the back reflector.

4. The display system of claim 2, further comprising:
an intermediate optical component, the intermediate optical component comprising two anti-reflective layers and a quarter-wave plate film between the two anti-reflective layers, wherein the light reflected to the back reflector passes through the intermediate optical component before being received at the back reflector.

5. The display system of claim 2, further comprising:
a first absorptive polarization layer adjacent to the bent reflector, the first absorptive polarization layer configured to receive the light that passes through the first segment from the back reflector and reduce ambient reflection or self-reflection between both sides of the bent reflector.

6. The display system of claim 2, wherein each of the multiple image sources is horizontally or vertically tilted at an angle configured such that after the light reflected by the back reflector passes through the multiple segments, the multiple respective image portions are tiled.

7. The display system of claim 2, wherein the bend region between the first segment and the second segment comprises a first metasurface on an inner facet of the bend region or an outer facet of the bend region, the first metasurface configured to correct for optical aberration caused by the bend region.

8. The display system of claim 7, wherein the bend region comprises the first metasurface on the inner facet of the bend region and a second metasurface on the outer facet of the bend region.

9. The display system of claim 2, wherein the bend region comprises an integrated Gradient-Index Lens (GRIN), the GRIN configured to compensate for an optical power mismatch between inner and outer surfaces of the bend region to remove any light disturbance visible to a user.

10. The display system of claim 2, further comprising: a pre-compensator adjacent to the bend region, the pre-compensator comprising a pre-compensation bend configured to pre-compensate for optical aberrations introduced by the bend region for light received at the bend region.

11. The display system of claim 2, further comprising: a post-compensator adjacent to the bend region, the post-compensator configured to post-compensate for optical aberrations introduced to light transmitted through the bend region between the first segment and the second segment.

12. The display system of claim 2, wherein the bend region is segmented into multiple bent segments to reduce local curvature and distribute it to larger area.

13. The display system of claim 2, wherein the bend region comprises a reflective layer mechanically stretched over a chassis of a mechanical frame to create thin sharp optically see through bends.

14. The display system of claim 2, wherein the bend region comprises a free form optical structure having at least one of an interior surface curvature or exterior surface curvature expressed as a polynomial.

15. The display system of claim 2, wherein the bend region comprises the free form optical structure having each of the interior surface curvature and the exterior surface curvature expressed as a polynomial.

16. The display system of claim 2, wherein: the multiple image sources are a first set of multiple image sources, the bent reflector is a first bent reflector, and the curved reflector is a first curved reflector, the display system comprising:
a left eye display system, comprising: the first set of multiple image sources, the first bent reflector, and the first back reflector; and
a right eye display system, comprising:
a second set of multiple image sources, the second set of multiple image sources configured to emit light corresponding to second multiple respective image portions;
a second bent reflector comprising a second set of multiple segments, wherein:
each of the segments of the second set of multiple segments is configured to receive the light emitted by a corresponding one of the image sources of the second set of multiple image sources, and reflect the light to a second back reflector; and
the second bent reflector comprises a second bend region including a third segment of the second set of multiple panels attached to a fourth segment of the second set of multiple panels at a second angle; and
the second back reflector.

17. The display system of claim 1, wherein the back reflector comprises a curved first surface mirror configured to create a concentric light field from incident light.

18. The display system of claim 1, wherein each of the multiple image sources is adjacent to another one of the multiple image sources and is angled relative to the other, adjacent image source.

19. The display system of claim 1, further comprising: a processor configured to apply a predistortion to the multiple respective image portions before the multiple image sources emit the light corresponding to the multiple respective image portions, wherein the predistortion is configured to blend together the image portions after they are tiled by passing through the bent reflector.

20. The display system of claim 19, wherein applying the predistortion comprises applying a geometric distortion and an intensity map to the multiple respective image portions.

21. The display system of claim 20, further comprising a head tracking sensor, the head tracking sensor configured to generate sensor data based on a position or orientation of a user's eye, head, or face in relation to the bent reflector, wherein the predistortion is applied based at least on the sensor data.

22. The display system of claim 1 where the multiple image sources are curved.

23. The display system of claim 1, wherein the multiple respective image portions are blended together in the single continuous image such that no tiling lines associated with tiling the multiple respective image portions to form the single continuous image are visible to the viewer in the single continuous image.

24. The display system of claim 1, wherein the bent reflector is optically compensated at a bend region of the bent reflector.

* * * * *